United States Patent
Tanigawa et al.

(10) Patent No.: US 6,314,570 B1
(45) Date of Patent: Nov. 6, 2001

(54) DATA PROCESSING APPARATUS FOR FACILITATING DATA SELECTION AND DATA PROCESSING IN AT TELEVISION ENVIRONMENT WITH REUSABLE MENU STRUCTURES

(75) Inventors: Hidekazu Tanigawa; Kazuo Okamura, both of Hirakata; Kiyokazu Yamanaka, Ashiya; Junichi Hirai, Suita, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/798,478

(22) Filed: Feb. 10, 1997

(30) Foreign Application Priority Data

Feb. 8, 1996 (JP) .................................................. 8-022274

(51) Int. Cl.[7] .............................. H04N 7/14; G06F 13/00
(52) U.S. Cl. ................................ 725/40; 725/43; 725/61; 345/353
(58) Field of Search .............................. 348/13; 345/352, 345/353, 357; 725/40, 39, 43, 52, 61

(56) References Cited

U.S. PATENT DOCUMENTS

| | | | |
|---|---|---|---|
| 5,220,500 | * 6/1993 | Baird et al. | 705/36 |
| 5,280,573 | * 1/1994 | Kuga et al. | 345/338 |
| 5,297,249 | 3/1994 | Bernstein et al. | 707/501 |
| 5,367,619 | * 11/1994 | Dipaolo et al. | 345/352 |
| 5,392,387 | * 2/1995 | Fitzpatrick et al. | 345/352 |
| 5,404,393 | * 4/1995 | Remillard | 379/93.25 |
| 5,412,720 | * 5/1995 | Hoarty | 380/15 |
| 5,432,902 | * 7/1995 | Matsumoto | 345/338 |
| 5,442,795 | * 8/1995 | Levine et al. | 345/349 |

(List continued on next page.)

FOREIGN PATENT DOCUMENTS

| | | | |
|---|---|---|---|
| 5002477 | 1/1993 | (JP) | G06F/9/06 |
| 52477 | 1/1993 | (JP) . | |
| 5265957 | 10/1993 | (JP) | G06F/3/14 |
| 2538499 | 9/1996 | (JP) | G06F/3/14 |

OTHER PUBLICATIONS

Foss, Carolyn L., "Tools for Reading and Browsing Hypertext", Information Processing and management, vol. 25, No. 4, pp. 407–418, Jan. 1989.*

Primary Examiner—Kakali Chaki
Assistant Examiner—Jeffrey Allen Rossi
(74) Attorney, Agent, or Firm—Price and Gess

(57) ABSTRACT

A data processing apparatus which displays a set of document data on a display unit together with an operation menu which has operation items related to the set of document data. In the apparatus, the document data storage unit stores a plurality of sets of document data of different contents which are indicated by sets of content information. The operation menu information storage unit stores a plurality of sets of operation menu information which each contain operation items that correspond to a content of document data. The first indication operation unit indicates a display of a set of document data. The second indication operation unit indicates an addition of a display of an operation menu to a display of document data. The operation menu generation unit receives an indication from the second indication operation unit, obtains the content information of the displayed data from the document data storage unit, extracts a corresponding set of operation menu information from the operation menu information storage unit, and generates an operation menu with the extracted operation items as menu items. The display control unit reads a set of document data from the document data storage unit, has the data displayed on the display unit in accordance with an indication from the first indication operation unit, and has the operation menu generated by the operation menu generation unit displayed in a window provided on the display unit.

11 Claims, 63 Drawing Sheets

U.S. PATENT DOCUMENTS

| | | | |
|---|---|---|---|
| 5,513,308 | * 4/1996 | Mori | 345/337 |
| 5,530,869 | * 6/1996 | Salle | 345/352 |
| 5,541,662 | * 7/1996 | Adams et al. | 348/460 |
| 5,550,746 | * 8/1996 | Jacobs | 700/231 |
| 5,555,496 | * 9/1996 | Tackbary et al. | 705/27 |
| 5,570,126 | * 10/1996 | Blahut et al. | 725/93 |
| 5,574,494 | * 11/1996 | Marics | 725/37 |
| 5,583,560 | * 12/1996 | Florin et al. | 725/40 |
| 5,585,838 | * 12/1996 | Lawler et al. | 725/41 |
| 5,623,613 | * 4/1997 | Rowe et al. | 345/353 |
| 5,628,004 | * 5/1997 | Gormley et al. | 707/104 |
| 5,635,979 | * 6/1997 | Kostreski et al. | 725/132 |
| 5,663,757 | * 9/1997 | Morales | 725/40 |
| 5,664,133 | * 9/1997 | Malamud et al. | 345/352 |
| 5,694,176 | * 12/1997 | Bruette et al. | 725/43 |
| 5,721,897 | * 2/1998 | Rubinstein | 707/2 |
| 5,722,041 | * 2/1998 | Freadman | 725/82 |
| 5,726,702 | * 3/1998 | Hamaguchi et al. | 725/43 |
| 5,734,853 | * 3/1998 | Hendricks et al. | 345/352 |
| 5,774,109 | * 6/1998 | Winksy et al. | 345/124 |
| 5,774,361 | * 6/1998 | Colarelli, III et al. | 701/29 |
| 5,784,583 | * 7/1998 | Redpath | 345/353 |
| 5,809,471 | * 9/1998 | Brodsky | 704/275 |
| 5,828,420 | * 10/1998 | Marshall et al. | 725/39 |
| 5,844,620 | * 12/1998 | Coleman et al. | 348/461 |
| 5,862,395 | * 1/1999 | Bier | 709/318 |
| 5,877,765 | * 3/1999 | Dickman et al. | 345/357 |
| 5,880,768 | * 3/1999 | Lemmons et al. | 725/41 |
| 5,974,253 | * 10/1999 | Nahaboo et al. | 345/353 X |
| 6,005,561 | * 12/1999 | Hawkins et al. | 725/39 |
| 6,005,601 | * 12/1999 | Ohkara et al. | 725/52 |

* cited by examiner

FIG. 2

DOCUMENT (1) 202

201 CONTENT INFORMATION : SHOPPING INFORMATION

SECOND-HAND CAR INFORMATION

MODEL : PUPURIMA
YEAR : 1991
COLOR : NAVY BLUE
DISTANCE ON CLOCK : 38,000 KM
ENGINE : 1800 CC
......

RECEPTION TIME : " 13 : 30 OCT. 26 1995" 203

DOCUMENT (2) 205

204 CONTENT INFORMATION : TRAFFIC INFORMATION

TRAFFIC INFORMATION

ROUTE 1 :
  · 5KM TAILBACK BETWEEN DEYASHIKI AND KOSEI NENKIN HOSPITAL
  · 3KM TAILBACK BETWEEN MORIGUCHI STATION AND MIYAKOJIMA

HANSHIN EXPRESSWAY :
  · MORIGUCHI–CITY CENTER  70 MINUTES
  · IKEDA–CITY CENTER  55 MINUTES

KINKI EXPRESSWAY :
  · 3KM TAILBACK AT BARAKI TOLLGATE

RECEPTION TIME : " 14 : 15 OCT. 26 1995" 206

FIG. 3

MENU INFORMATION (1)

```
<MENU CONTENT INFORMATION=TRAFFIC INFORMATION>
    <ITEM> PRINT              <EXECUTION OPERATION> print
    <ITEM> IMAGE DISPLAY      <EXECUTION OPERATION> show image
    <ITEM> SHOW TRAFFIC REPORT <EXECUTION OPERATION> show report
</MENU>
```
301, 302

MENU INFORMATION (2)

```
<MENU CONTENT INFORMATION=SHOPPING INFORMATION>
    <ITEM> SHOW DETAILS       <EXECUTION OPERATION> show image
    <ITEM> PRINT              <EXECUTION OPERATION> print
    <ITEM> ORDER              <EXECUTION OPERATION> show fax
</MENU>
```
303, 304

TIME : 7 : 00~8 : 00
PROGRAM TITLE : BIG MORNING
CHANNEL : AAA
CAST : NAOMI SUZUKI

TIME : 8 : 00~9 : 00
PROGRAM TITLE : ENTERTAINMENT NEWS — 1202
CHANNEL : AAA — 1204
CAST : HIROMI IIJIMA, SHIGEO NAGASHIMA — 1203
    . . . . . . . .    . . . . . . . .

TIME : 8 : 00~9 : 00
PROGRAM TITLE : MORNING ASAHI
CHANNEL : BBB
CAST : HIROMI IIJIMA

TIME : 8 : 00~9 : 00
PROGRAM TITLE : QQQ
CHANNEL : BBB
CAST : EEE, FFF
    . . . . . . . .    . . . . . . . .

| KEY WORD | TYPE |
|---|---|
| BIG ASAHI | PROGRAM TITLE |
| NAOMI SUZUKI | CAST |
| ENTERTAINMENT NEWS | PROGRAM TITLE |
| HIROMI IIJIMA | CAST |
| SHIGEO NAGASHIMA | CAST |
| MORNING ASAHI | PROGRAM TITLE |
| QQQ | PROGRAM TITLE |
| EEE | CAST |
| FFF | CAST |
| ⋮ | ⋮ |
| XXX | CAST |

FIG. 14

MENU INFORMATION (1)

```
<MENU TYPE=PROGRAM TITLE>
   <ITEM> SET VIDEO TIMER    <EXECUTION OPERATION> set timer
   <ITEM> SHOW TV            <EXECUTION OPERATION> show TV
   <ITEM> SHOW DETAILS       <EXECUTION OPERATION> show details
</MENU>
```
1401 — 1403 — 1404

MENU INFORMATION (2)

```
<MENU TYPE=CAST>
   <ITEM> SHOW IMAGE         <EXECUTION OPERATION> show image
   <ITEM> SHOW PROFILE       <EXECUTION OPERATION> show profile
   <ITEM> SEND E-MAIL        <EXECUTION OPERATION> mail
</MENU>
```
1402

FIG. 15

| CHANNEL | 7:00 | 8:00 | ... | 9:00 | ... | 23:00 |
|---|---|---|---|---|---|---|
| A | BIG ASAHI<br>CAST : NAOMI SUZUKI | ENTERTAINMENT NEWS<br>CAST :<br>HIROMI IIJIMA,<br>SHIGEO NAGASHIMA | | ------ | | ------ |
| A | | | | | | |
| A | | | | | | |
| B | MORNING ASAHI<br>CAST : HIROMI IIJIMA | QQQ<br>CAST : EEE, FFF | | ------ | | ------ |
| B | | | | | | |
| B | | | | | | |
| C | ------ | ------ | | ------ | | ------ |
| C | | | | | | |
| C | | | | | | |
| D | ------ | ------ | | ------ | | ------ |
| D | | | | | | |
| D | | | | | | |

FIG. 16

| CHANNEL | 7:00 | 8:00 | 9:00 | ... | 23:00 |
|---|---|---|---|---|---|
| A A A | BIG ASAHI<br>CAST: NAOMI SUZUKI | ENTERTAINMENT NEWS<br>CAST:<br>HIROMI IIJIMA<br>SHIGEO NA... | [SET VIDEO TIMER]<br>[SHOW TV]<br>[SHOW DETAILS] ← 1601 | | ........ |
| B B B | MORNING ASAHI<br>CAST: HIROMI IIJIMA | QQQ | | | ........ |
| C C C | | CAST: EEE, FFF | | | ........ |
| D D D | | | | | ........ |

FIG. 17

| CHANNEL | 7:00 | 8:00 | 9:00 | ... | 23:00 |
|---|---|---|---|---|---|
| A A A | BIG ASAHI<br>CAST: NAOMI SUZUKI | ENTERTAINMENT NEWS<br>CAST:<br>HIROMI IIJIMA,<br>SHIGEO NAGASHIMA | | | |
| B B B | MORNING ASAHI<br>CAST: HIROMI IIJIMA | QQQ<br>CAST: EEE, FFF | | | |
| C C C | | | | | |
| D D D | | | | | |

1701 → SHOW IMAGE / SHOW PROFILE / SEND E-MAIL

FIG. 53

5301
⟨TITLE⟩ LATEST SOCCER RESULTS
⟨CONTENT⟩ GAMPA 3   HERDY 0
           CRAMPAS 2  RESS 1
           PURPLE 4   BLUE 2
           ZERESO 2   PARINOS 1

AFTER TODAY'S RESULTS, THE LEAGUE TABLE HAS GAMPA TOP, WITH PURPLE SECOND AND ZERESO THIRD.
HOWER, KONDO, THE LINCHPIN IN THE GAMPA DEFENCE, PICKED UP AN INJURY IN TODAY'S GAME AND IS EXPECTED TO BE OUT FOR TWO WEEKS.
NEXT MATCHES

GAMPA vs. CRAMPAS (BANPAKU STADIUM)
PURPLE vs. ZERESO (NISHI KYUGOKU STADIUM)
HERDY vs. RESS (NATIONAL STADIUM)
BLUE vs. PARINOS (YOKOHAMA BASEBALL STADIUM)

5302
⟨TITLE⟩ INTRODUCING GAMPA
⟨CONTENT⟩ A TEAM LOCATED IN OSAKA WHICH WAS FORMED OUT OF THE SOCCER TEAM OF MATSUURA ELECTRIC. THE TEAM HAS BEEN ON REMARKABLY GOOD FORM OF LATE.

5303
⟨TITLE⟩ HERDY
⟨CONTENT⟩ A TEAM LOCATED IN TOKYO WHICH WAS FORMED OUT OF THE SOCCER TEAM OF THE OX NEWSPAPER. RECENTLY, THE TEAM HAS BEEN STRUGGLING TO FIND ITS FROM.

| | 6102 / 6101 / 6103 | |
|---|---|---|
| GAMPA | | 1 |
| HERDY | | 2 |
| 3-0 | | 3 |
| CRAMPAS | | 4 |
| RESS | | 5 |
| 2-1 | | 6 |
| PURPLE | | 7 |
| BLUE | | 8 |
| 4-2 | | 9 |
| ZERESO | | 10 |
| PARINOS | | 11 |
| 2-1 | | 12 |
| TODAY'S RESULTS | | 1 |
| GAMPA ARE TOP | | 2 |
| PURPLE SECOND | | 3 |
| ZERESO THIRD | | 4 |
| LEAGUE TABLE | | 5 |
| TODAY'S GAME | | 6 |
| GAMPA DEFENCE | | 7 |
| KONDO | | 8 |
| INJURY | | 9 |
| OUT FOR TWO WEEKS | | 10 |
| BANPAKU STADIUM | | 11 |
| NISHI KYUGOKU STADIUM | | 12 |
| NATIONAL STADIUM | | 1 |
| YOKOHAMA BASEBALL STADIUM | | 2 |

DATA PROCESSING APPARATUS FOR FACILITATING DATA SELECTION AND DATA PROCESSING IN AT TELEVISION ENVIRONMENT WITH REUSABLE MENU STRUCTURES

BACKGROUND OF THE INVENTION

1. Field of the Invention

The present invention relates to a data processing apparatus which generates and displays operation menus for facilitating operation execution or data selection for multimedia display data including text, graphics, and sound.

2. Description of the Related Art

A first example of a conventional data processing apparatus which displays operation menus is a data processing apparatus which receives teletext broadcasts and displays an index for selecting the content of the teletext or for returning from a selected item of teletext to the index. This operation menu does not change in response to the content of the broadcast teletext, but is rather an operation menu whose menu items are fixed.

A second example of a conventional data processing apparatus is the Internet browser software "NETSCAPE NAVIGATOR" (Registered Trade Mark) produced by Netscape Communications, Inc. "NETSCAPE NAVIGATOR" is an application for accessing the World Wide Web (often abbreviated to "WWW") which is a distributed information system based on a concept called "Hypertext". A detailed description of the World Wide Web is given in the article "Media Integration by the World Wide Web" which appeared in the Jouhou Shori Gakkai Data Base System Research Report 100–21 (Oct. 14, 1994).

The main function of the NETSCAPE NAVIGATOR is to read information written in HTML (Hypertext Markup Language), and to interpret and display its content. When information which shows a link to another page (called a Uniform Resource Locator or "URL") is selected using a pointing device such as a mouse, NETSCAPE NAVIGATOR takes data from the link address indicated by the URL and displays it. NETSCAPE NAVIGATOR is also able to display predetermined menus for "hot spots" which are special marks provided in the display data (such as marks showing link addresses). A description of NETSCAPE NAVIGATOR is given between pages 93 and 99 of the September 1995 edition of "Internet User" magazine (Softbank Publishing).

As described above, the content of menus for the first example of a conventional data processing apparatus is fixed. As a result, it is not possible to select menu items in accordance with the content of broadcast teletext.

With the second conventional technique, while predetermined menus are displayed for hot spots displayed with the predetermined mark, making it possible to change the display to the data associated with the hot spot or to selectively perform a plurality of operations for the hot spot, it is not possible to change the operation menus in accordance with the content of the hot spots. As a result, the apparatus becomes more difficult to use since unnecessary menu items are displayed for hot spots.

When looking through a set of pages which are connected by such links, it has been necessary to pass through the pages one at a time, so that it has not been possible to view a page which is two or more links away from the present hot spot by making only one selection operation.

In actual Internet pages, hot spots which represent links also tend to be distributed throughout the page, so that it is difficult for users to see all of the available links when making a selection. In particular, when a user is unsure as to which hot spot to select, the user has to go to the trouble of moving the mouse cursor a considerable distance over the screen.

When using a conventional browser, the only information which the user can refer to when selecting a hot spot is the information given by the hot spot itself, so that users can often end up switching to data which does not serve their purpose.

Finally, most conventional browsers assume the user is using a pointing device such as a mouse, so that such selections become difficult if the user has to use the ten key pad on a remote control unit.

SUMMARY OF THE INVENTION

In view of the stated problems, it is a primary object of the present invention to provide a data processing apparatus which allows the selection of menu items which change depending on the content of document data or on the type of a key word included in document data.

It is a second object of the present invention to provide a data processing apparatus which can display a menu which enables a user to understand the content of data linked to the data being displayed.

A third object of the present invention is to provide a data processing apparatus which can enable a user to understand the content of other sets of data which are linked to a data section included in a set of data.

A fourth object of the present invention is to provide a data processing apparatus which can display data several links away in a hierarchy as menu items in a hierarchical menu displayed with a present set of data.

A fifth object of the present invention is to provide a data processing apparatus which reduces the trouble the user has to go to in moving the focus of a data section, by having each data section included in a set of data displayed for a predetermined time.

A sixth object of the present invention is to provide a data processing apparatus which, in order to facilitate the selection of data linked to a data section, has data related to a data section in the focus condition added to the display.

A seventh object of the present invention is to provide a data processing apparatus which enables the user to make a rapid selection of a data section, even when there is a large number of data section in the displayed data.

An eighth object of the present invention is to provide a data processing apparatus which can display data directly related to a data section in accordance with an operation of a channel number button on a television remote controller.

The primary object can be achieved by a data processing apparatus which displays a set of document data on a display unit together with an operation menu which has operation items for operation executions related to said set of document data, the data processing apparatus including: a document data storage unit for storing a plurality of sets of document data which are to be displayed by the display unit, wherein each set of document data has a different data content and is stored together with a set of content information which corresponds to said data content; an operation menu information storage unit for storing a plurality of sets of operation menu information which are each made up of a set of operation items which correspond to a content of a set of document data; a first indication operation unit for indicating a display of a set of document data, in accordance with a user operation; a second indication operation unit for indicating an addition of a display of an operation menu to the displayed set of document data, in accordance with a user operation; an operation menu generation unit for receiving an indication from the second indication operation unit, for obtaining the content information of the displayed set of document data from the document data storage unit, for extracting the set of operation menu information which corresponds to the obtained content information from the operation menu information storage unit, and for generating an operation menu which has the operation items in the extracted set of operation menu information as menu items; and a display control unit for reading a set of document data from the document data storage unit and having the set of document data displayed on the display unit in accordance with an indication from the first indication operation unit, and for having the operation menu generated by the operation menu generation unit displayed in a window provided on the display unit.

The above primary object can also be achieved by a data processing apparatus which displays a set of document data including key words on a display unit together with an operation menu which has operation items for operation executions related to the set of document data, the data processing apparatus including: a document data storage unit for storing a set of document data, including key words, which is to be displayed by the display unit; an operation menu information storage unit for storing a plurality of sets of operation menu information which are each made up of a set of operation items which correspond to a type of key word; a first indication operation unit for indicating a display of a set of document data in accordance with a user operation; a first display control unit for receiving an indication from the first indication operation unit, for reading a set of document data from the document data storage unit, and for having the read set of document data displayed by the display unit; a key word selecting operation unit for selecting a key word in the set of document data displayed by the display unit, in accordance with a user operation; a second display control unit for having a key word, which is indicated as one of a default and a selection by the key word selecting operation unit, in the set of document data displayed on the display unit displayed in focus; a second indication operation unit for indicating a display of an operation menu for the key word in focus, in accordance with a user operation; an operation menu generation unit for receiving an indication from the second indication operation unit, for reading the set of operation menu information which corresponds to the type of the key word in focus on the display unit from the operation menu information storage unit, and for generating an operation menu which has the operation items in the read set of operation menu information as menu items; and a third display control unit for having the operation menu generated by said operation menu generation unit displayed in a window provided on the display unit.

With the above construction it is possible to display an operation menu which corresponds to the content of a document or to key words.

Here, the data processing apparatus may further include: a menu item focusing/deciding operation unit for focusing on a menu item in the operation menu displayed on the display unit in accordance with a user operation and for deciding on the focused menu item in accordance with a user operation; and an operation execution unit for executing an operation program of the operation item which is the menu item decided on by the menu item focusing/deciding operation unit.

With the above construction it is possible to facilitate operation execution for the displayed document data or key words.

The data processing apparatus may further include: a document data obtaining unit for receiving a text-multiplexed broadcast transmitted by a television station and obtaining a set of document data by separating text data from the received text-multiplexed broadcast; and a document data writing unit for writing the set of document data received by the document data obtaining unit into the document data storage unit.

With the above construction, document data in text-multiplexed broadcasts can be put to good use.

The second object of the present invention can be achieved by a data processing apparatus including a display unit, the data processing apparatus including: a data storage unit for storing a plurality of sets of data, together with links which each connect an arbitrary set of data to another set of data; data display indication operation unit for indicating a set of data to be displayed, in accordance with a user operation; a first display control unit for reading a set of data stored in the data storage unit in accordance with an indication from the data display indication operation unit and having the read set of data displayed on the display unit; a menu display indication operation unit for indicating a display of a menu related to sets of data which are linked to a set of data displayed on the display unit, in accordance with a user operation; a first menu generation unit for obtaining a data part of each set of data which is directly linked to the set of data displayed on the display unit and for generating a menu which has the obtained data parts as menu items; and a second display control unit for having the menu generated by the first menu generation unit displayed in addition to the set of data displayed by the display unit.

With the above construction, the menu items of menus show the content of data linked to the data being displayed.

The data processing apparatus may further include: a menu item selecting operation unit for selecting a menu item in a menu displayed by the display unit, in accordance with a user operation; a second menu generation unit for obtaining a data part of each set of data which is directly linked to the set of data which includes the menu item selected by the menu item selecting operation unit and for generating an additional menu which has the obtained data parts as menu items; and a third display control unit for having the additional menu generated by the second menu generation unit added to a display of menus on the display unit as a submenu, wherein if a selection of a menu item in an additional menu is made by the menu item selecting operation unit, the second menu generation unit may generate a new additional menu and the third display control unit has the new additional menu added to the display on the display unit as a next submenu.

Here, each set of data stored in the data storage unit may include a title and one of the first menu generating unit and the second menu generating unit may obtain the title included in each linked set of data and use the obtained titles as menu items.

With the above construction, the content of sublevels can be quickly understood from the menus.

The third object of the present invention can be achieved by a data processing apparatus including a display unit, the data processing apparatus including: a data storage unit for storing a plurality of sets of data which include data sections, together with links which each connect a data section in an arbitrary set of data to another set of data; a data display indication operation unit for indicating a set of data to be displayed, in accordance with a user operation; a first display control unit for reading a set of data from the data storage unit in accordance with an indication from the data display indication operation unit, and having the read set of data displayed on the display unit; a menu display indication operation unit for indicating a display of a menu related to sets of data which are linked to a data section included in the set of data displayed on the display unit, in accordance with a user operation; a first menu generation unit for generating a menu based on sets of data which are directly linked a data section included in the set of data displayed on the display unit, in accordance with an indication from the menu display indication operation unit; and a second display control unit for having the menu generated by the first menu generation unit displayed in addition to the set of data displayed by the display unit.

Here, the first menu generating unit may include: a first menu item obtaining unit for obtaining a part of each set of data directly linked to a data section, wherein there is a plurality of sets of data directly linked to the data section; and a first menu generating unit for generating a menu which has the parts of each set of data obtained by the first menu item obtaining unit as menu items.

Here also, each set of data stored in the data storage unit may include a title, and each first menu item obtaining unit may obtain the title included in each linked set of data.

Here, the data processing apparatus may further include: a menu item selection operation unit for selecting a menu item in a menu displayed by the display unit, in accordance with a user operation; a second menu generation unit for reading data sections included in a set of data which includes a title which is the menu item selected by the menu item selection operation unit from the data storage unit, and for generating an additional menu which has the read data sections as menu items; and a third display control unit for having the additional menu generated by the second menu generation unit added to a display of the menu on the display unit as a submenu.

Here, the data processing apparatus may further include: an additional menu item selection operation unit for selecting a menu item in an additional menu displayed on the display unit, in accordance with a user operation; a third menu generation unit for reading parts of sets of data which are directly linked to a data section which is the menu item selected by the additional menu item selection operation unit from the data storage unit, and for generating a new additional menu which has the read parts of sets of data as menu items; and a fourth display control unit for having the new additional menu generated by the third menu generation unit added to a display of the menu and the additional menu on the display unit as a lower-level submenu.

Here, the first menu generation unit may include: a first menu item obtaining unit for obtaining data sections in a set of data directly linked to a data section, wherein there is only one set of data directly linked to the data section in the data storage unit; and a first menu generating unit for generating a menu which has the data sections obtained by the first menu item obtaining unit as menu items.

The data processing apparatus may further include: a menu item selection operation unit for selecting a menu item in a menu displayed by the display unit, in accordance with a user operation; a second menu generation unit for reading a part of each set of data directly linked to the data section which is the menu item selected by the menu item selection operation unit from the data storage unit, and for generating an additional menu which has the read parts of sets of data as menu items; and a third display control unit for having the additional menu generated by the second menu generation unit added to a display of the menu on the display unit as a submenu.

With the above construction, the content of sublevels can be quickly understood from the menus.

Here, the data processing apparatus may further include a data section display control unit for having data sections included in the set of data being displayed on the display unit displayed in a new window.

With the above construction, the user can easily view the data sections in the present set of data which are linked to other sets of data.

The fourth object of the present invention can be achieved by a data processing apparatus which further includes: a data display updating operation unit for indicating a display of data directly linked to menu item in an additional menu most recently added to the display on the display unit, in accordance with a user operation; and a fourth display control unit for receiving an indication from the data display updating operation unit, for reading a set of data which includes the selected menu item from the data storage unit, and for having the read set of data displayed by the display unit in place of the set of data which the first display control unit had displayed.

Also, the data processing apparatus may include: a data display updating indication operation unit for indicating an updating of data display, in accordance with a user operation; and a data updating control unit for reading a set of data which includes a selected menu item in a latest new additional menu to be displayed on the display unit from the data storage unit in accordance with an indication from the data display updating indication operation unit, and for having the read set of data displayed by the display unit in place of the set of data which the first display control unit had displayed.

Here, the data processing apparatus of may further include: a data display updating indication operation unit for indicating an updating of data display, in accordance with a user operation; and a data updating control unit for reading a set of data which includes a selected menu item in the latest additional menu to be displayed on the display unit from the data storage unit in accordance with an indication from the data display updating indication operation unit, and for having the read set of data displayed by the display unit in place of the set of data which the first display control unit had displayed.

With the above construction, the user can easily have data which is several links away from the displayed data displayed.

The fifth object of the present invention can be achieved by a data processing apparatus including a display unit, the data processing apparatus including: a data storage unit for storing a plurality of sets of data which include data sections, together with links which each connect a data section in an arbitrary set of data to another set of data; a data display indication operation unit for indicating a set of data to be displayed, in accordance with a user operation; a first display control unit for reading a set of data from the data storage unit in accordance with an indication from the data display indication operation unit, and having the read set of data displayed in a window provided on the display unit; a focus display state data indicating unit for indicating a focus display state of a data section currently in focus in the set of data displayed on the display unit, the focus display state differing from a display state used for other data sections in the set of data; a second display control unit for receiving an indication from the focus display state data indicating unit, and for having the indicated data section displayed in the focus display state in a display of the display unit; a data display updating indication operation unit for indicating a display of a set of data linked to the data section in the focus display state on the display unit, in accordance with a user operation; and a third display control unit for reading a set of data which is directly linked to the data section in the focus display state from the data storage unit and having the read set of data displayed by the display unit in place of the set of data which the first display control unit had displayed.

The focus display state data indicating unit may include: a default unit for indicating, when a set of data is displayed on the display unit, a predetermined data section as a data section in the focus display state; and a timer unit for measuring a time for which an Nth data section is in the focus display state and for giving an indication to move the focus display state to an (N+1)th data section at a predetermined time interval.

The focus display state data indicating unit may include: a default unit for indicating, when a set of data is displayed on the display unit, a predetermined data section as a data section in the focus display state; a focus display time storage unit for storing a focus display time which shows how long each data section in each set of data is displayed in the focus display state; and a timer unit for reading, when an Nth data section in a set of data being displayed on the display unit is in the focus display state, a focus display time for the Nth data section from the focus display time storage unit, and for giving an indication to move the focus display state to an (N+1)th data section when the Nth data section has been displayed in the focus display state for the read focus display time.

With the above construction, the focus condition is moved from data section to data section at a predetermined interval, which further facilitates data display updating indications by the user.

The sixth object of the present invention can be achieved by a data processing apparatus which further includes a data appending display control unit for reading, when display of a data section included in a displayed set of data in the focus display state is commenced, a set of data which is directly linked to the data section in the focus display state from the data storage unit, and for having the read set of data displayed in a new window.

With the above construction, a user can view data before updating the display.

The seventh object of the present invention can be achieved by a data processing apparatus including a display unit, the data processing apparatus including: a data storage unit for storing a plurality of sets of data which, include data sections, together with links which each connect a data section in an arbitrary set of data to another set of data; a data display indication operation unit for indicating a set of data to be displayed, in accordance with a user operation; a first display control unit for reading a set of data from the data storage unit in accordance with an indication from the data display indication operation unit, and having the read set of data displayed in a window provided on the display unit; a window division indicating unit for indicating, when a number of data sections included in a set of data displayed by the first display control unit exceeds a predetermined number, a division of a display of the window into virtual windows; and a window division display control unit for dividing the display of the window on the display unit into virtual windows, in accordance with an indication from the window division indicating unit.

The window division indicating unit may include: a number of data sections calculation unit for counting a total number NE of data sections which are included in the set of data displayed on the display unit; a division judging unit for judging whether the total number NE exceeds a maximum number of data sections NS for one virtual window; and a division position indicating unit for positioning, when the division judging unit judges that the total number NE exceeds the maximum number NS, a pointer at a start of the displayed set of data in the data storage unit, for moving the pointer and counting a number of data sections until the maximum number of data sections NS have been counted, and for indicating a position of a dividing line for dividing the window based on a pointer position when the maximum number of data sections NS have been counted.

The data processing apparatus may further include: a current virtual window indication operation unit for indicating a current virtual window to have a focus condition, in accordance with a user operation; a current virtual window display control unit for having one out of the virtual windows displayed by the window division display control unit on the display unit displayed in a display state which shows the focus condition, based on one of a default and an indication from the current virtual window indication operation unit; a focus condition data section indication operation unit for indicating a data section in the focus condition, out of data sections in a set of data in the current virtual window on the display unit, which is to be displayed in a display state that enables the data section to be distinguished from other data sections; a second display control unit for receiving an indication from the focus condition data section indication operation unit, and having the indicated data section displayed on the display unit in the display state for the focus condition; a data display updating indication operation unit for indicating a display of a set of data which is directly linked to the data section displayed on the display unit in the focus condition, based on a user operation; and a third display control unit for reading the set of data linked to the data section displayed on the display unit in the focus condition from the data storage unit, based on an indication from the data display updating indication operation unit, and having the read set of data displayed in place of the set of data which the first display control unit had displayed.

With the above construction, virtual windows are displayed with only a predetermined number of data sections being allowed in each virtual window, facilitating user selection of a data section in a current virtual window.

The eighth object of the present invention can be achieved by a data processing apparatus which further includes: a data section number assigning unit for assigning, when the window division indicating unit indicates division of the window into virtual windows, a number to each data section included in each virtual window in order up to the maximum number NS; a current virtual window indicating operation unit for indicating a current virtual window to be displayed in the focus condition, in accordance with a user operation; a virtual window data section number display control unit for having one out of the virtual windows displayed by the window division display control unit on the display unit displayed in a display state which shows a focus condition, based on one of a default and an indication from the current virtual window indication operation unit, and for having the numbers assigned by the data section number assigning unit displayed for data sections in the current virtual window; a data display updating indication operation unit for indicating a display of a set of data which is directly linked to a data section displayed on the display unit, based on a user operation; and a second display control unit for reading, based on an indication from the data display updating indication operation unit, the set of data linked to an indicated data section from the data storage unit, and having the read set of data displayed in place of the set of data which the first display control unit had displayed.

Here, the highest number is assigned by the data section number assigning unit to a data section may be "12", and the data display updating indication operation unit may indicate a data section by means of an operation of a channel number button on a television remote controller.

The eighth object can also be achieved by a data processing apparatus including a display unit, the data processing apparatus including: a data storage unit for storing a plurality of sets of data which include data sections, together with links which each connect a data section in an arbitrary set of data to another set of data; a data display indication operation unit for indicating a set of data to be displayed, in accordance with a user operation; a first display control unit for reading a set of data from the data storage unit in accordance with an indication from the data display indication operation unit, and having the read set of data displayed in a window provided on the display unit; a data section number assigning unit for assigning a number in order to each data section included in a set of data displayed on the display unit; a data section number display control unit for having each data section included in a set of data displayed on the display unit displayed with the number assigned by the data section number assigning unit; a data display updating indication operation unit for indicating a display of data linked to a data section displayed on the display unit, in accordance with a user operation; and a second display control unit for reading, in accordance with an indication from the data display updating indication operation unit, a set of data which is directly linked to the indicated data section from the data storage unit and for having the read set of data displayed in place of the set of data which the first display control unit had displayed.

With the above construction, data display updating can be performed vary rapidly, increasing the performance of the apparatus.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 2 shows example documents stored in the document storage unit of the present embodiment;

FIG. 3 shows the menu information stored in the menu information storage unit in the present embodiment;

FIG. 12 shows an example of a document stored in the document storage unit of the present embodiment;

FIG. 14 shows the menu information stored in the menu information storage unit of the present embodiment;

FIG. 15 shows an example display of a program list on the display unit of the present embodiment;

FIG. 16 is an example display of an operation menu on the display unit of the present invention;

FIG. 17 is an example display of an operation menu on the display unit of the present invention;

FIG. 53 shows the data stored in the data storage unit of the present embodiment;

FIG. 61 shows the text item number correspondence table stored by the data storage unit of the present invention;

DESCRIPTION OF THE PREFERRED EMBODIMENT

The following is a description of data processing apparatus of the present invention which will refer to several preferred embodiments.

First Embodiment

Figure 1:
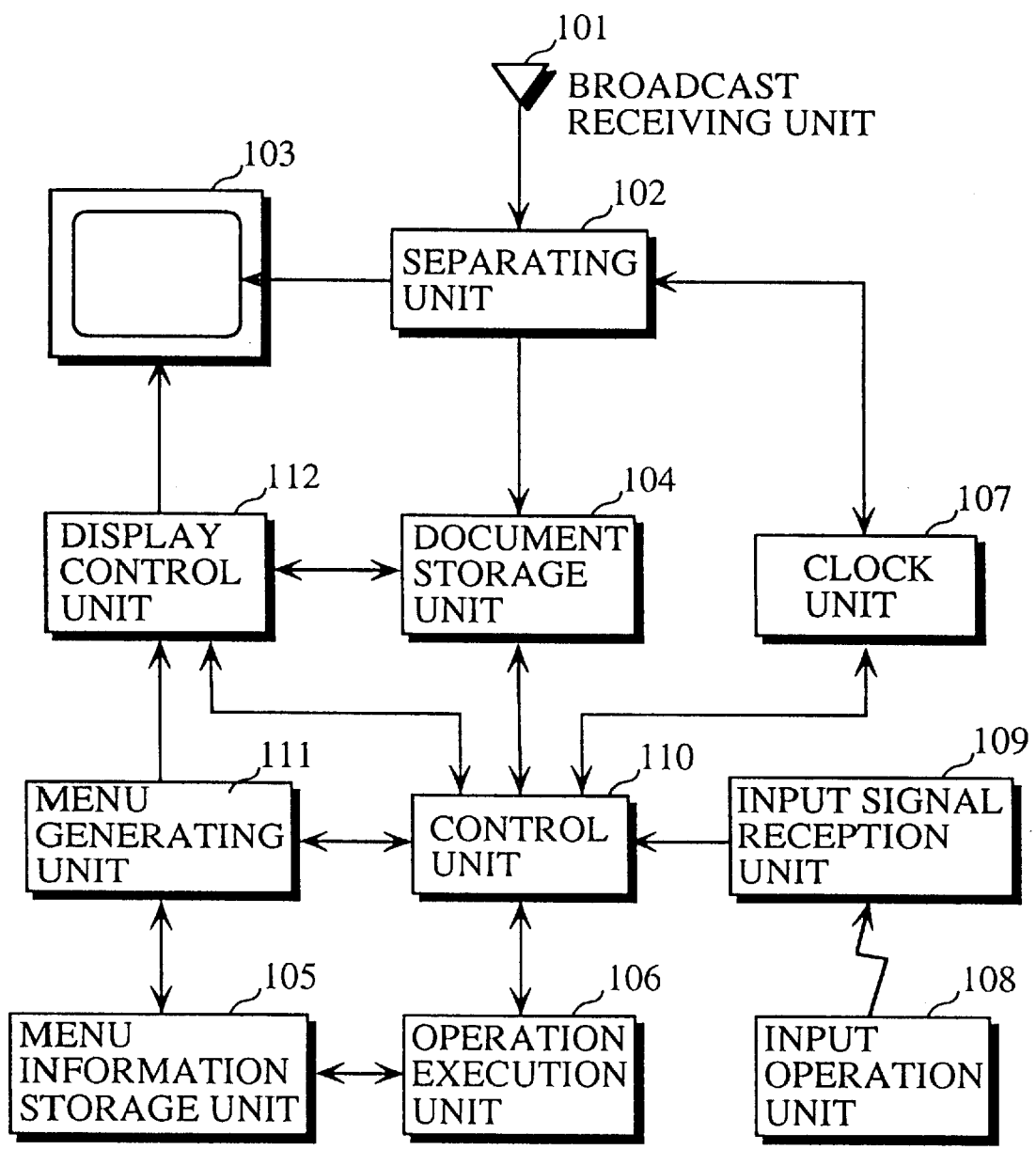
FIG. 1 shows the construction of the data processing apparatus of the first embodiment of the present invention.

The construction of the data processing apparatus of the first embodiment of the present invention is shown in FIG. 1. As shown in the drawing, the data processing apparatus is composed of a broadcast receiving unit 101, a separating unit 102, a display unit 103, a document storage unit 104, a menu information storage unit 105, an operation execution unit 106, a clock unit 107, an input operation unit 108, an input signal reception unit 109, a control unit 110, a menu generating unit 111, and a display control unit 112.

The broadcast receiving unit 101 receives a television broadcast from a TV station and sends the received signal to the separating unit 102. On receiving a reception indication for a predetermined image signal of an execution module from the operation execution unit 106, the broadcast receiving unit 101 receives the image signal and sends it to the separating unit 102.

The separating unit 102 judges whether the image signal received from the broadcast receiving unit 101 is a text-multiplexed broadcast signal, and if so, separates the character data signal from the image signal. It sends the image signal to the display unit 103 and converts the separated character data signal into character codes. The separating unit 102 then stores the set of converted character codes in the document storage unit 104 as one set of document data and, having referred to the clock unit 107, records the reception time in the document.

Here, each set of document data is also provided with content information which shows its content.

When the reception signal received from the broadcast receiving unit 101 is not a text-multiplexed broadcast signal, the separating unit 102 sends the reception signal as it is to the display unit 103. Accordingly, the display unit 103 is also informed when the broadcast receiving unit 101 receives image signal having received an indication from the operation execution unit 106.

The display unit 103 is made up of a TV receiver which reproduces the images and sound in the TV broadcasts received by the broadcast receiving unit 101. Under the control of the display control unit 112, it also displays the documents sent in text-multiplexed broadcast signals, as well as operation menus. When the broadcast receiving unit 101 receives a predetermined image signal in accordance with a program in an execution module sent from the operation execution unit 106, this image signal will also be reproduced by the display unit 103.

The document storage unit 104 can be made up of RAM (Random Access Memory), and stores the sets of document data included in the text-multiplexed broadcast signals and their reception times, both of which are written in by the separating unit 102. This document storage unit 104 stores a plurality of sets of document data whose contents are different.

FIG. 2 shows the content of documents (1) and (2) which are stored in the document storage unit 104. The content of document data 201 which represents document (1) is shopping information which can be understood from the title "Second Hand Car Information". This document data 201 is stored together with the content information 202 "Shopping Information" and the reception time 203.

Document data 204 for document (2) is stored together with the content information 205 "Traffic Information" and the reception time 206 "14:15 Oct. 26 1995".

The sets of document data 201, 204 and the content information 202, 205 for documents (1) and (2) are transmitted by the TV station and the reception times 203, 206 are recorded by the separating unit 102.

The menu information storage unit 105 can be made up of ROM (Read Only Memory), and stores predetermined menu information for generating operation menus. This menu information corresponds to the content information for document data, such as document data 201, transmitted from the TV station. Here, FIG. 3 shows examples of the menu information stored in the menu information storage unit 105 as menu information (1) and menu information (2). It should be noted here that while the present embodiment describes the case where menu information is already stored in the menu information storage unit 105, such information may instead be transmitted by a broadcast station.

Menu information (1) shows that the information for generating an operation menu is written in as tagged information that resembles SGML (Standard Generalized Markup Language). This menu information (1) corresponds to the content information of the document data 201 "Traffic Information". This is to say, the operation menu for "Traffic Information" shown by menu information (1) has the operation items "Print", "Image Display", and "Show Traffic Report" as items 301, and the commands executed by the selection of each operation item as the execution operations 302. As one example, the command "print" is shown corresponding to when the operation item "Print" is selected.

In the operation menu for "Shopping Information" shown by menu information (2), the operations "Show Details", "Print", and "Order" are given as items 303, and "show image", "print" and "send fax" are given as the corresponding execution operations 304.

Figure 4:
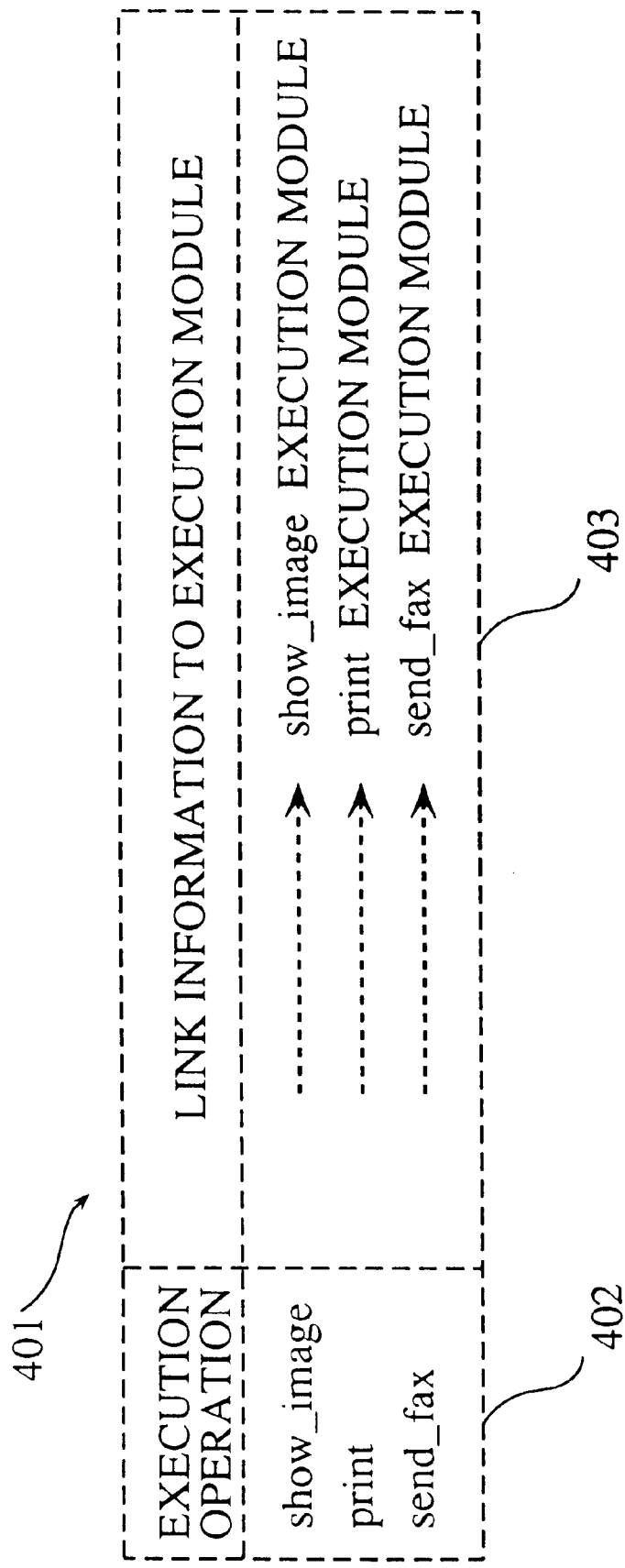
FIG. 4 shows the execution operation correspondence table stored in the operation execution unit in the present embodiment.

The operation execution unit 106 stores an execution operation correspondence table for each set of menu information. As shown in FIG. 4, execution operation correspondence table 401 stores a set of link information 403 to an execution module corresponding to each execution operation 402. It should be noted here that this execution operation correspondence table 401 corresponds to the menu information (2) shown in FIG. 3.

On receiving notification of content information and an operation item from the control unit 110, the operation execution unit 106 reads the execution operation corresponding to the item in the menu information which corresponds to the content information stored in the menu information storage unit 105. The operation execution unit 106 then has the execution module corresponding to the execution operation 402 in the execution operation correspondence table 401 for the present menu information executed. It should be noted here that this execution of the execution module will only be described by means of one specific example, since it does not form the gist of the present invention.

As one example, when document (2) in FIG. 2 and the operation menu corresponding to operation menu (1) corresponding to menu information (1) in FIG. 3 are displayed by the display unit 103, and notification of "Traffic Information" and the operation item "Image Display" is received from the control unit 110, the operation execution unit 106 operates in accordance with the program in the "show image" execution module in execution operation correspondence table (1) (not illustrated), and gives the broadcast receiving unit 101 an indication of the channel for image signal reception which is to be used in image display. Here, it should be noted that the transmission of an image signal is achieved by a digital satellite broadcast.

The program for the "print" execution module described above gives an indication to a printer (not illustrated) to make a hard copy of document (2) which is currently displayed on the display unit 103.

Figure 5:
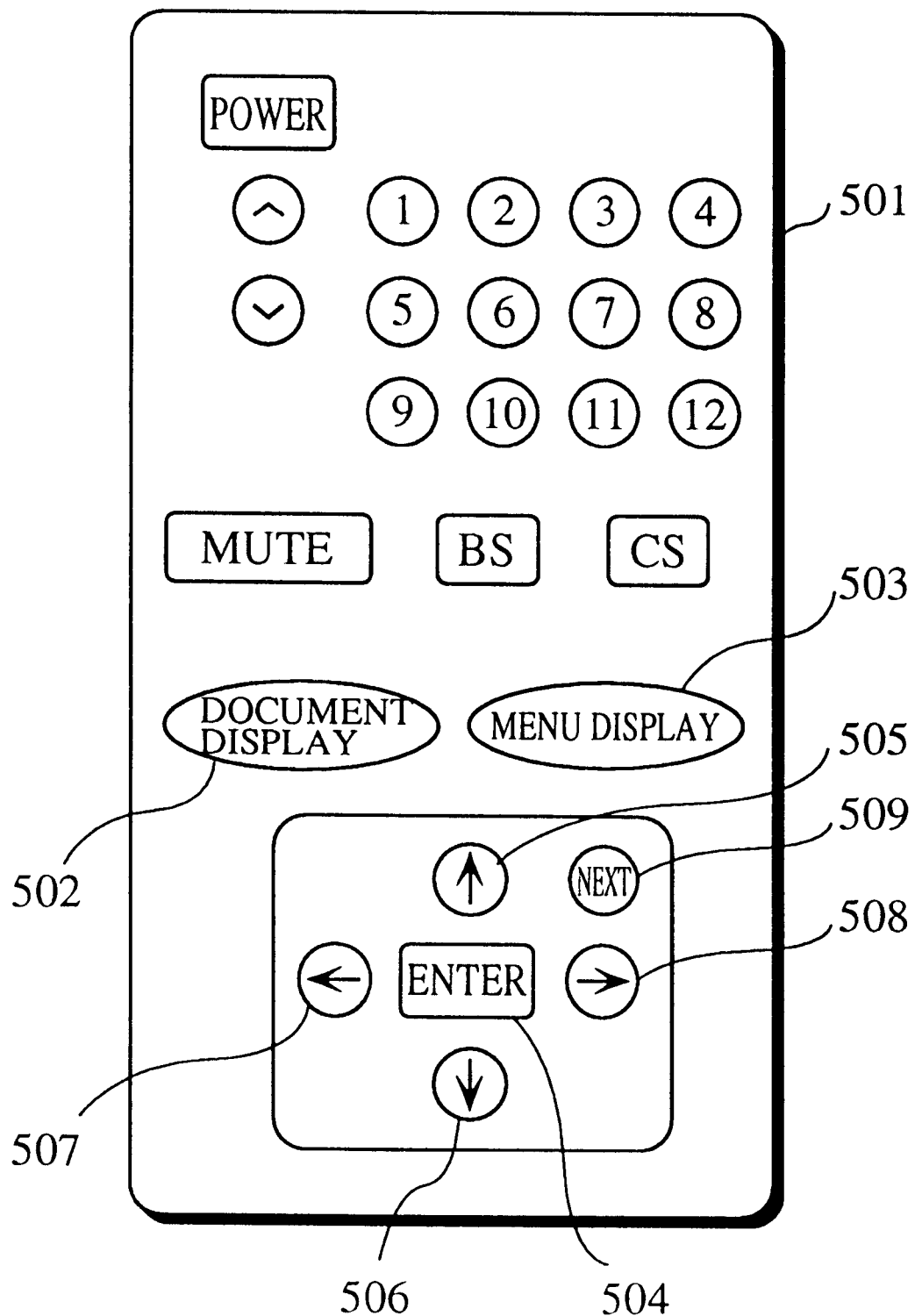
FIG. 5 shows a remote controller which is a specific example of an input operation unit in the present embodiment.

The input operation unit 108 can be composed, for example, of the remote controller 501 shown in FIG. 5, and is used to transmit an operation signal, corresponding to a user operation, to the input signal reception unit 109.

The remote controller 501 can be provided with buttons such as a "Document Display" button 502, a "Menu Display" button 503, an "Enter" button 504, an "Up" button 505, a "Down" button 506, a "Left" button 507, a "Right" button 508, and a "Next" button 509. When the user presses the "Document Display" button 502, the "Menu Display" button 503, or the "Enter" button 504, a signal requesting document display, a signal requesting menu display, or a signal for operation initiation is transmitted to the input signal reception unit 109. Similarly, when the user presses either the "Up" button 505 or the "Down" button 506, a signal for moving the focus an operation item either up or down on the display of the display unit 103 is sent to the input signal reception unit 109. Here, the "focus" of an operation item refers to a display condition, such as a highlight or shading, which allows easy discrimination of an indicated menu item from the other menu items.

On receiving a signal requesting document display, a signal requesting menu display, or a signal for operation initiation from the input operation unit 108, the input signal reception unit 109 gives the control unit 110 an indication for document display, for operation menu display, or for operation execution. In the same way, on receiving a signal to move the focus of an operation item up or down, it gives the control unit 110 an indication for up or down movement of the operation item focus.

On receiving a document display indication from the input signal reception unit 109, the control unit 110 refers to the clock unit 107 and reads the present time, before reading the reception times 203, 206 added to the sets of document data 201, 204 stored in the document storage unit 104, selecting the document data with the reception time which is closest to the present time (document data 204 in the present embodiment), and giving an indication to the display control unit 112 which identifies the selected document data.

On receiving an operation menu display indication from the input signal reception unit 109, the control unit 110 reads the content information of the document being displayed by the display control unit 112 on the display unit 103 from the document storage unit 104 and sends it to the menu generating unit 111. It should be noted here that when the control unit 110 receives an operation menu display indication and the display control unit 112 is not having a document displayed by the display unit 103, the control unit 110 sends the display control unit 112 an indication for "Error Message Display". When a document such as that shown in FIG. 6 (described below) is being displayed in the document display region 601, the control unit 110 reads the content information 205 shown in FIG. 2 and gives an indication of "Traffic Information" to the menu generation unit 111.

On receiving an indication for up or down movement of the operation item focus from the input signal reception unit 109, the control unit 110 also gives the display control unit 112 an indication for such up or down movement.

On receiving an operation execution indication from the input signal reception unit 109, the control unit 110 refers to the control status of the display control unit 112 and finds the operation item in the operation menu displayed on the display unit 103 which is currently in focus using oblique shading . The control unit 110 then notifies the operation execution unit 106 of the focussed operation item and the content information. It should be noted here that if a document and operation menu are not being displayed on the display unit 103 when the control unit 110 receives an operation execution indication, the control unit 110 sends the display control unit 112 an indication for "Error Message Display".

On receiving a notification of content information from the control unit 110, the menu generating unit 111 reads the menu information which corresponds to the content information from the menu information storage unit 105, arid generates an operation menu with the read items as operation items. It then informs the display control unit 112 of the generated operation menu.

As described above, an operation menu is generated in accordance with the content of the document which is being displayed by the display unit 103, so that the operation menu does not have a fixed content, as was the case with conventional apparatuses.

On receiving notification from the control unit 110 of document data to be displayed, the display control unit 112 reads the document data from the document storage unit 104, opens a window in the fixed region for displaying documents, and has the document displayed.

Figure 6:
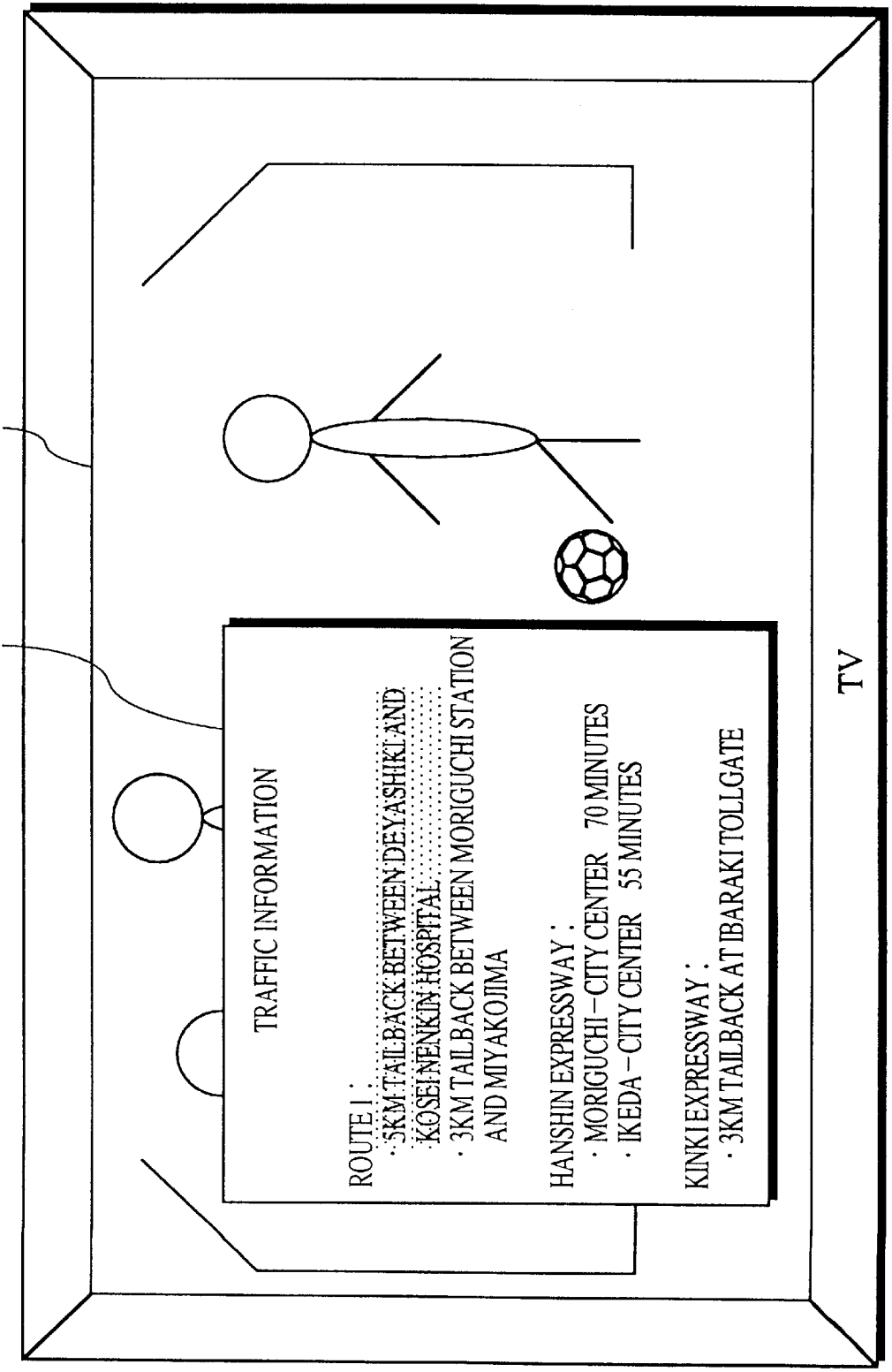
FIG. 6 shows an example display of a document on the display unit in the present embodiment.

Here, when documents (1) and (2) of FIG. 2 are stored in the document storage unit 104, the more recent of the documents, document (2), is displayed by the display unit 103, as shown in FIG. 6. Aside from the document display region 601, the display unit 103 displays a TV image. Also, the first piece of traffic information in the document in the document display region 601, "5km tailback between Deyashiki and Kosei Nenkin Hospital", is focused using shading to show that it is the default.

On receiving a notification of an operation menu generated by the menu generating unit 111, the display control unit 112 has the operation menu displayed in a predetermined menu display region of the display unit 103.

Figure 7:
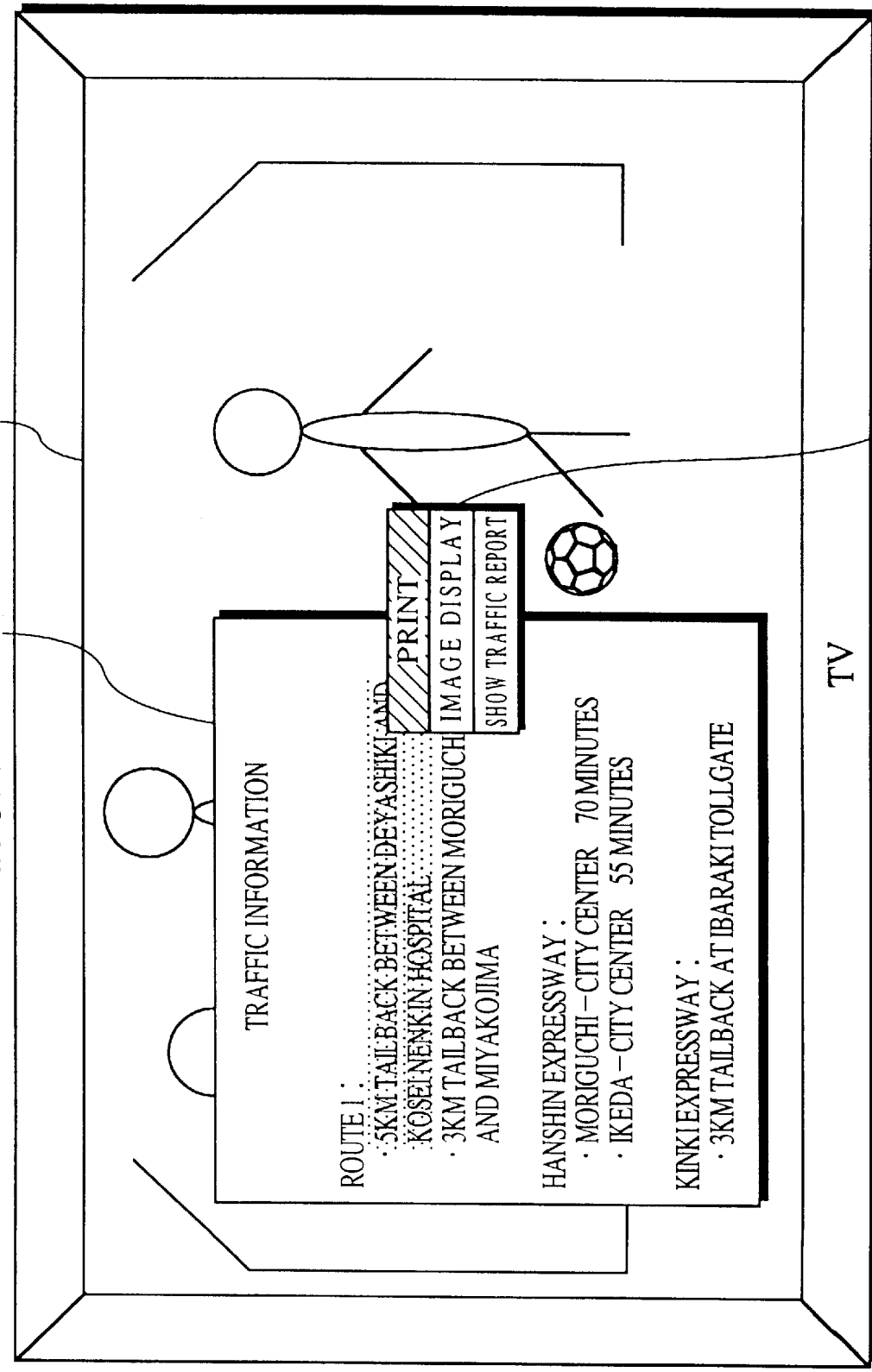
FIG. 7 shows an example display of an operation menu on the display unit in the present embodiment.

FIG. 7 shows the operation menu 701 which is displayed when document (2) is displayed in the document display region 601 as shown in FIG. 6. Here, the display control unit 112 has the first operation item in operation menu 701, "Print", focused using shading to show that it is the default.

On receiving an indication for an up or down movement of the focussed operation item from the control unit 110, the display control unit 112 moves the shaded display up or down to focus on a new operation item.

Figure 8:
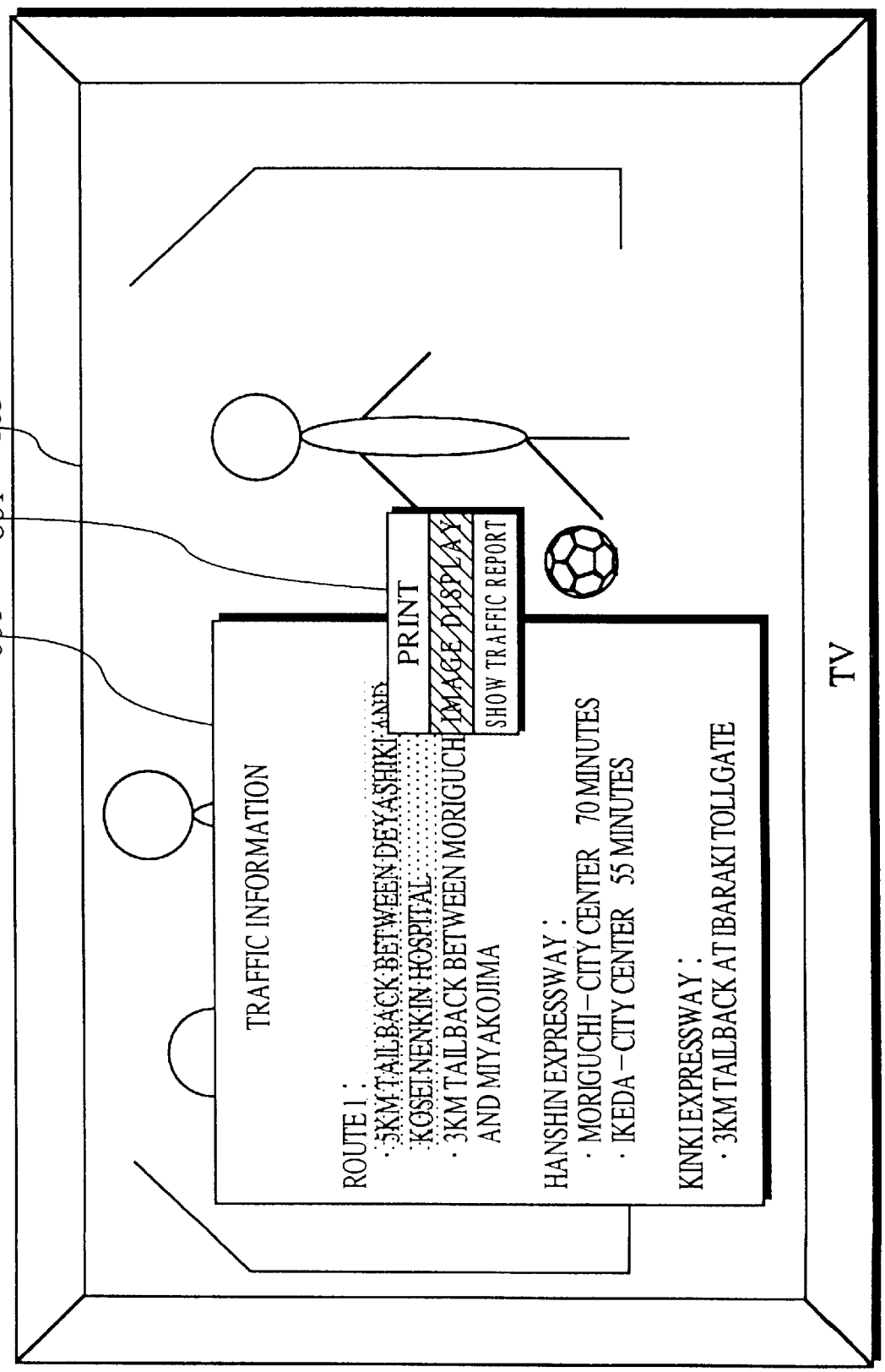
FIG. 8 also shows an example display of an operation menu on the display unit in the present embodiment.

Operation menu 801 shown in FIG. 8 shows how the display changes when a "Down" indication is received during the display of the operation menu 701 shown in FIG. 7. This drawing shows the operation item "Image Display" is newly focused as the indicated operation item.

On receiving an "Error Message Display" indication from the control unit 110, the display control unit 112 has an error panel displayed in a window provide near the document display region of the display unit 103.

When the operation menu 801 shown in FIG. 8 is being displayed by the data processing apparatus described above and the user presses the "Enter" button 504 on the remote controller 501 which is the input operation unit 108, an image depicting the currently focused item "5km tailback between Deyashiki and Kosei Nenkin Hospital" is displayed in a different part of the display unit 103 to the document display region 601 and the menu display region.

Figure 9:
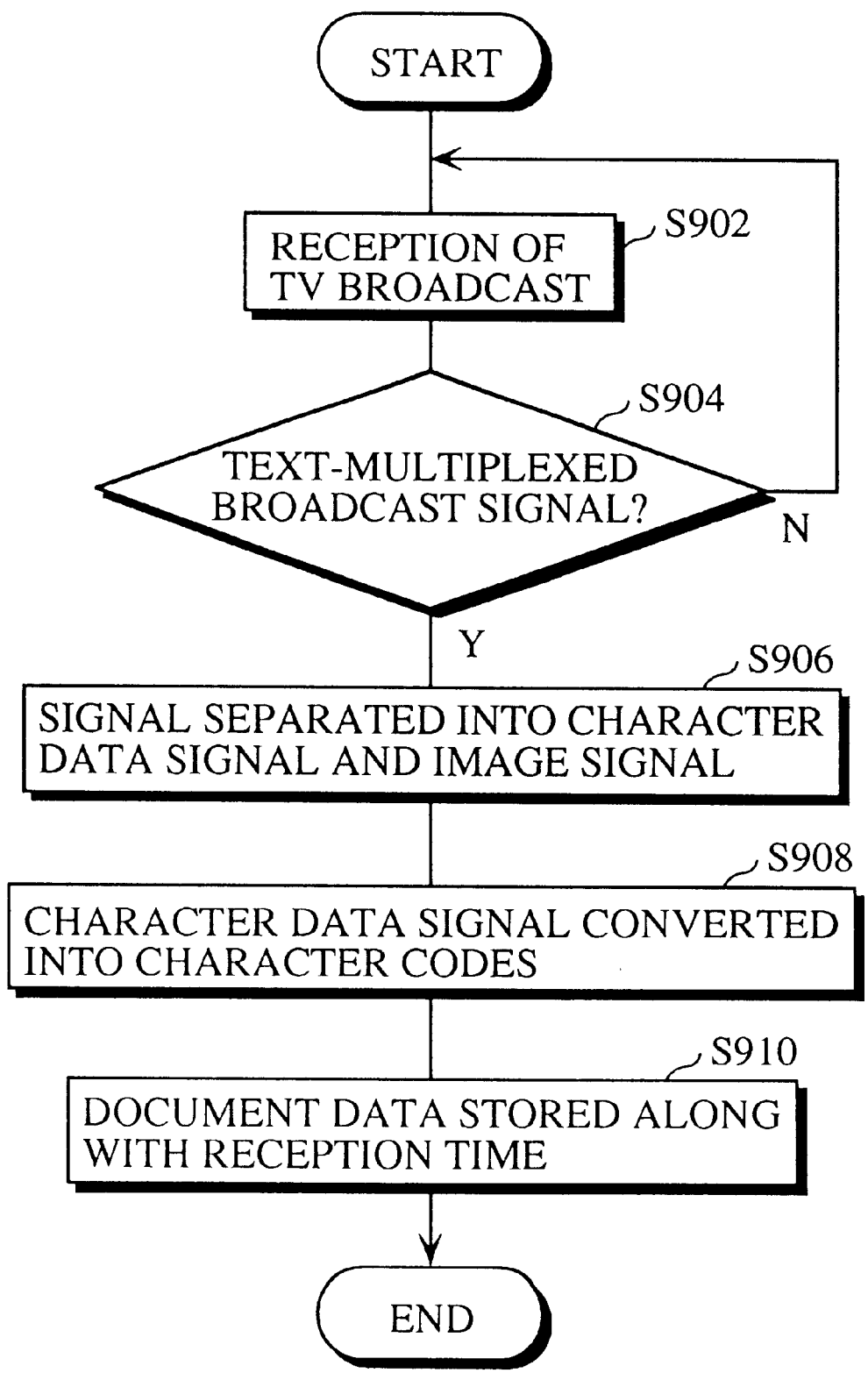
FIG. 9 is a flowchart for explaining the operation which has a document stored in the document storage unit of the present invention.
Figure 10:
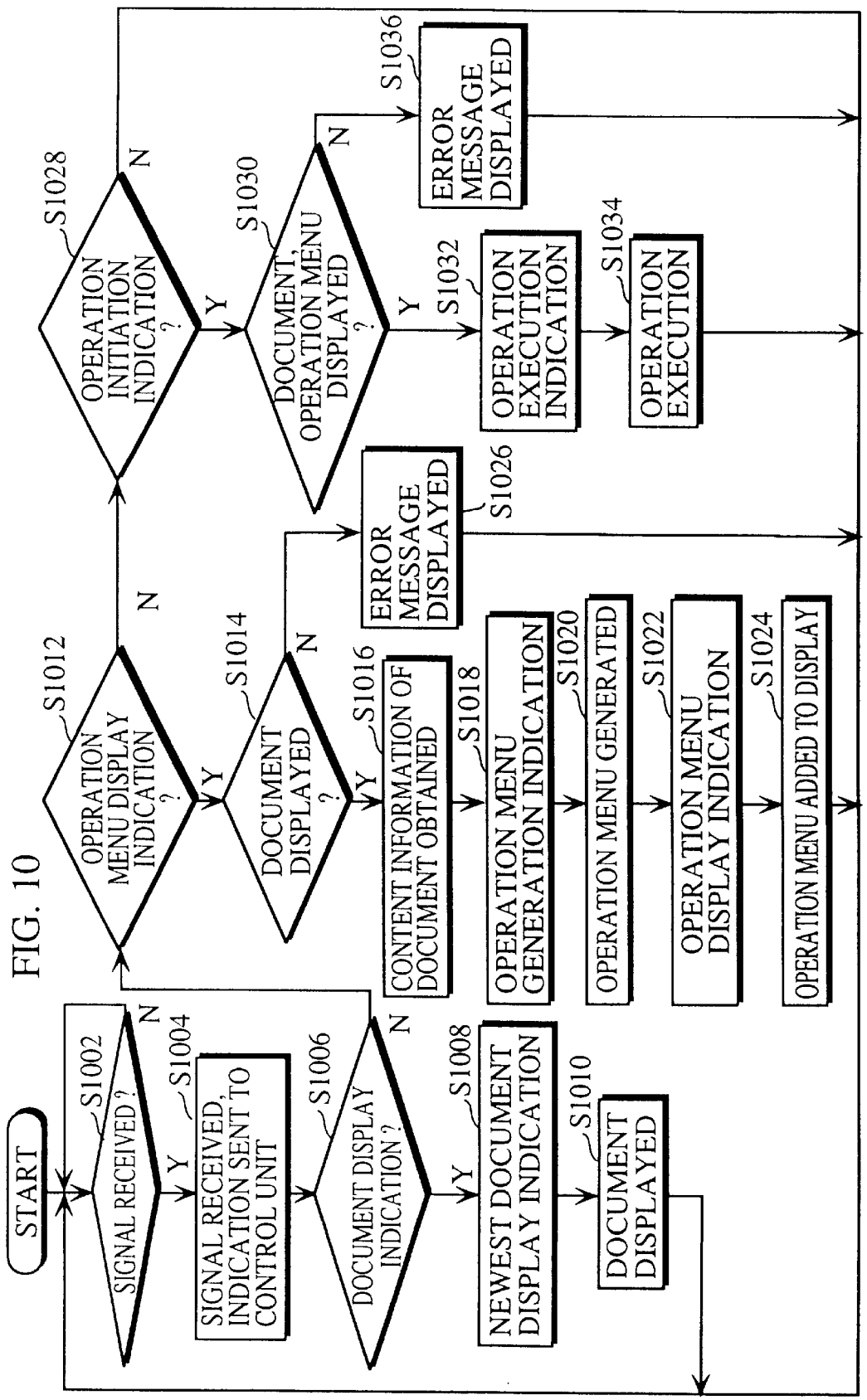
FIG. 10 is a flowchart for explaining the display operation for the display unit in the present embodiment.

The following is an explanation of the operation of the present embodiment with reference to the flowcharts in FIGS. 9 and 10. FIG. 9 shows the processing as, far as the storage of the received document in the document storage unit 104, and FIG. 10 shows the processing as far as the display of the document and operation menu on the display unit 103 and the operation execution.

First, the broadcast receiving unit 101 receives a TV broadcast (S902).

The separating unit 102 judges whether the TV broadcast received by the broadcast receiving unit 101 is a text-multiplexed broadcast signal (S904). If the signal is not a text-multiplexed broadcast signal, a return is performed to step S902, but if the received signal is a text-multiplexed broadcast signal, the separating unit 102 separates the character data signal and the image signal (S906). The separating unit 102 then converts the separated character data signal into character codes (S908), and has the character codes stored in the document storage unit 104 as document data to which the reception time is added (S910).

The input signal reception unit 109 waits for the transmission of an operation signal from the input operation unit 108 (S1002). On receiving an operation signal, the input signal reception unit 109 gives the control unit 110 a notification showing the nature of the received operation signal (S1004).

The control unit 110 judges whether the received indication is a document display indication (S1006), and if not advances to S1012. On receiving a document display indication, the control unit 110 gives the display control unit 112 a display indication for a most recently received document in the document storage unit 104 (S1008).

The display control unit 112 has the display unit 103 display the document (S1010), and the processing returns to S1002.

In S1012, the control unit 110 judges whether the indication from the input signal reception unit 109 is an operation menu display indication, and if not, the processing advances to S1028. If the received indication is an operation menu display indication, the control unit 110 judges whether a document is already being displayed by the display unit 103 (S1014). When no document is being displayed, the control unit 110 gives the display control unit 112 an indication for error message display. The display control unit 112 then has an error message displayed by the display unit 103 (S1026), and the processing returns to S1002. When a document is being displayed, the control unit 110 obtains the content information for the document currently being displayed by the display unit 103 (S1016).

The control unit 110 informs the menu generating unit 111 of the obtained content information and gives an indication for operation menu generation (S1018).

The menu generating unit 111 reads the menu information corresponding to the content information from the menu information storage unit 105, generates an operation menu (S1020), and informs the display control unit 112 of the generated operation menu (S1022). The display control unit 112 has the operation menu displayed by the display unit 103 in addition to the document being displayed (S1024), and the processing returns to S1002.

In S1028, the control unit 110 judges whether the indication from the input signal reception unit 109 was an operation initiation indication, and if not, the processing returns to S1002. If the indication was an operation initiation indication, the control unit 110 judges whether a document and an operation menu are being displayed and whether an operation item is currently in focus (S1030). If not, the display control unit 112 has an error message displayed (S1036), and the processing returns to S1002. On the other hand, when an operation item is in focus, the control unit 110 gives an indication for operation execution to the operation execution unit 106 (S1032).

The operation execution unit 106 performs operation execution in accordance with the focused operation item (S1034) and the processing returns to S1002.

It should be noted here that while the present embodiment states that the displayed operation menus charge in accordance with the content of the document being displayed, it is equally possible for the displayed operation menus to change with the different "key words" in the document being displayed.

In more detail, when the expression "traffic jam" is included in a document, an operation menu corresponding to the content information "Traffic Information" in the menu information may be displayed, or when the words "second hand car" appear in a document, an operation menu corresponding to the content information "Shopping Information" in the menu information may be displayed.

The present embodiment states that the content information for changing the displayed operation menus is transmitted from a TV station, although the reception time added to document data by the separating unit 102 may instead be used to change the content of operation menus. In such a situation, menu information corresponding to reception times is stored in the menu information storage unit 105.

Second Embodiment

Figure 11:
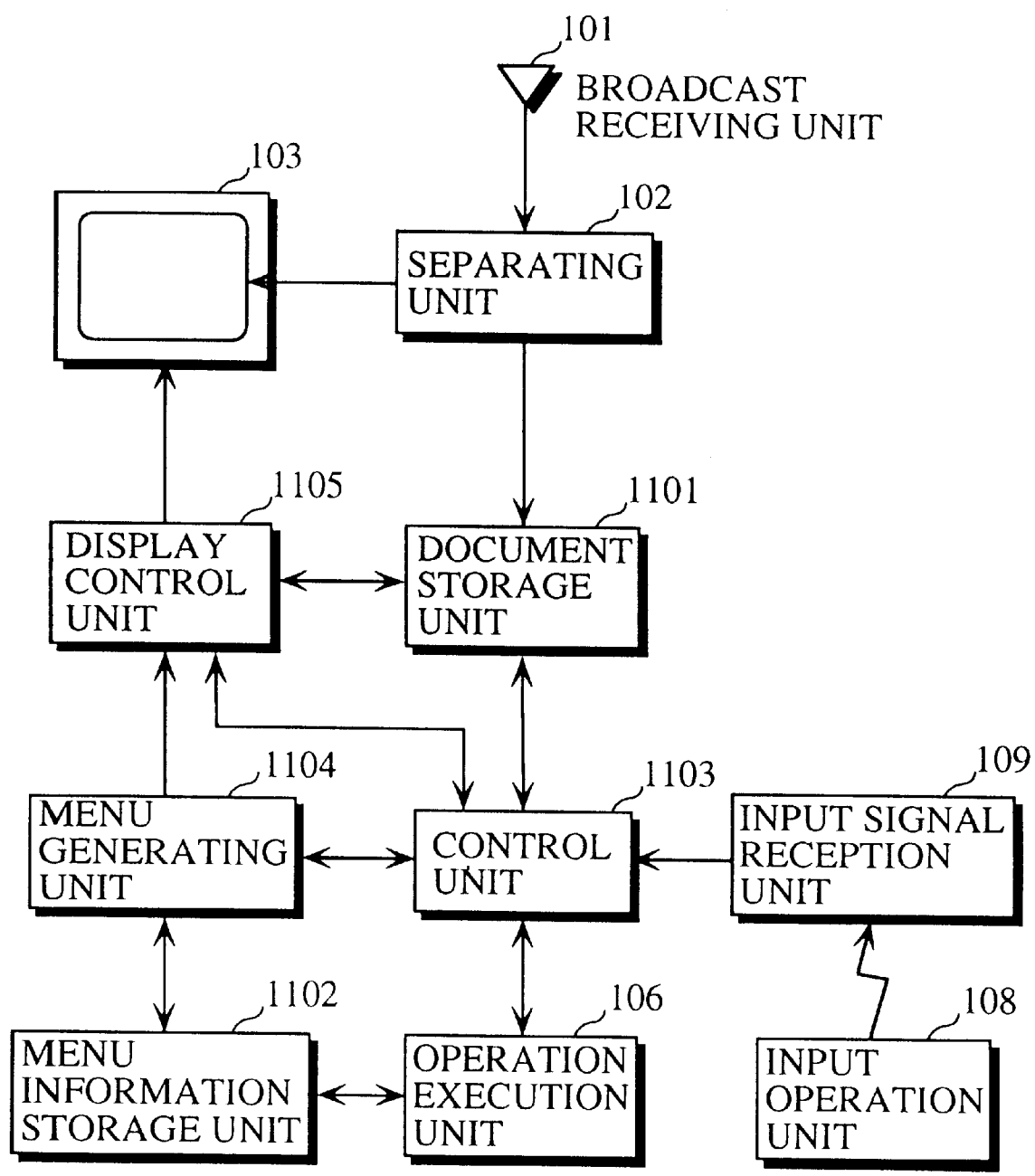
FIG. 11 shows the construction of the data processing apparatus of the second embodiment of the present invention.

The construction of the data processing apparatus of the second embodiment of the present invention is shown in FIG. 11. As shown in the drawing, the data processing apparatus is composed of a broadcast receiving unit 101, a separating unit 102, a display unit 103, a document storage unit 1101, a menu information storage unit 1102, an operation execution unit 106, an input operation unit 108, an input signal reception unit 109, a control unit 1103, a menu generating unit 1104, and a display control unit 1105. Here, construction elements which are the same as the first embodiment have been given the same reference numerals and their explanation has been omitted, so that the following explanation will focus on the elements which are unique to the present embodiment.

The document storage unit 1101 can be made up of RAM or the like, and stores document data transmitted in text-multiplexed broadcasts, key words included in the document data, and a list of attributes of the key words. Here, "key words" are phrases in the document data to which operation menus have been attached.

FIG. 12 shows an example of the content of program data 1201 which is document data that includes key words. Program data 1201 includes a plurality of key words 1202, 1203, 1204, . . . which have each been underlined.

Figure 13:
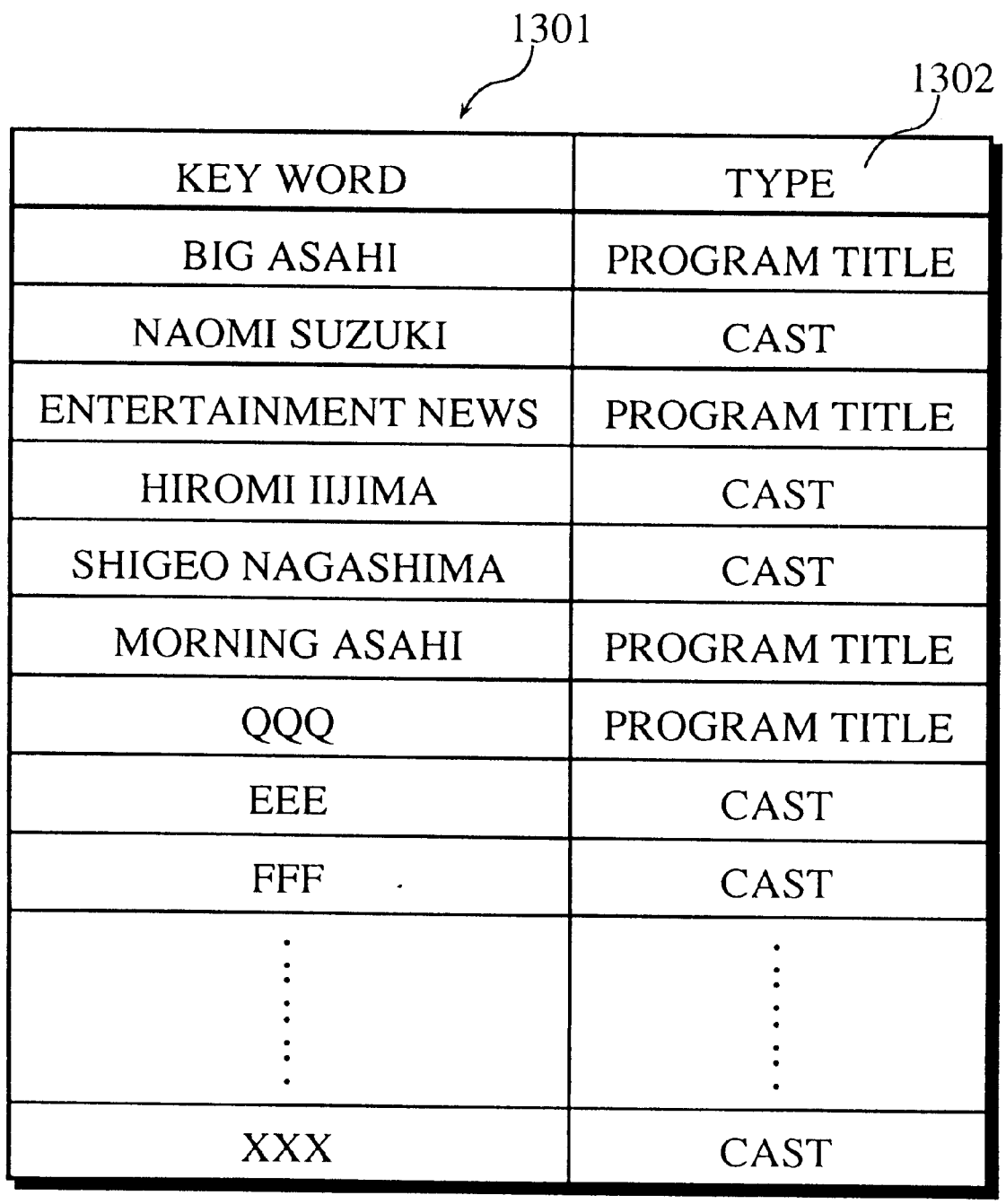
FIG. 13 is a table which shows the key words stored in the document storage unit of the present invention and their types.

FIG. 13 shows a table 1301 made up of each of the key words 1202, 1203, 1204, . . . included in the program data 1201, and types 1302 which are the attributes of the key words. As examples, the type of the key word "Entertainment News" is "program title", and the type of the key word "Hiromi Iijima" is "cast". Here, types are names of classifications which are used to classify the content of key words.

The menu information storage unit 1102 can be composed of ROM, and stores predetermined menu information for generating operation menus. Here, FIG. 14 shows menu information 1401, 1402 stored by the menu information storage unit 1102. In this figure, menu information 1401 represents menu information (1) corresponding to the type of key word "program title", while menu information 1402 represents menu information (2) corresponding to the type of key word "cast".

Menu information 1401 includes each operation item to be displayed as part of an operation menu as items 1403 and execution operations 1404 to be performed corresponding to a selection of each item 1403. Menu information 1402 is the same.

As in the first embodiment, when the user presses the "Left" button 507 or the "Right" button 508 on the input operation unit 108, a signal for moving the focus to the previous or next key word is transmitted to the input signal reception unit 109. Here, the conception of previous and next key words is set so that the programs in a part of the program guide 1501 shown in FIG. 15 for an earlier time band are considered as previous, with, for a same time band, a key word at top left being first and a key word at bottom left being last.

On receiving a signal from the input operation unit 108 indicating movement of the key word focus to a previous or next key word, the input signal reception unit 109 gives an indication for movement of the key word focus to either the previous or next key word to the control unit 1103.

On receiving an indication for document display from the input signal reception unit 109, the control unit 1103 directs the display control unit 1105 to have the program data 1201 stored in the document storage unit 1101 displayed on the display unit 103.

On receiving an indication for menu display from the input signal reception unit 109, the control unit 1103 refers to the display control unit 1105 to find out which key word in the program guide 1501 displayed by the display unit 103 is currently in focus, before reading the type corresponding to the focused key word from the table 1301 in the document storage unit 1101. It then informs the display control unit 1104 of this corresponding type.

On receiving a signal from the input signal reception unit 109 for moving a focus of the key word to a previous or next key word, the control unit 1103 gives an indication to the display control unit 1105 to have the key word focus moved from its present position to either the previous or next key word.

On being informed by the control unit 1103 of the type of key word, the menu generating unit 1104 reads either menu information (1) or menu information (2) corresponding to this type from the menu information 1401, 1402 stored by the menu information storage unit 1102 and generates an operation menu which has every item 1403 as its operation items. It then sends the generated operation menu to the display control unit 1105.

On receiving an indication for a display of program data 1201 from the control unit 1103, the display control unit 112 reads the program data 1201 from the document storage unit 1101 and, as shown in FIG. 15, has the program table 1501 displayed in a window provided on the display unit 103. Here, techniques for generating a program guide from program information are already well-known in the U.S.A. in such fields as CATV.

The program guide 1501 is composed so that programs broadcast at each time band 1503 and their cast are written for each TV channel 1502, with key words being provided with an underline 1504.

On being informed of the operation menu generated by the menu generating unit 1104, the display control unit 1105 prepares a window to the bottom right of a key word which is currently in focus and displays the operation menu in this window.

On receiving an indication from the control unit 1103 to move to the focus display to a previous or next key word, the display control unit 1105 has the focus display moved from the current key word to the previous or next key word so that the new key word is displayed in focus using shading on the display unit 103.

It should be noted here that when the program guide is first shown on the display 103, the first key word is displayed with a highlight as the default.

Here also, since the same construction elements are provided and the control unit 1103 is provided with the same functions as the control unit 110 in the first embodiment, changes in the focus status of the operation items in the operation menu are handled in the same way as before.

The following is an explanation of specific examples Of user operations of the remote controller 501 which is used as input operation unit 108 and of operation menus displayed by the display unit 103 for the data processing apparatus constructed as described above.

Figure 18:
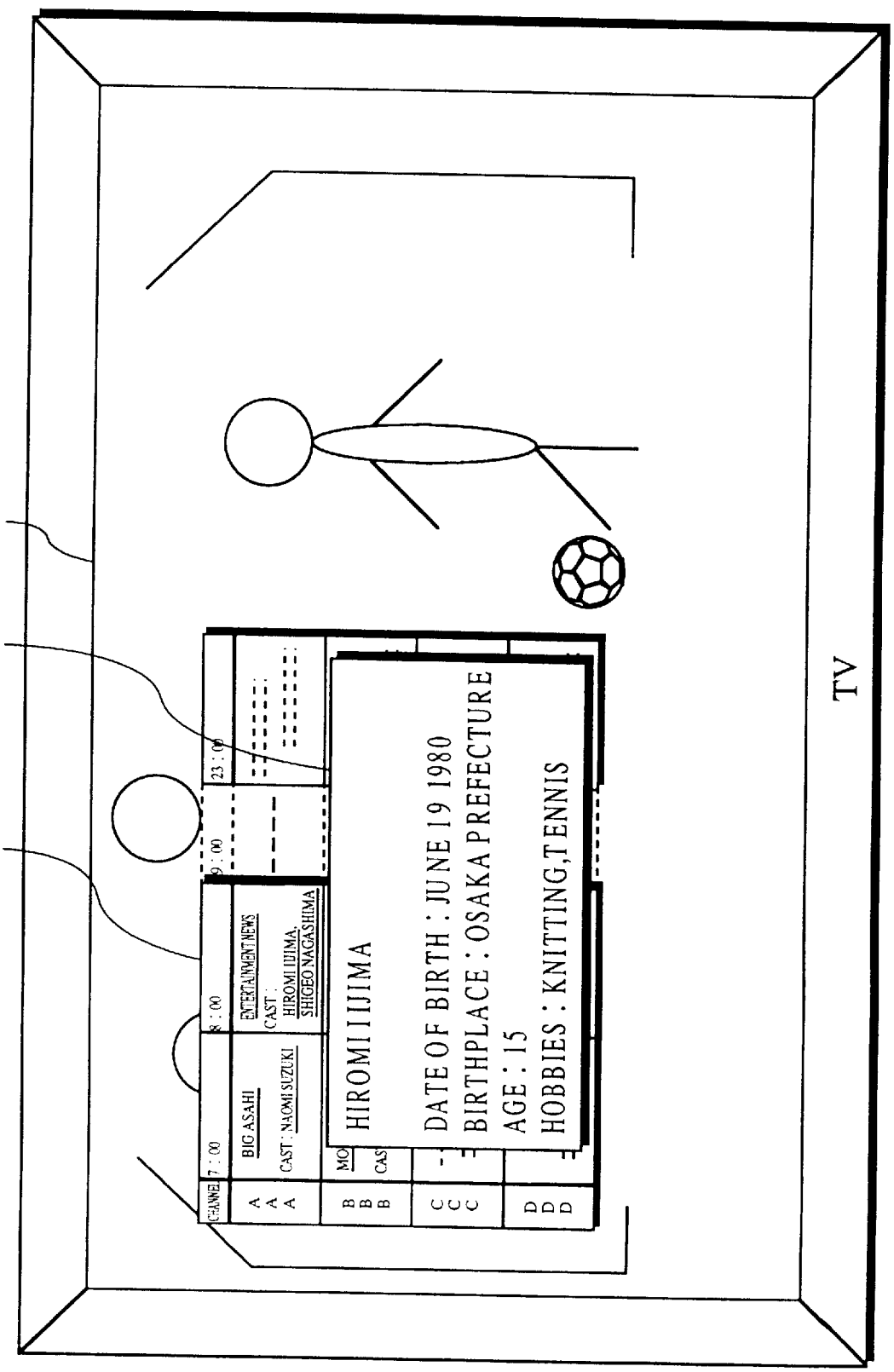
FIG. 18 is an example data display of the display unit for an operation execution by the present embodiment.

The following explanation assumes that the program guide 1501 shown in FIG. 15 is displayed in a window by the display unit 103 and the key word "Entertainment News" is currently in focus. Here, if the user presses the "Menu Display" button 503, the display control unit 1105 has the operation menu 1601 for the type "program title" corresponding to "Entertainment News" displayed. If the user then presses the "Right" button 508 and the "Menu Display" button 503, the operation menu 1701 for the type "cast" corresponding to the key word "Hiromi Iijima" is displayed. If the user presses the "Down" button 506 and then the "Enter" button 504, the operation execution unit 106 executes the program in the "show profile" execution module for the operation item "show profile", and the display control unit 1105 has the display of the display unit 103 changed to that shown in FIG. 18. As a result, a window showing the profile 1801 of the key word "Hirorni Iijima" is displayed overlapping the window which displays the program guide 1501. It should be noted here that the profile of "Hiromi Iijima" which is necessary for the execution of the program in this "show profile" execution module and the mail address which is necessary for the execution of the program in the "mail" execution module are transmitted as character data in the text-multiplexed broadcast and are stored by the operation execution unit 106. This operation execution unit 106 is also capable of sending electronic mail via a network which is not illustrated in the drawings, and stores photographs and the like in a data base which is readied beforehand.

Figure 19:
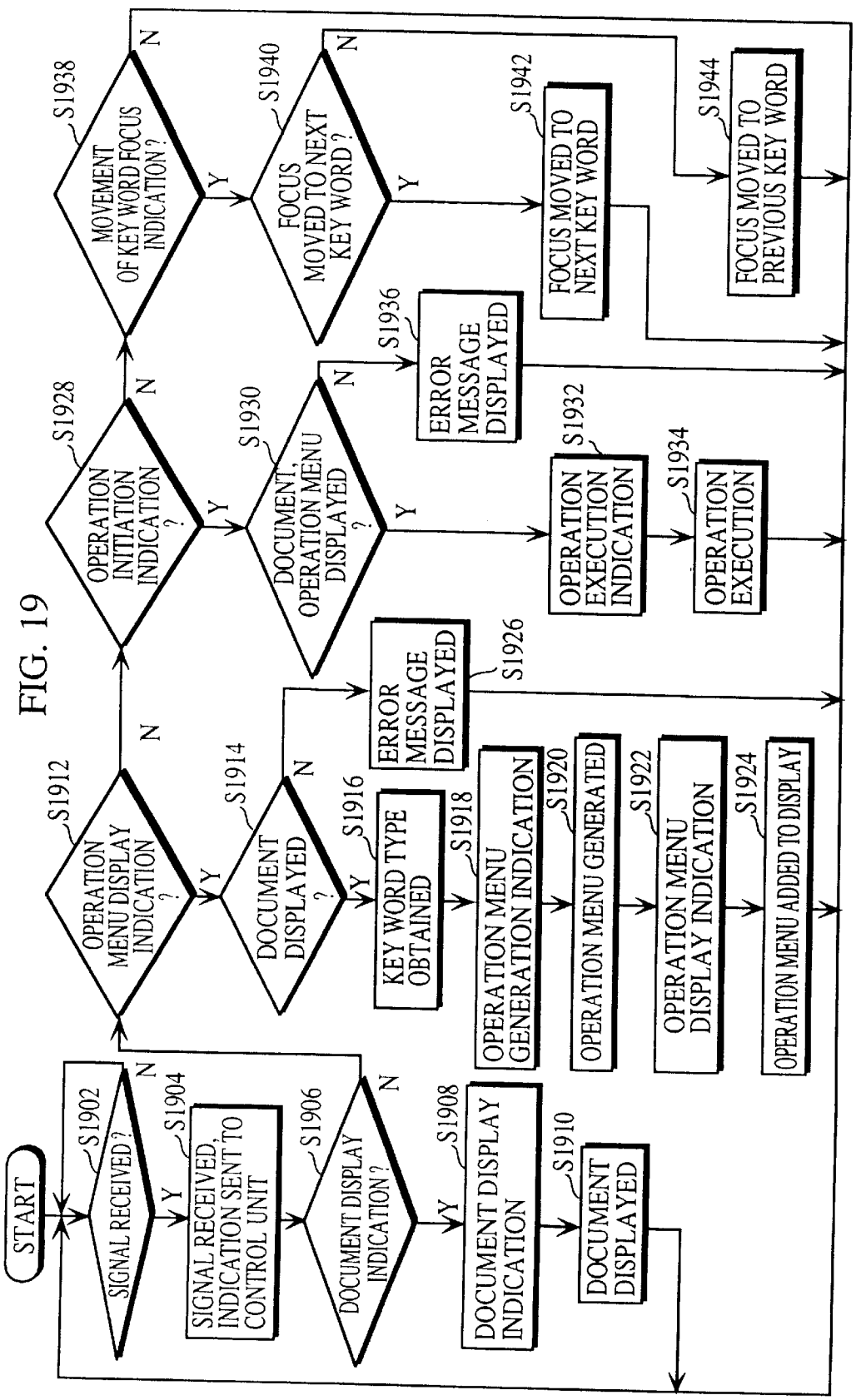
FIG. 19 is a flowchart for explaining the operation of the present embodiment.

The following is an explanation of the operation of the present embodiment with reference to the flowchart in FIG. 19. Here, the storage of the received document in the document storage unit 104 is the same as in the first embodiment, so that no further description of this operation will be given. As a slight difference, it is not necessary to record the reception time in the program data 1201, so that that operation is omitted.

The input signal reception unit 109 waits for the transmission of an operation signal from the input operation unit 108 (S1902). On receiving an operation signal, the input signal reception unit 109 gives the control unit 1103 a notification showing the nature of the received operation signal (S1904).

The control unit 1103 judges whether the received indication is a document display indication (S1906), and if not, the processing advances to S1912. On receiving a document display indication, the control unit 1103 gives the display control unit 1105 a display indication for a received document which is stored in the document storage unit 1101 (S1908).

The display control unit 1105 has the display unit 113 display the document (Sl910), and the processing returns to S1902.

In S1912, the control unit 1103 judges whether the indication from the input signal reception unit 109 is an operation menu display indication, and if not, the processing advances to S1928. If the received indication is an operation menu display indication, the control unit 1103 judges whether a document is already being displayed by the display unit 103 (S1914). When no document is being displayed, the control unit 1103 gives the display control unit 1105 an indication for error message display. The display control unit 1105 then has an error message displayed by the display unit 103 (S1926), and the processing returns to S1902. When a document is being displayed, the control unit 1103 obtains the key word which is currently in focus in the document being displayed by the display unit 103, and then obtains the type which is the key word attribute for this obtained key word (S1916).

The control unit 1103 informs the menu generating unit 1104 of the obtained key word attribute and gives an indication for operation menu generation (S1918).

The menu generating unit 1104 reads the menu information corresponding to the key word attribute from the menu information storage unit 1102, generates an operation menu (S1920), and informs the display control unit 1105 of the generated operation menu (S1922). The display control unit 1105 has the operation menu displayed by the display unit 103 in addition to the document being displayed (S1924), and the processing returns to S1902.

In S1928, the control unit 1103 judges whether the indication from the input signal reception unit 109 was an operation initiation indication, and if not, the processing advances to S1938. If the indication was an operation initiation indication, the control unit 1103 judges whether a document and an operation menu are being displayed and whether an operation item is currently in focus (S1930). If not, the display control unit 1103 has an error message displayed (S1936), and the processing returns to S1902. On the other hand, when a document and an operation are being displayed and an operation item is in focus, the control unit 1103 gives an indication for operation execution to the operation execution unit 106 (S1932).

The operation execution unit 106 performs operation execution in accordance with the operation item (S1934) and the processing returns to S1902.

In S1938, the control unit 1103 judges whether the indication from the input signal reception unit 109 was an indication to move the key word focus, and if not, the processing returns to S1902. If the indication was an indication to move the key word focus, the control unit 1103 judges whether it was an indication to move the focus to a next key word (S1940). If so, the display control unit 1105 moves the key word focus to the next key word (S1942), or, if the indication was not for the next key word, the display control unit 1105 moves the key word focus to the previous key word (S1944) and the processing returns to S1902.

It should be noted here that while the "type" attribute of each key word is stored in a different table 1301, shown in FIG. 13, to the program data 1201 in the present embodiment, this "type" attribute of each key word may instead be added to the program data 1201.

The present embodiment also states that key words are already indicated in the program data 1201 stored in the document storage unit 1101, although it is also possible for key words in the kind of table 1301 of key words and type attributes shown in FIG. 13 to be extracted from the program data 1201 using a conventional key word extraction technique. An example of such a technique is disclosed in "Processing Japanese Language Information" by Tanaka et. al, edited by Takahashi, published by Kindai Kagakusha.

Finally, the present embodiment describes the case when the added operation menus are changed in accordance with the "type" attribute of key words, although a different added menu may be used for each different key word.

Third Embodiment

Figure 20:
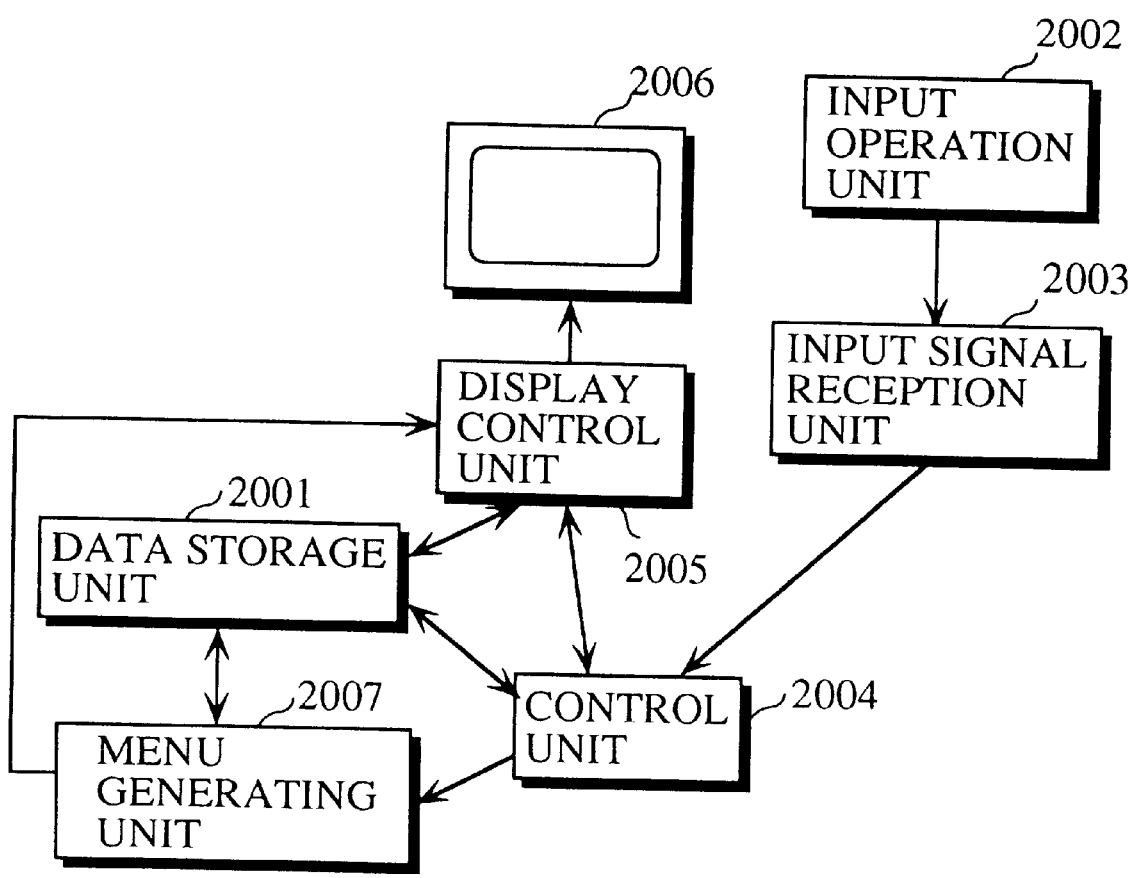
FIG. 20 shows the construction of the data processing apparatus of the third embodiment of the present invention.

The construction of the data processing apparatus of the third embodiment of the present invention is shown in FIG. 20. As shown in the drawing, the data processing apparatus is composed of a data storage unit 2001, an input operation unit 2002, an input signal reception unit 2003, a control unit 2004, a display control unit 2005, a display unit 2006, and a menu generating unit 2007.

Figure 21:
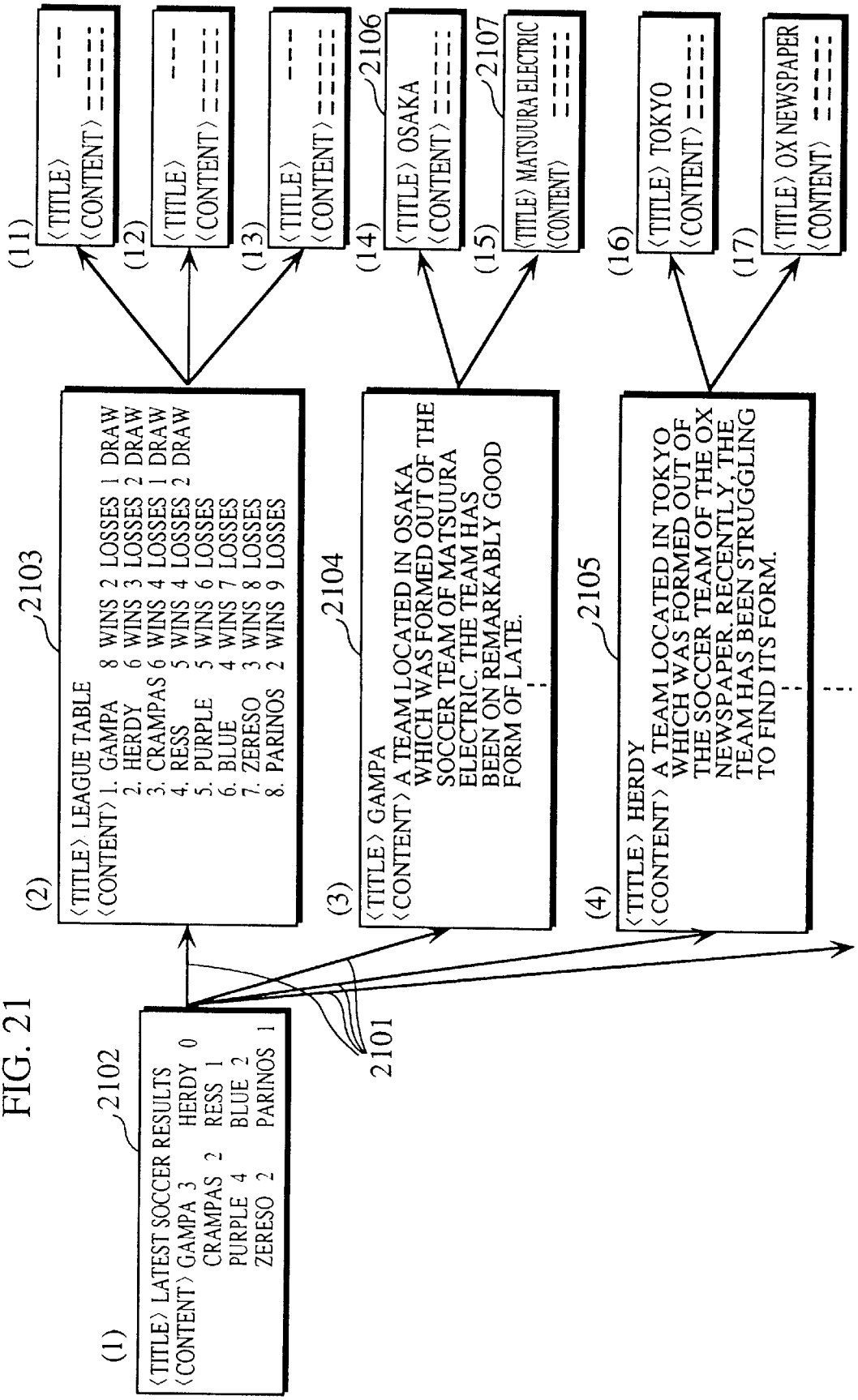
FIG. 21 shows the data stored in the data storage unit of the present embodiment.

The data storage unit 2001 can be made up of RAM and ROM, and, as shown in FIG. 21, stores a plurality of documents (sets of document data). Sets of document data are made up of a title and a content and are linked together as shown by the arrows 2101 in FIG. 21. As one example, the title of data 2102 for document (1) is "Latest Soccer Results" and the content is "Gampa 3 Herdy 0 . . . ". This data 2102 is linked to data 2103, 2104, 2105, etc. In the same way, data 2104 is linked to data 2106 and 2107, with data 2103, 2105 being similarly linked to other sets of data.

The input operation unit 2002 has the same construction as the remote controller 501 in the first embodiment, except that the operations corresponding to the user pressing the "Next" button 509, the "Right" button 508, and the "Enter" button 504 are different. When the user presses the "Next" button 509, the remote controller 501 transmits a signal indicating movement of the menu item focus to the input signal reception unit 2003. Here, movement of the menu item focus refers to movement of the focus display to the menu item at a next lower position. When the user presses the "Right" button 508, the remote controller 501 transmits a signal indicating hierarchical menu display to the input signal reception unit 2003. Here, hierarchical menu display refers to the addition of a menu which has a menu item corresponding to data linked to the data corresponding to the menu item in focus. When the user presses the "Enter" button 504, the remote controller 501 transmits a signal indicating updated display for the data corresponding to the menu item in focus to the input signal reception unit 2003.

It should be noted here that the remote controller 501 transmits a signal indicating initial data display to the input signal reception unit 2003 when the user presses the "Document Display" button 502, and a signal indicating menu display for the displayed data to the input signal reception unit 2003 when the user presses the "Menu Display" button 503.

On receiving the operation signal sent from the input operation unit 2002, the input signal reception unit 2003 sends an indication to the control unit 2004 in accordance with the content of the operation signal.

The control unit 2004 judges whether the indication from the input signal reception unit 2003 is a data display indication, a menu display indication, a movement of the menu item focus indication, a hierarchical menu display indication, or an updated data display indication.

On receiving a data display indication, the control unit 2004 refers to the display control unit 2005 and judges whether data is already being displayed by the display unit 2006. If no data is being displayed, the control unit 2004 gives the display control unit 2005 an indication for data display.

On receiving a menu display indication, the control unit 2004 refers to the display control unit 2005 and judges whether data is already being displayed by the display unit 2006. If data is being displayed, the control unit 2004 judges whether data is already being displayed by the display unit 2006. When it judges that no menu is being displayed, the control unit 2004 refers to the display control unit 2005 to obtain the title of the data being displayed, and informs the menu generating unit 2007 of this title.

On receiving a movement of the menu item focus indication, the control unit 2004 judges whether data and a menu are already being displayed. If so, the control unit 2004 informs the display control unit 2005 of a movement of the focus of a menu item.

On receiving a hierarchical menu display indication, the control unit 2004 judges whether data and a menu are being displayed by the display unit 2006. If so, the control unit 2004 obtains the menu item which is currently in focus from the display control unit 2005 and refers to the data storage unit 2001 to judge whether there is any data which is linked to the data which corresponds to the focused menu item. When there is such linked data, the control unit 2004 gives the menu generating unit 2007 the menu item in focus and an indication to add the generated menu.

On receiving an updated data display indication, the control unit 2004 judges whether data and a menu are being displayed, and if so, gives the display control unit 2005 an indication to update the data display.

On receiving an indication for data display from the control unit 2004, the display control unit 2005 opens a window in the data display region provided on the display unit 2006, reads the data stored at the top of the data storage unit 2001, and has this data displayed in the window.

On receiving notification of a menu generated by the menu generating unit 2007, the display control unit 2005 opens a window provided in the menu display region which slightly overlaps the data display region of the display unit 2006, and has the menu displayed in this window.

On receiving an indication for movement of the menu item focus from the control unit 2004, the display control unit 2005 moves the focus display from the menu item which is currently being in focus with the oblique shading to the next lowest menu item. When the lowest menu item is currently in focus, the next movement of the menu item focus returns the focus display to the menu item at the top of the menu. This menu item which is currently displayed to show that it is currently in focus is also stored separately so that it can be quickly obtained by the control unit 2004 and other elements.

On receiving an indication of a menu generated by the menu generating unit 2007 and an indication to add the menu, the display control unit 2005 opens a window provided in a new menu display region which slightly overlaps the first menu display region on the display unit 2006 and has the menu displayed in the newly opened window.

On receiving an indication from the control unit 2004 for updating data display, the display control unit 2005 reads the data for a title which corresponds to the focused menu item from the data storage unit 2001 and updates the display in the data display region.

The display unit 2006 can be made up of a TV, a CRT computer display screen, or a liquid crystal display. The display unit 2006 displays data and menus according to control by the display control unit 2005.

On receiving an indication of a title of data from the control unit 2004, the menu generating unit 2007 refers to the set of data stored in the data storage unit 2001 which has a title which corresponds to the obtained title, and reads the title of each set of data which is linked to the present data. The menu generating unit 2007 then generates a menu which has these titles as its menu items, and informs the display control unit 2005 of this newly generated menu.

On receiving an indication from the control unit 2004 for a menu item and the addition of a generated menu, the menu generating unit 2007 finds the title corresponding to the menu item from the data stored in the data storage unit 2001 and reads the title of every set of data which is linked to the data corresponding to this title. It then generates a menu which has the read titles as its menu items and instructs the display control unit 2005 to add this generated menu.

The following is a simplified explanation of an example display of hierarchical menus which are displayed by the display unit 2006.

Figure 22:
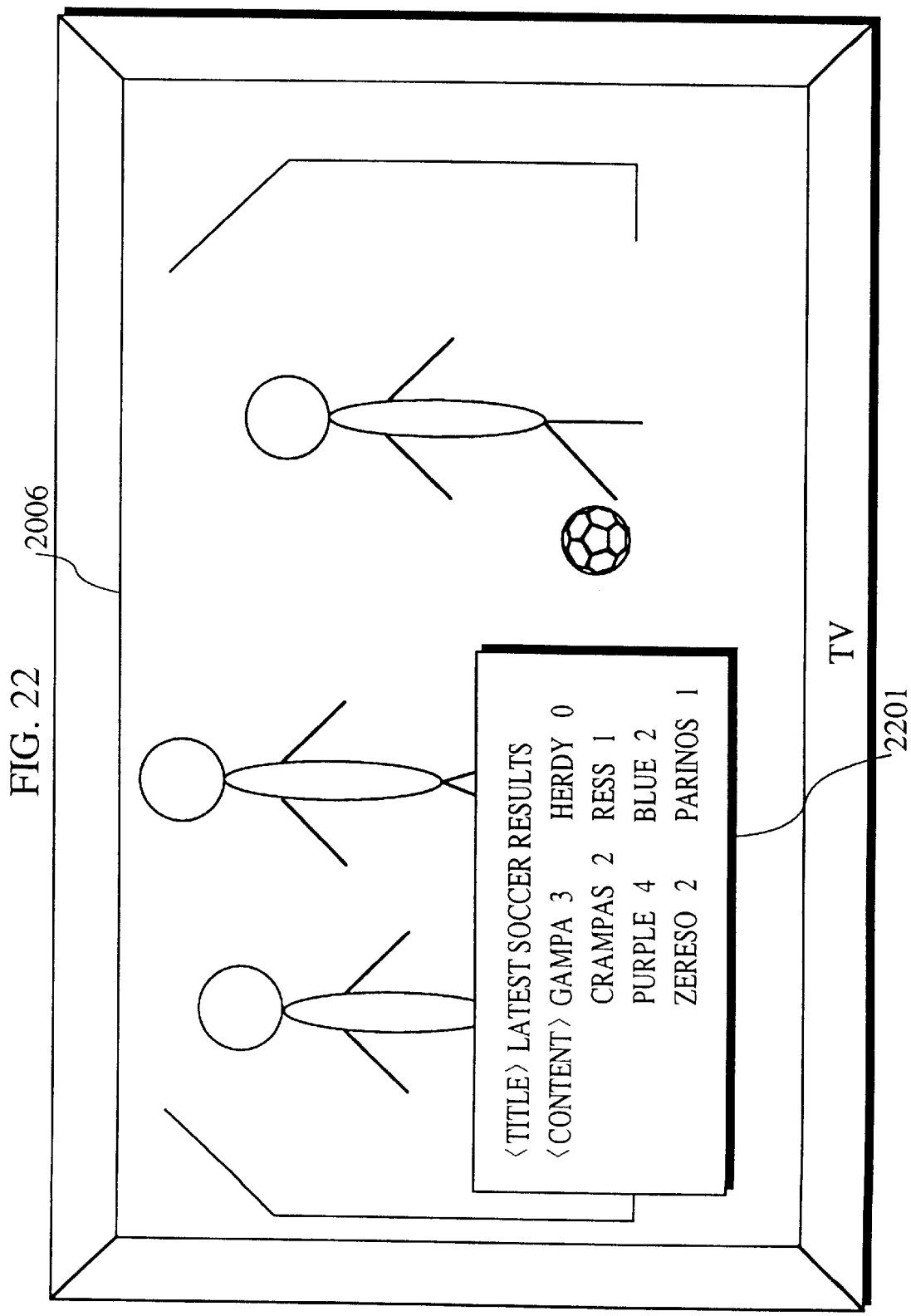
FIG. 22 is an example of display data on the display unit of the present embodiment.
Figure 23:
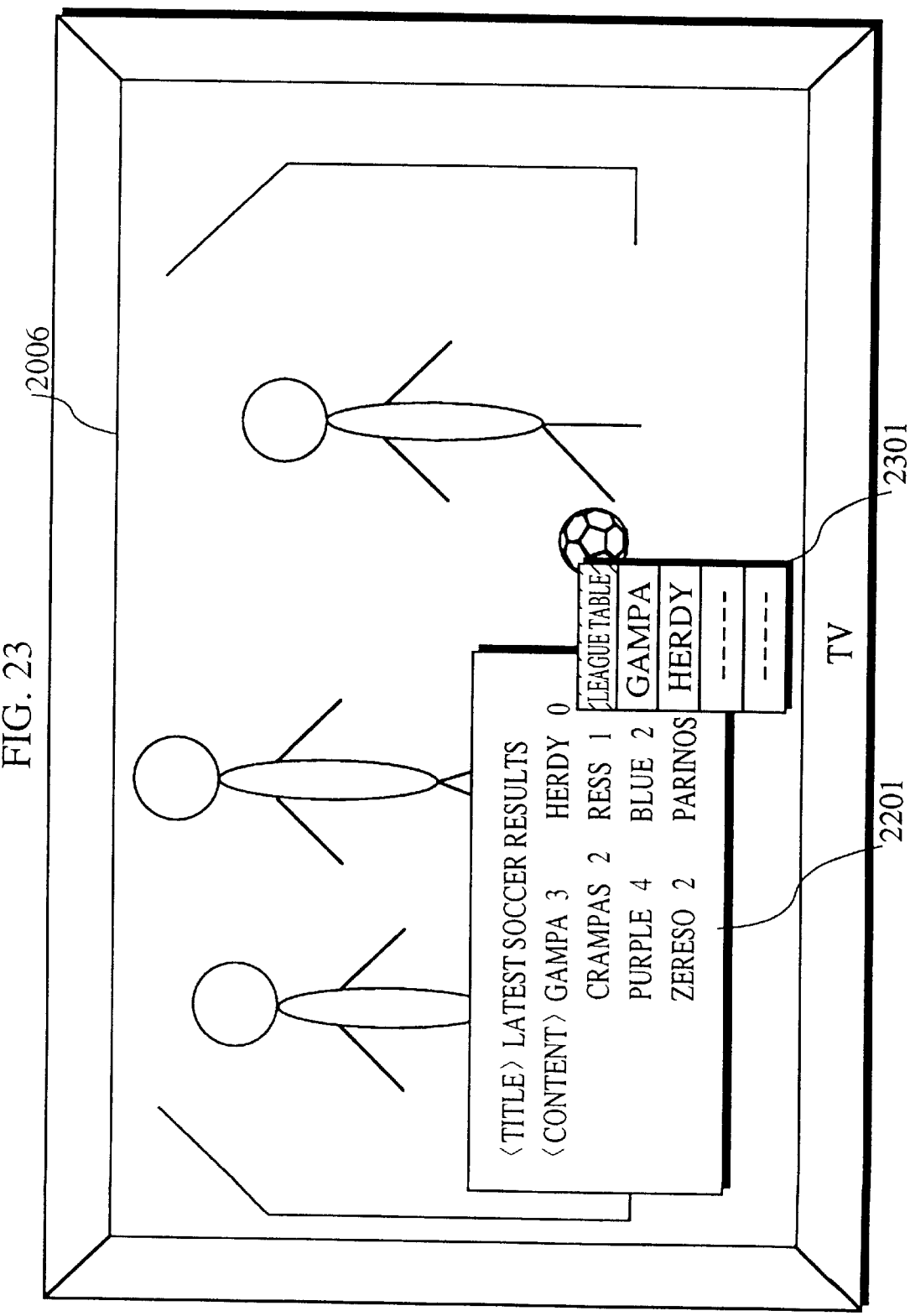
FIG. 23 is an example of a menu displayed by the display unit of the present embodiment.

When a plurality of documents (sets of document data) 2102 are stored in the data storage unit 2001 as shown in FIG. 21, and the user presses the "Document Display" button 502 on the remote controller 501, the display unit 2006 displays document (1) which is the set of data stored at the top of the data storage unit 2001 in the window 2201 in t;he data display region, as shown in FIG. 22. Next, if the user presses the "Menu Display" button 503 of the remote controller 501, the menu generated by the menu generating unit 2007 is displayed in the window 2301 of the menu display region, as shown in FIG. 23. This menu has the titles of sets of data which are linked to the document (1) displayed in window 2201 as its menu items. In displaying such a menu, the top menu item "League table" is displayed using oblique shading as the default.

Figure 24:
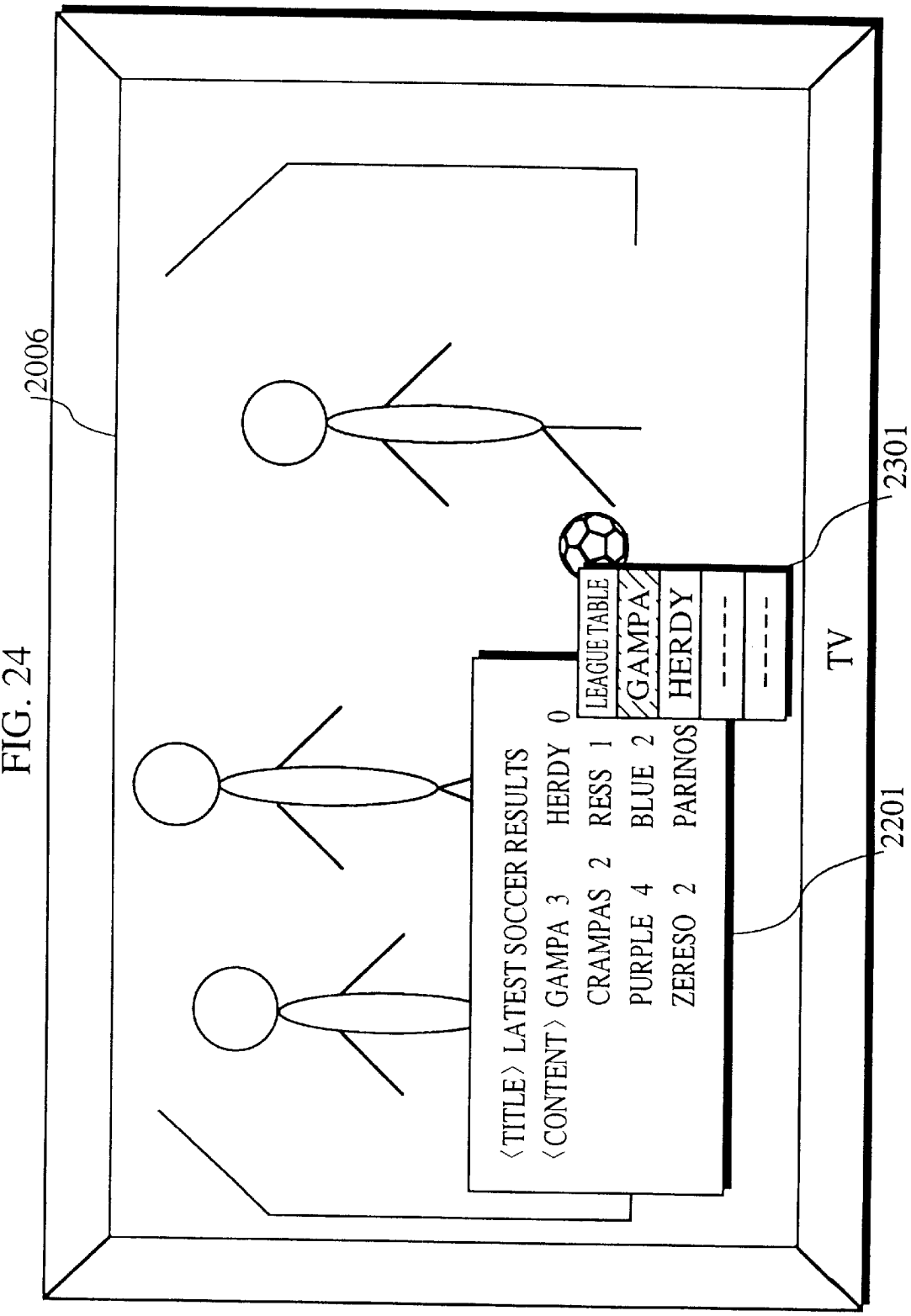
FIG. 24 is another example of a menu displayed by the display unit of the present embodiment.
Figure 25:
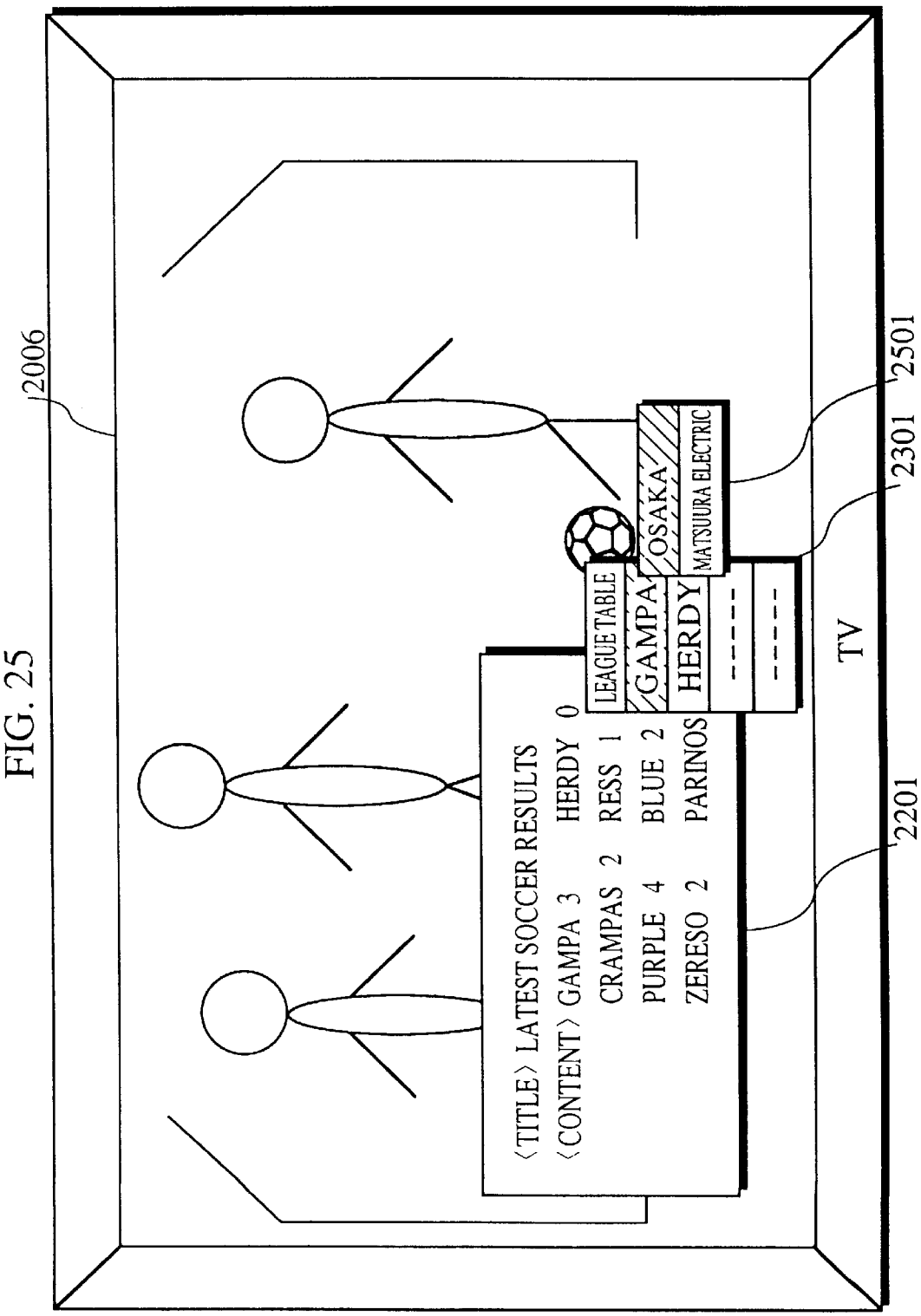
FIG. 25 is an example display of a hierarchical menus on the display unit of the present invention.
Figure 26:
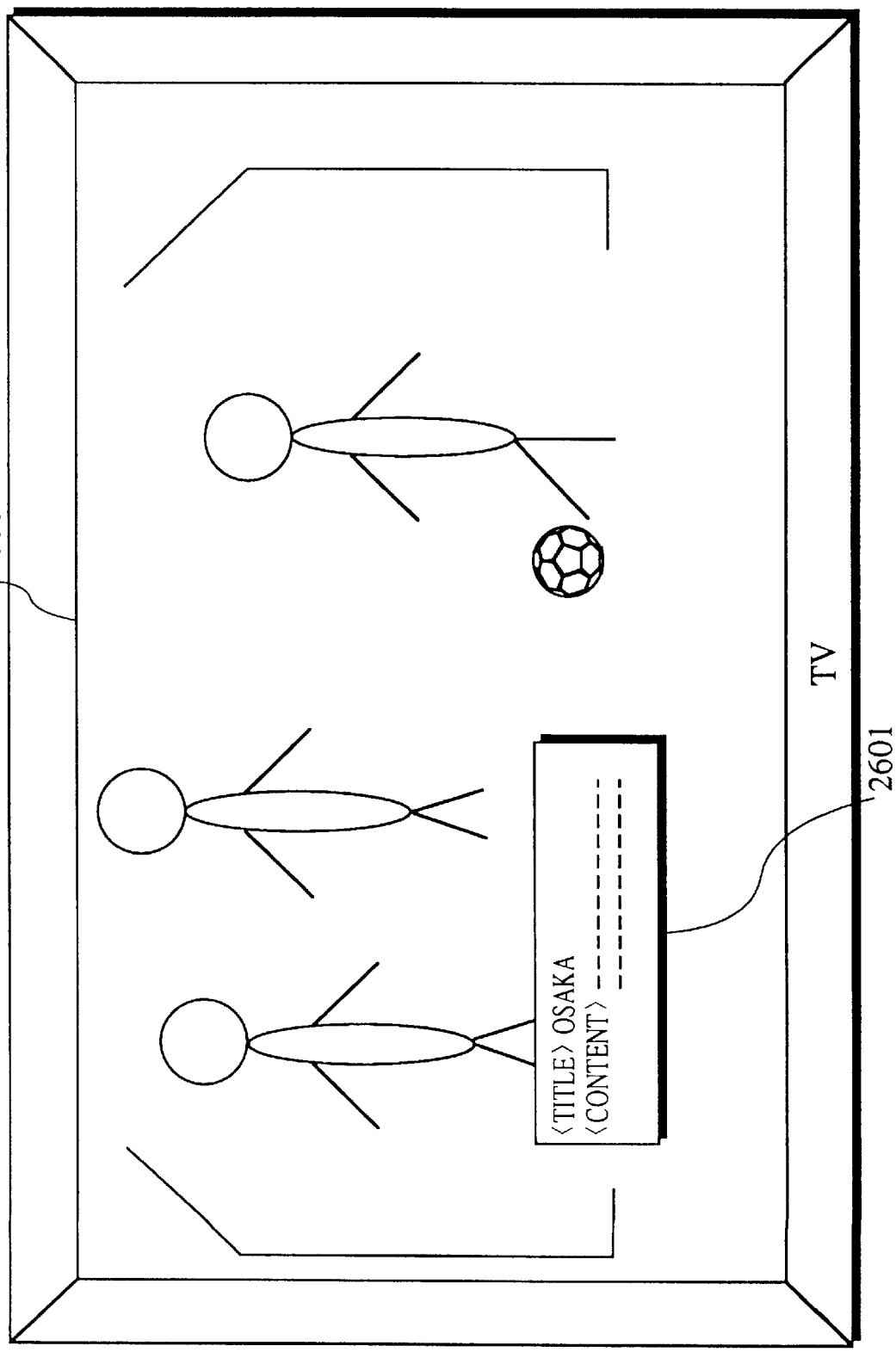
FIG. 26 is an example data display according to an execution of a menu item in the present embodiment.

When the user presses the "Next" button 509 on the remote controller 501 once, the shaded highlight is moved to the menu item "Gampa", as shown in FIG. 24. If the user then presses the "Right" button 508, a menu is generated which has the titles of data 2106, 2107, which are linked to the data 2104 which has "Gampa" as its title, as its menu items and is displayed as a submenu in a newly provided window 2501. Here, if the user presses the "Enter" button 504, the display is updated with data 2106, which corresponds to the focused menu item in the newly displayed menu, being displayed in a newly provided window in the data display region, as shown in FIG. 26.

In the present embodiment, so long as the user keeps pressing the "Right" button 508 and does not press the "Enter" button 504, the menu generating unit 2007 generates menus on lower levels of the hierarchy and the display control unit 2005 has these lower level menus in the hierarchy displayed in new windows on the display unit 2006, until there is no more linked data in the data storage unit 2001.

Figure 27:
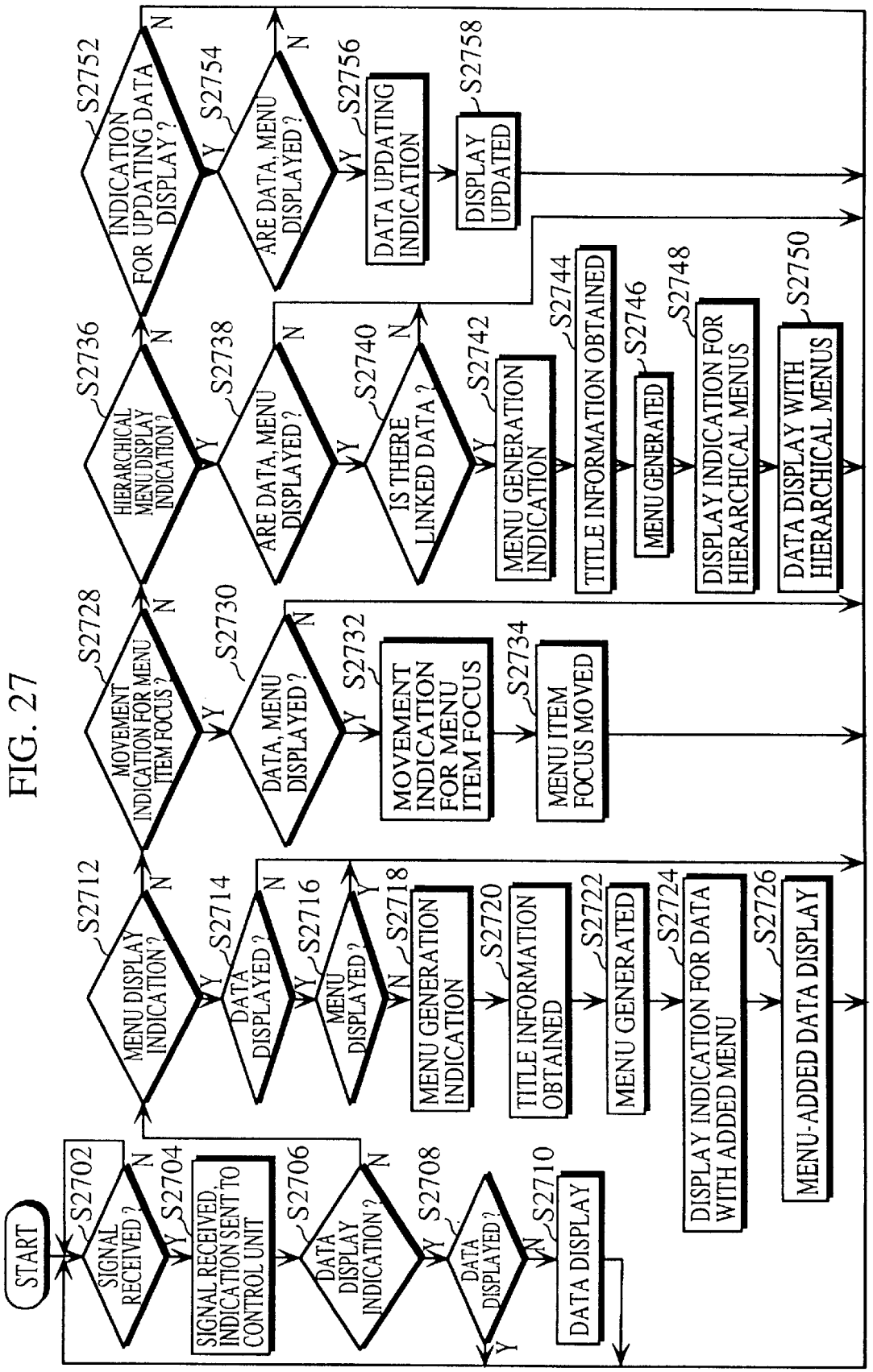
FIG. 27 is a flowchart for explaining the operation of the present embodiment.

The following is an explanation of the operation of the present embodiment, with reference to the flowchart in FIG. 27.

The input signal reception unit 2003 waits for the transmission of an operation signal from the input operation unit 2002 (S2702). On receiving an operation signal, the input signal reception unit 2003 gives the control unit 2004 a notification showing the nature of the received operation signal (S2704).

The control unit 2004 judges whether the received indication is a document display indication (S2706), and if not, the processing advances to S2712. On receiving a document display indication, the control unit 2004 judges whether data is already being displayed by the display unit 2006 (S2708), and if so, the processing returns to S2702. When data is not being displayed, the control unit 2004 gives an indication for data display to the display control unit 2005.

The display control unit 2005 reads the data stored at the top of the data storage unit 2001, has the display unit 2006 display the document (S2710), and the processing returns to S2702.

In S2712, the control unit 2004 judges whether the indication from the input signal reception unit 2003 is a menu display indication, and if not, the processing advances to S2728. If the received indication is a menu display indication, the control unit 2004 judges whether data is already being displayed by the display unit 103 (S2714). When no data is being displayed, the processing returns to S2702. When data is being displayed, the control unit 2004 judges whether a menu is already being displayed by the display unit 2006 (S2716), and if so, the processing returns to S2702. When no menu is being displayed, the control unit 2004 gives the menu generating unit 2007 an indication to generate a menu for the data being displayed by the display unit 2006 (S2718).

The menu generating unit 2007 obtains the title information for sets of data which are linked to the data being displayed by the display unit 2006 from the data storage unit 2001 (S2720) and generates a menu with the obtained title information as menu items (S2722). The menu generating unit 2007 then informs the display control unit 2005 of the generated menu, and gives an indication for the addition of the menu to the display of the data (S2724).

The display control unit 2005 has newly generated menu added to the display of the data on the display unit 2006 (S2726), and the processing returns to S2702.

In S2728, the control unit 2004 judges whether the indication from the input signal reception unit 2003 is a movement of menu item focus indication, and if not, the processing advances to S2736. If the indication is a movement of menu item focus indication, the control unit 2004 judges whether the display control unit 2005 is having a document and an operation menu displayed on the display unit 2006 (S2730). If not, the processing returns to S2702. On the other hand, when both data and a menu are being displayed, the control unit 2004 gives an indication to the display control unit 2005 to move the menu item focus to the next menu item (S2732).

The display control unit 2005 moves the menu item focus to the next menu item and has the menu displayed by the display unit 2006 (S2734), before the processing returns to S2702.

In S2736, the control unit 2004 judges whether the indication from the input signal reception unit 2003 is a hierarchical menu display indication, and if not, the processing advances to S2752. If the indication is a hierarchical menu display indication, the control unit 2004 judges whether the display control unit 2005 is having data and a menu displayed by the display unit 2006 (S2738). If not, the processing returns to S2702. On the other hand, when both data and a menu are displayed, the control unit 2004 judges whether there is any data which is linked to the data corresponding to the focused menu item (S2740). If there is no such data, the processing returns to S2702, while when such data exists, the control unit 2004 gives an indication to the menu generating unit 2007 to generate a menu for the data which is judged to have linked data (S2742).

The menu generating unit 2007 retrieves the title information for the data linked to the indicated data from the data storage unit 2001 (S2744). The menu generating unit 2007 then generates a menu from the retrieved title information (S2746). It then informs the display control unit 2005 of the generated menu, and gives the display control unit 2005 an indication to have the generated menu displayed in a hierarchy with the menus currently displayed by the display unit 2006 (S2748).

The display control unit 2005 has the data with the added menu hierarchy displayed by the display unit 2006 (S2750), and the processing returns to S2702.

In S2752, the control unit 2004 judges whether the indication from the input signal reception unit 2003 is an indication for updating data display. If not, the processing returns to S2702. If the indication was an indication for updating data display, the control unit 2004 judges whether data and a menu are currently being displayed (S2754). If data and a menu are not being displayed, the processing returns to S2702. On the other hand, when both data and a menu are being displayed, the control unit 2004 gives an indication to the display control unit 2005 to update the display using the data which has the focused menu item as its title (S2756).

The display control unit 2005 reads the data which has the focused menu item as its title information from the data storage unit 2001, and has the display unit 2006 update its display using the new data (S2758), before the processing returns to S2702.

By means of the construction described above, when data is linked to other data, it is not necessary to switch the display from one set of data to a next linked set of data every time, so that the user may skip intermediate links on the route to their desired data and by doing so obtain their desired information quickly and easily.

It should be noted here that while the present embodiment describes the case when the first data to be displayed is the data at the top of the data storage unit 2001, this need not be the case, so that the user may instead select an arbitrary set of data, or alternatively a set of data which was the final set of data displayed during a previous operation may be stored and then used again.

The present embodiment has also been described as using titles of sets of data as menu items, although candidate data for menu items may be stored beforehand in the menu generating unit 2007 with candidates corresponding to parts of the sets of data being used as menu items. Alternatively, the first twenty characters (or any other number of characters) in a set of data may be used as its menu item.

Finally, in the present embodiment, the original data ("Latest Soccer Results") is cleared when the data corresponding to the menu item "Osaka" is displayed, although the display of this data may be continued.

Fourth Embodiment

Figure 28:
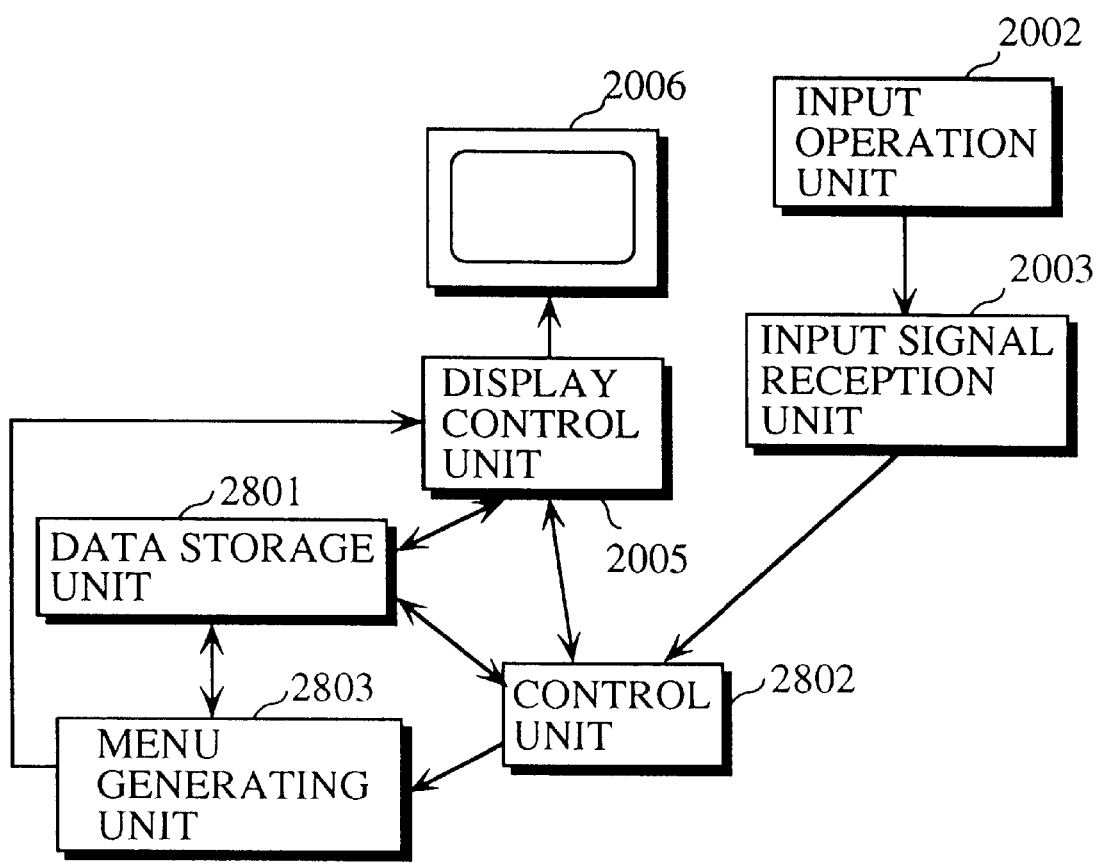
FIG. 28 shows the construction of the data processing apparatus of the fourth embodiment of the present invention.

The construction of the data processing apparatus of the fourth embodiment of the present invention is shown in FIG. 28. As shown in the drawing, the data processing apparatus is composed of data storage unit 2801, an input operation unit 2002, an input signal reception unit 2003, a control unit 2802, a display control unit 2005, a display unit 2006, and a menu generating unit 2803. Here, the construction of this data processing apparatus is largely the same as that in the third embodiment, so that elements which are the same as the third embodiment have been given the same reference numerals and their explanation has been omitted. The following explanation will focus on the elements which are unique to the present embodiment.

Figure 29:
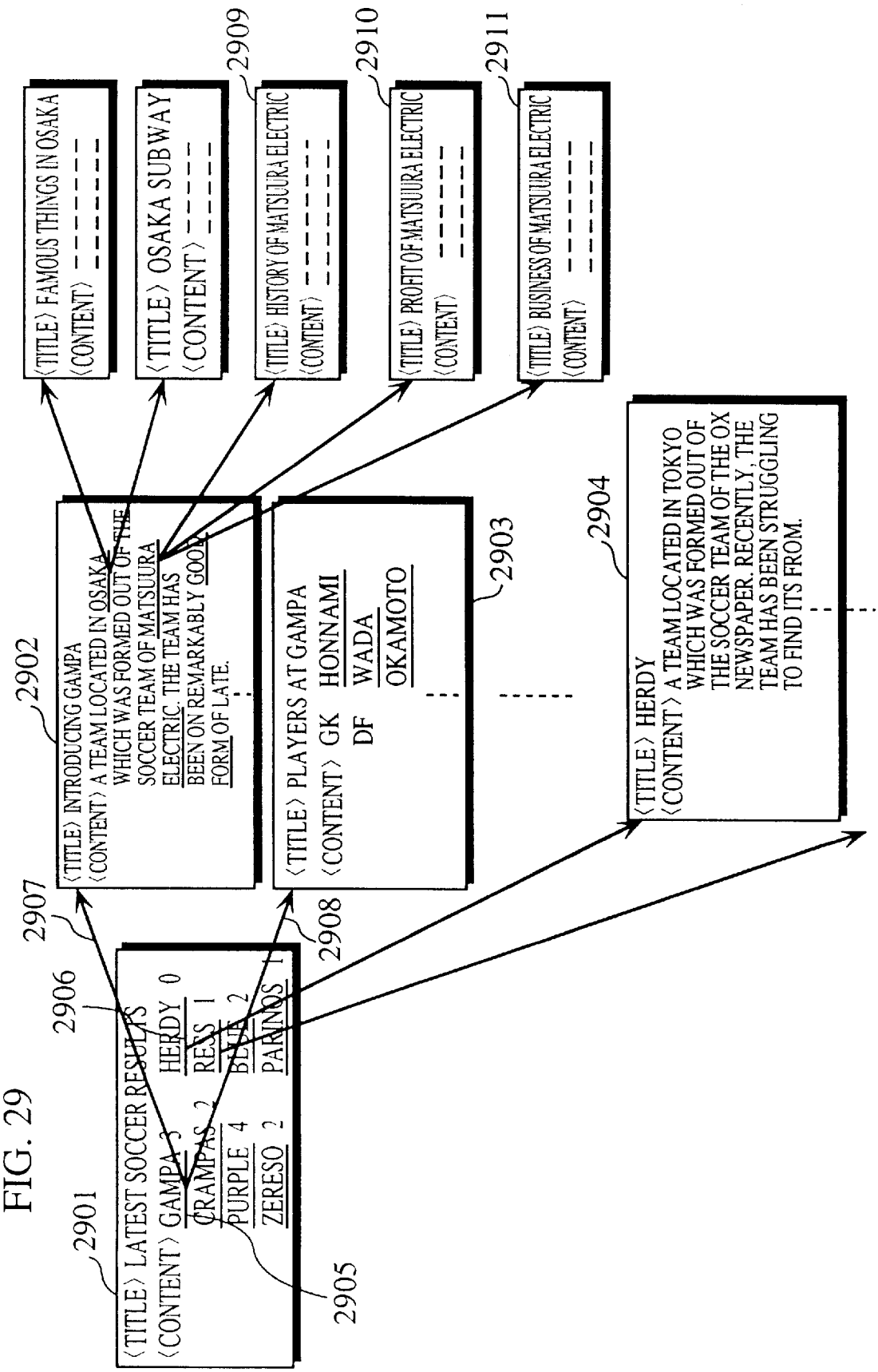
FIG. 29 shows the data stored in the data storage unit of the present embodiment.

As shown in FIG. 29, the difference between the present embodiment and the third embodiment is that the plurality of sets of data included in the data storage unit 2801 are not linked together as such. Instead, text items included as part of the content of a set of data (for example, hot spots) are linked to other sets of data. The text items referred to here form parts of a set of the data and are linked to other sets of data.

The data storage unit 2801 can be made up of ROM and RAM, and, as shown in FIG. 29, already stores a plurality of sets of data.

Data 2901 is made up of a title and a content, with its content including text items 2905, 2906 which are linked to other sets of data 2902, 2903, 2904, etc. These links are shown in FIG. 29 by arrows, such as 2907 and 2908. These text items 2905, 2906, etc are shown underlined in the drawing.

On receiving an indication for menu display from the input signal reception unit 2003, the control unit 2802 refers to the display control unit 2005 to judge whether a set of data is already being displayed by the display unit 2006. When a set of data is displayed, the control unit then judges whether a menu is being displayed by the display unit 2006. When a menu is yet to be displayed, the control unit 2802 obtains the focused text item from the display control unit 2005 and informs the menu generation unit 2803 of this text item.

On receiving a hierarchical menu display indication from the input signal reception unit 2003, the control unit 2802 refers to the display control unit 2005 to judge whether data and a menu are being displayed on the display unit 2006. When data and a menu are being displayed, the control unit 2802 obtains the focused menu item from the display control unit 2005 and informs the menu generation unit 2803 of this menu item.

On receiving an indication of a text item from the control unit 2802, the menu generation unit 2803 refers to the data storage unit 2801 and judges whether the indicated text item is linked to a plurality of other sets of data, or just to one other set of data. On receiving an indication of a menu item from the control unit 2802, the menu generation unit 2803 refers to the data storage unit 2801 and judges whether the menu item is a title of whether it is a text item. If the focused menu item is a text item, the menu generation unit 2803 refers to the data storage unit 2801 in the same way as above, and judges whether the indicated text item is linked to a plurality of other sets of data, or just to one other set of data.

When it is judged that the indicated text item is linked to a plurality of other sets of data, the menu generation unit 2803 reads the titles of the linked sets of data in the data storage unit 2801, and generates a menu with these titles as menu items.

When it is judged that the indicated text item is linked to only one other set of data, the menu generation unit 2803 reads the text items (text items which are linked to other sets of data) included in this set of linked data, and generates a menu with these text items as menu items.

When it is judged that the indicated menu item is a title, the menu generation unit 2803 reads the text items included in this set of linked data, and generates a menu with these text items as menu items.

The menu generation unit 2803 then informs the display control unit 2005 of the menu it has generated.

On receiving a menu from the menu generation unit 2803, when no menu is being displayed by the display unit 2006, the display control unit 2005 has the menu displayed in a window in the menu display region at a position which does not cover the focused text item. When a menu is already being displayed, the display control unit 2005 has the new menu displayed in a window provided as a new menu display region at a position close to the focused menu item.

The following is an explanation of a specific operation of the present data processing device when displaying hierarchical menus with a set of document data stored in the data storage unit 2801.

Here, as shown in FIG. 29, a plurality of sets of data 2901 which each have their own title are stored in the data storage unit 2801, with links 2907 being established between sets of data. When the user presses the "Document Display" (which means the same as data display) button 502 on the remote controller 501 shown in FIG. 5 which is used as the input operation unit 2002, a data display signal is sent to the input signal reception unit 2003. A set of data 2901 is then displayed by the display unit 2006. Here, the data which is displayed first is the data 2901 which is stored at the top of the data storage unit 2801.

Figure 30:
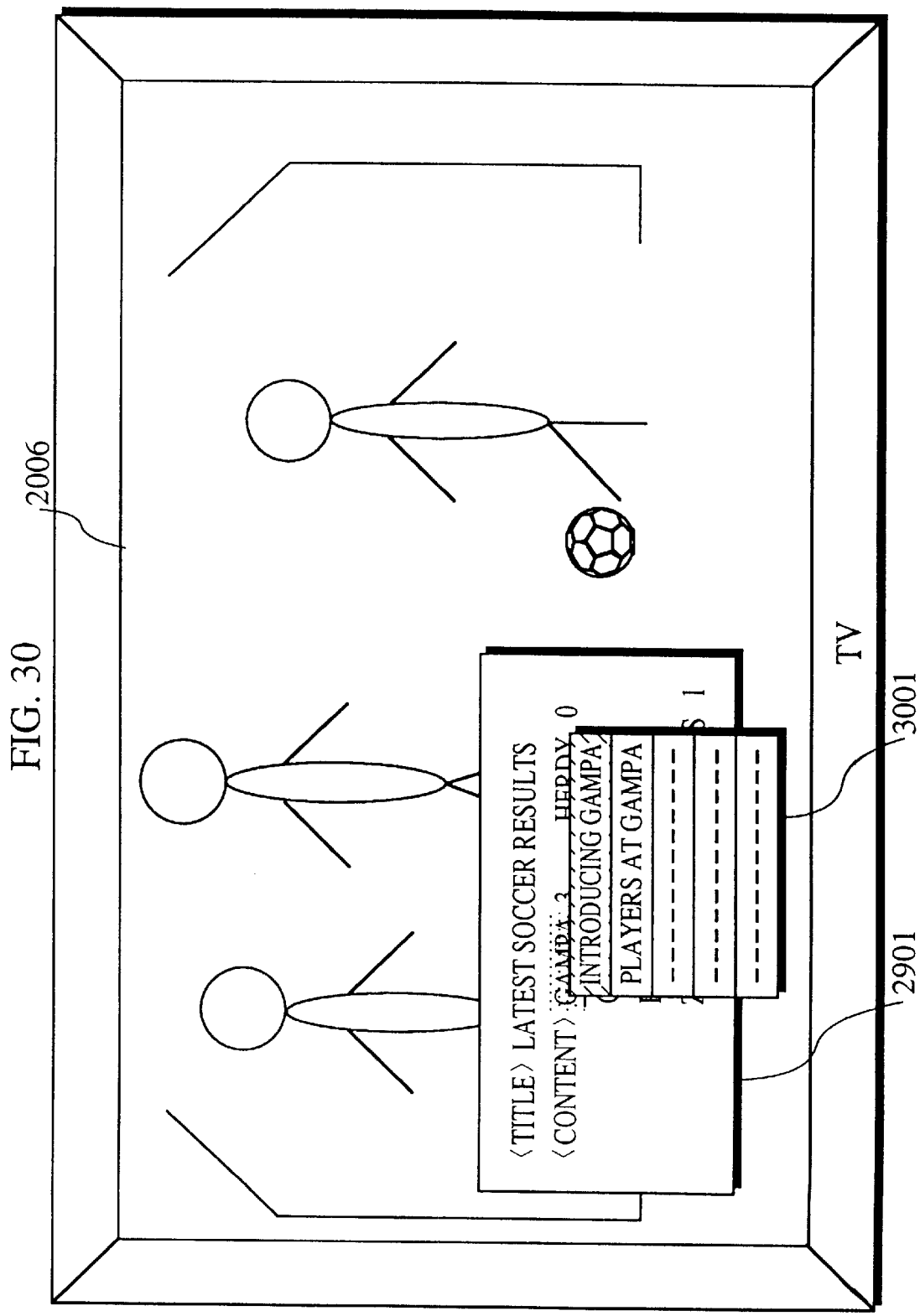
FIG. 30 is an example display of a menu by the display unit of the present embodiment.

If the user then presses the "Menu Display" button 503 on the remote controller 501, the input signal reception unit 2003 receives a menu display signal. As shown in FIG. 30, data 2901 and menu 3001 are then displayed on the display unit 2006. Here, menu 3001 is made up of menu items which are the titles of data 2902, 2903, etc., since the text item "Gampa" is linked to a plurality of sets of data 2902, 2903, etc.

Figure 31:
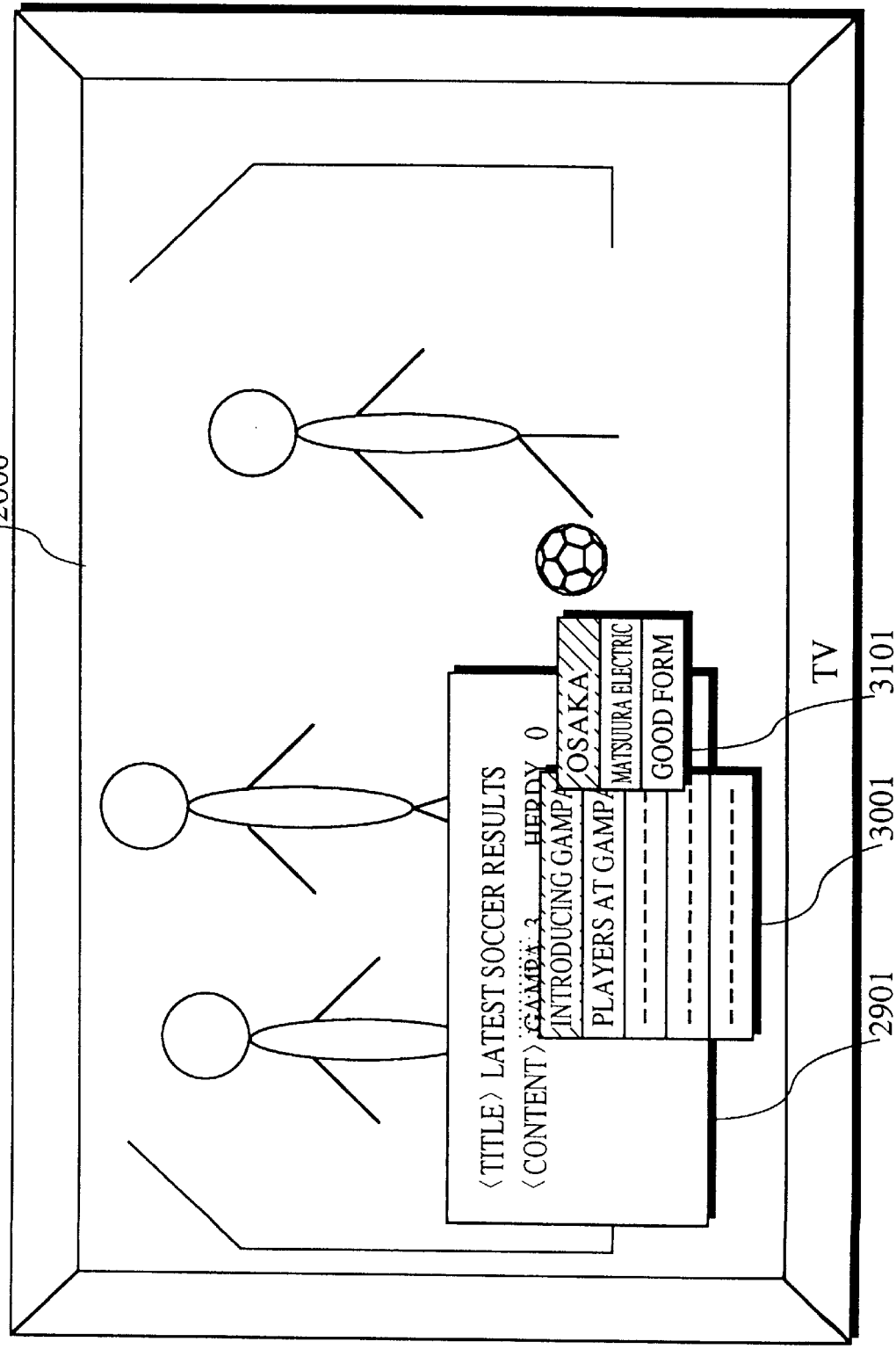
FIG. 31 is an example display of hierarchical menus by the display unit of the present embodiment.

If the user then presses the "Right" button 508 on the remote controller 501, a new menu 3101 which has text items included in the indicated menu item "Introducing Gampa" as menu items is displayed as shown in FIG. 31. This is because the menu item "Introducing Gampa" is a title, not a text item.

Figure 32:
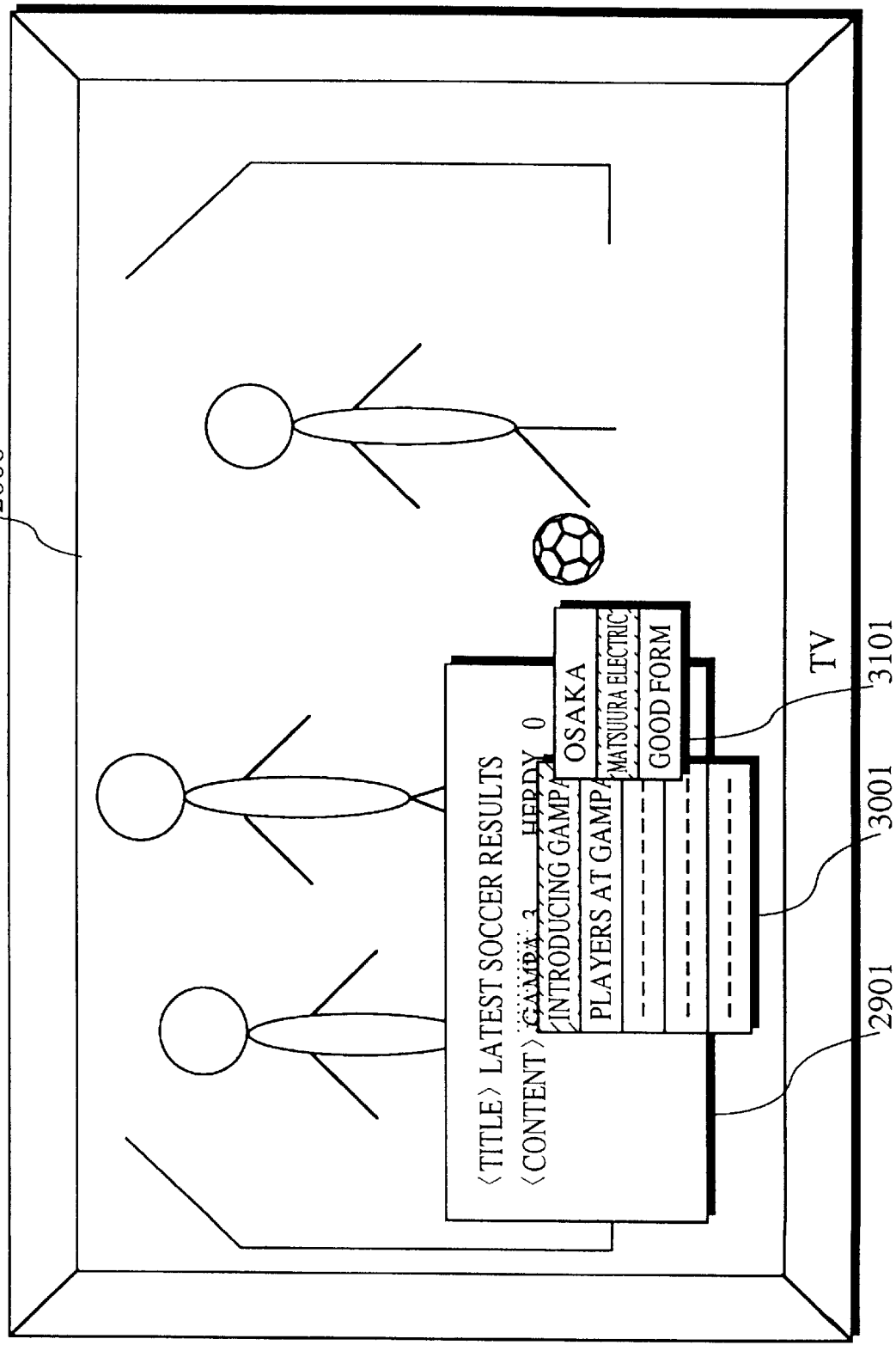
FIG. 32 is another example display of hierarchical menus by the display unit of the present embodiment.

If the user then presses the "Down" button 506 on the remote controller 501, the menu item focus is moved to "Matsuura Electric", as shown in FIG. 32.

Figure 33:
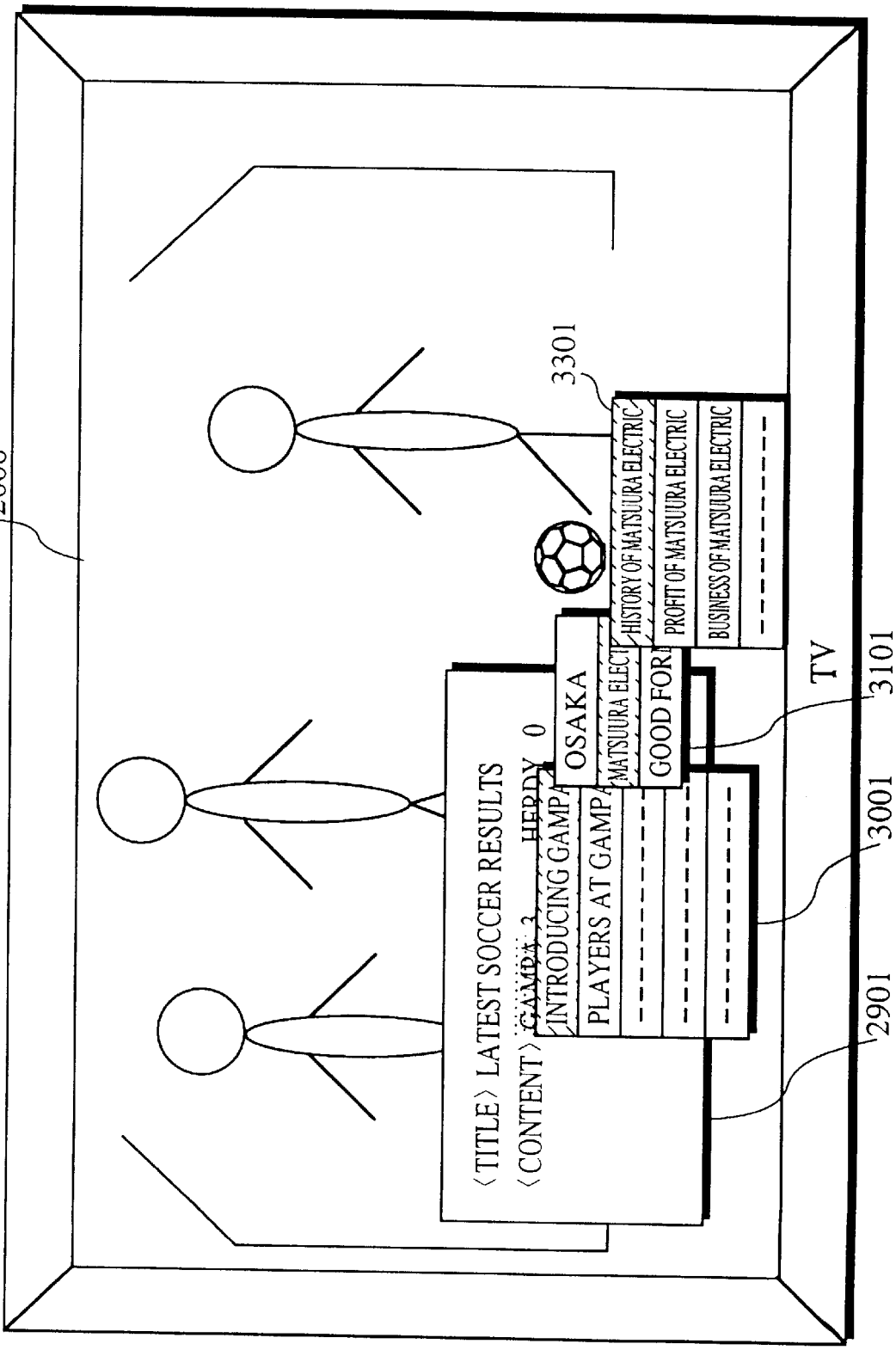
FIG. 33 is another example display of hierarchical menus by the display unit of the present embodiment.

Here, if the user presses the "Right" button 508 on the remote controller 501, a new menu 3301, which has the titles of the sets of data 2909, 2910, and 2911 which are linked to the text item "Matsuura Electric" as menu items, is displayed as shown in FIG. 33.

Figure 34:
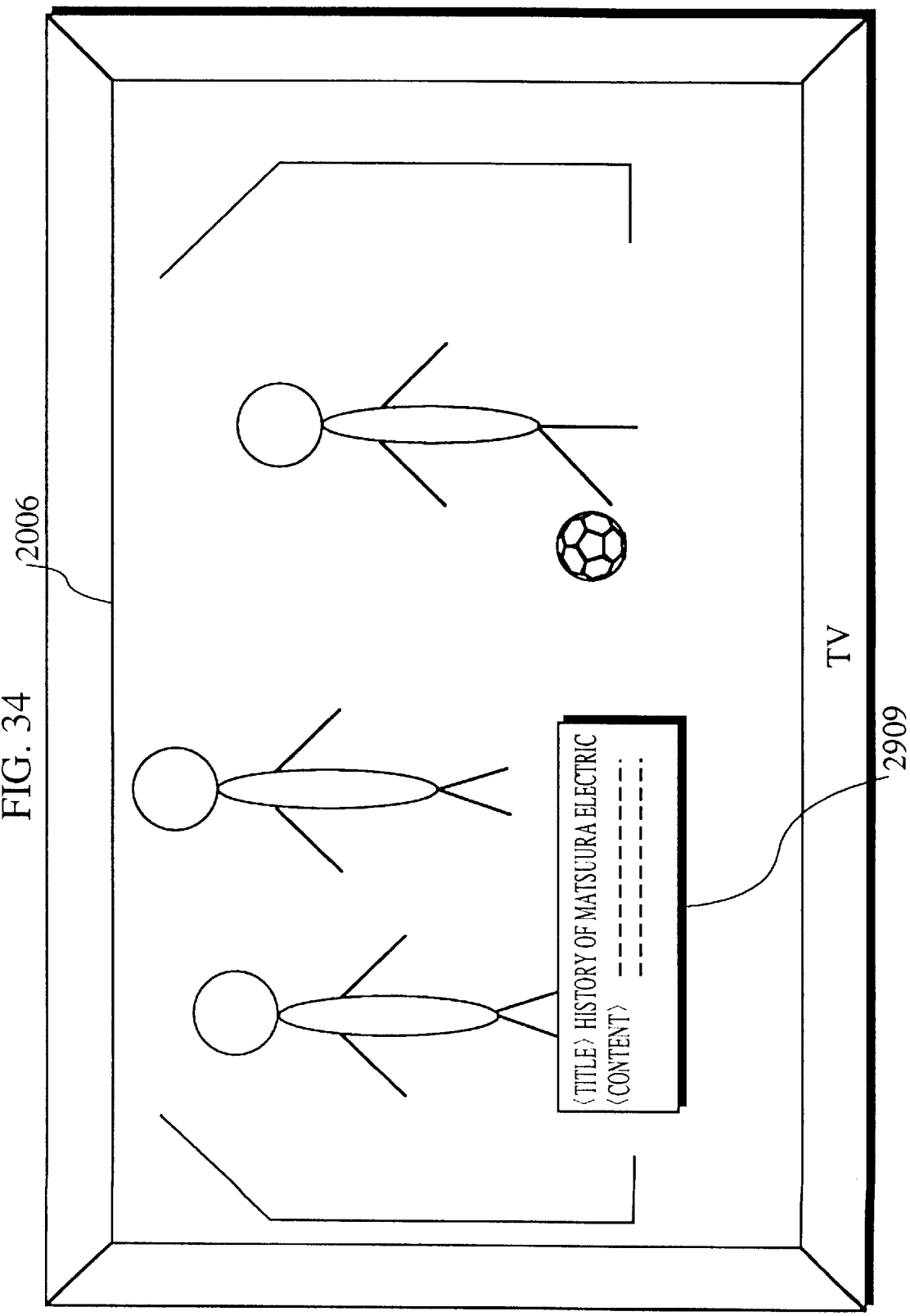
FIG. 34 is an example data display according to an execution of a menu item in the present embodiment.

If the user then presses the "Enter" button 504 on the remote controller 501, the display is updated to show the data 2909 of the focused menu item "History of Matsuura Electric", as shown in FIG. 34.

The following is an explanation of a specific menu display operation when a plurality of sets of data, such as 3501, are stored in the data storage unit 2801 of the present data processing apparatus.

Figure 35:
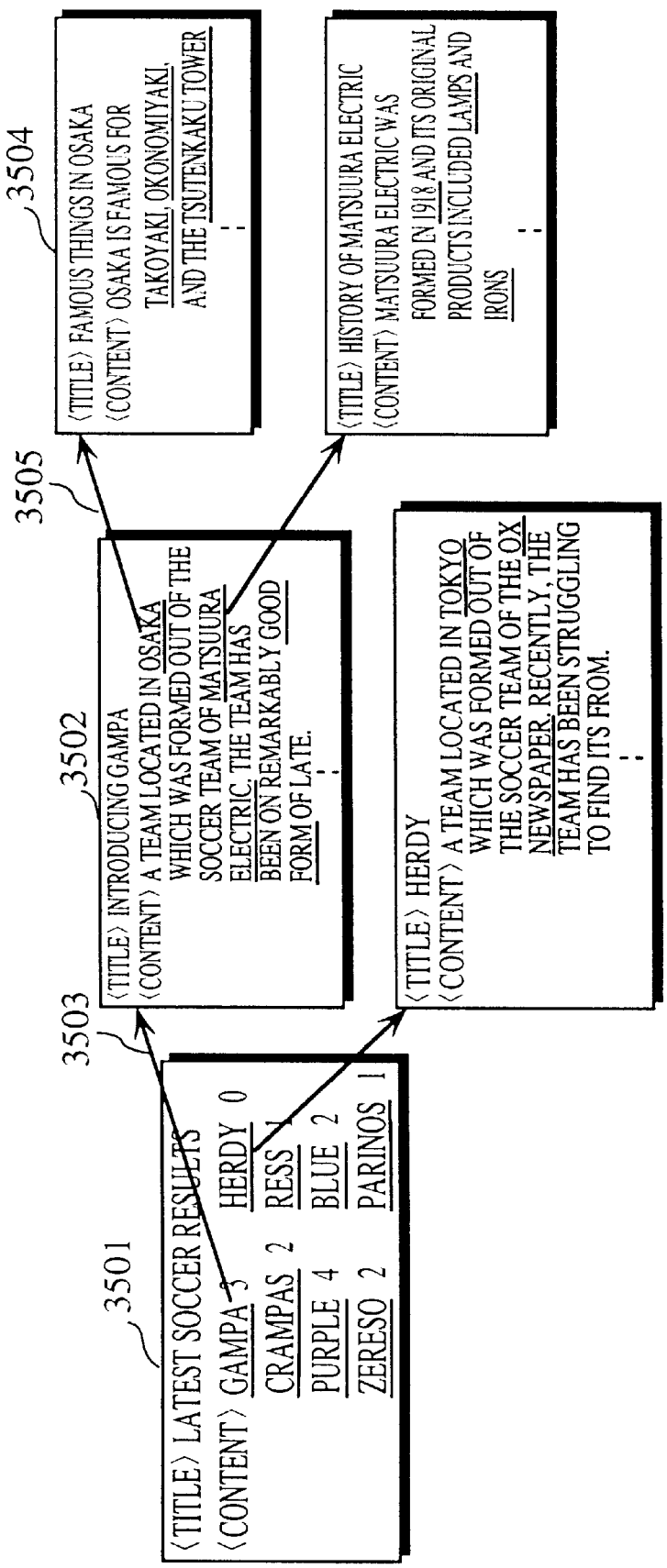
FIG. 35 shows other data stored by the data storage unit of the present embodiment.

While the sets of data in FIG. 29, such as data 2901, featured a plurality of links between text items and sets of data, the sets of data in FIG. 35 feature only one link between each text and a set of data. As examples, the text item "Gampa" included in data 3501 is linked to data 3502 as shown by the arrow 3503, and the text item "Osaka" included in data 3502 is linked as shown by the arrow 3505 to data 3504. The following is an explanation, like the previous example, of button operations of the remote controller 501 and example displays by the display unit 2006.

Figure 36:
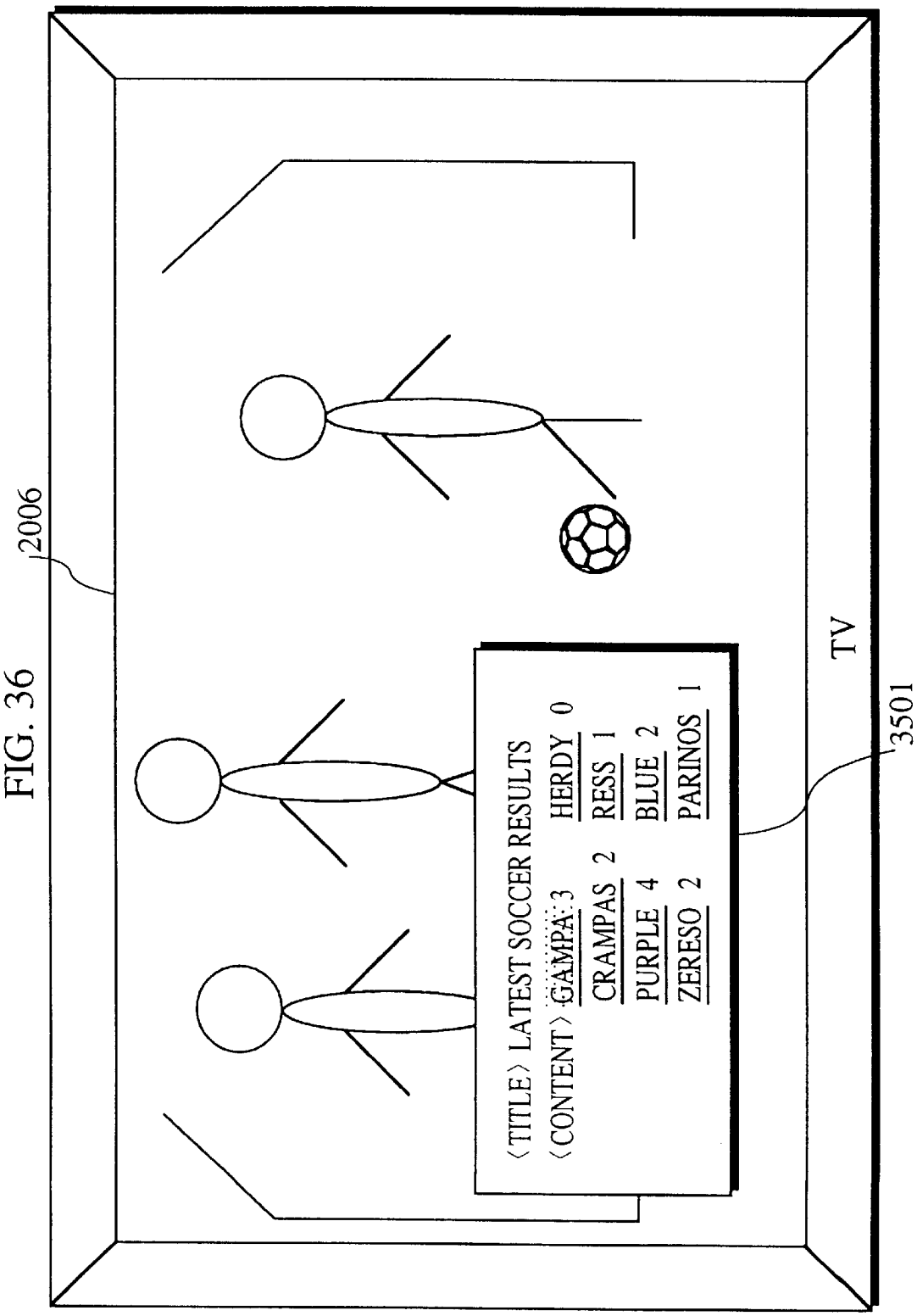
FIG. 36 is an example of data displayed by the display unit of the present embodiment.
Figure 37:
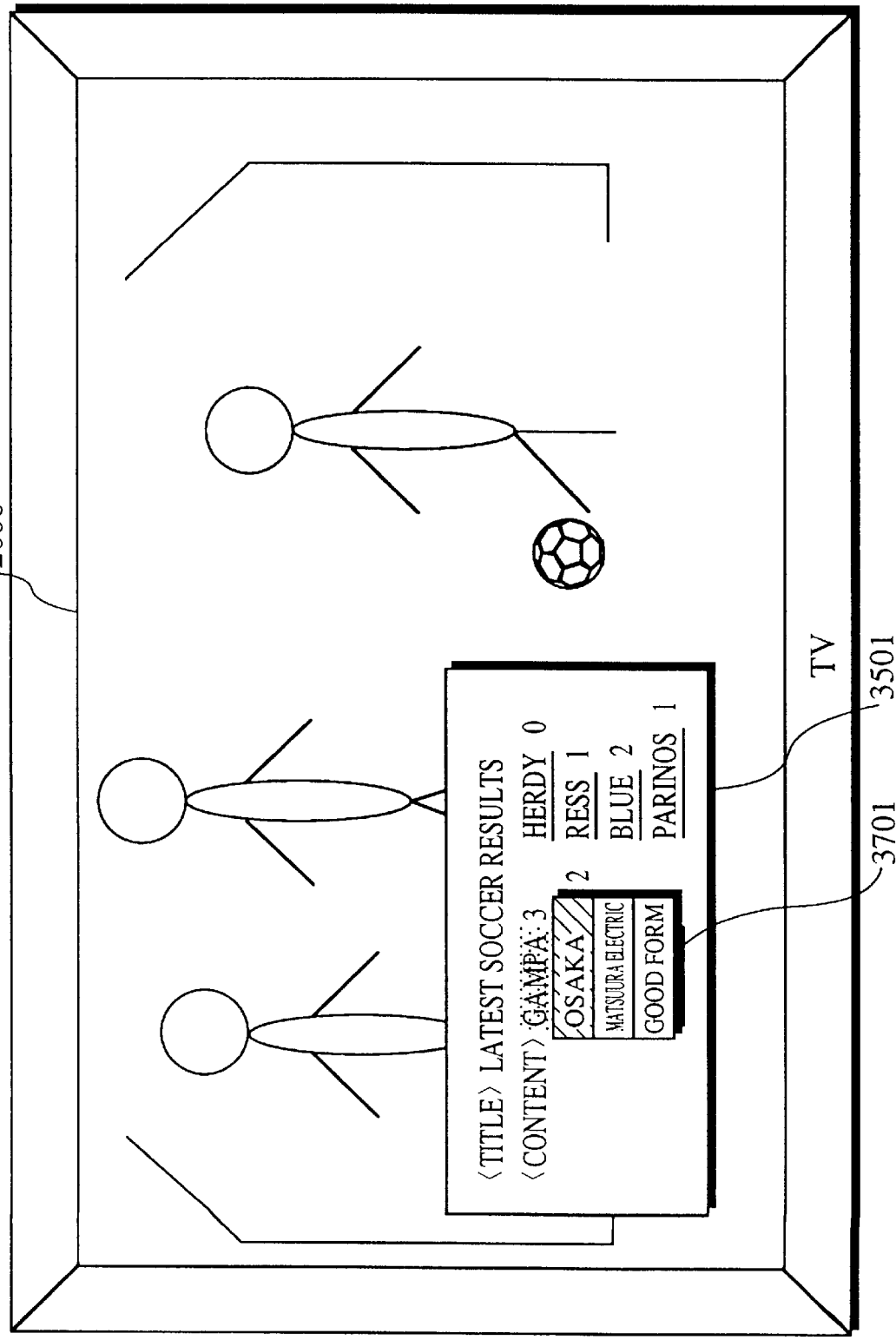
FIG. 37 shows a menu which is added to data on the display unit of the present embodiment.
Figure 38:
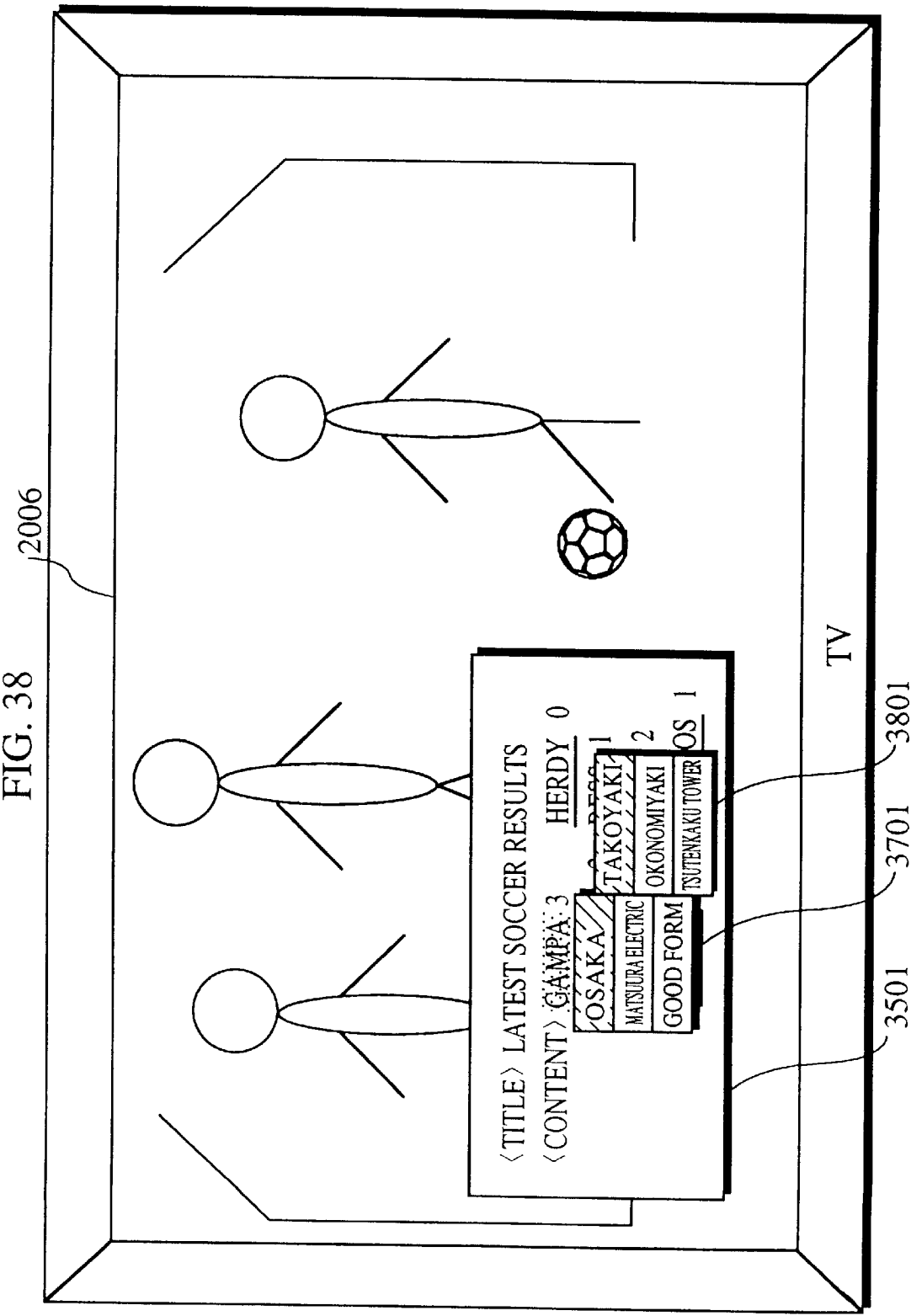
FIG. 38 is an example display of hierarchical menus by the display unit of the present embodiment.
Figure 39:
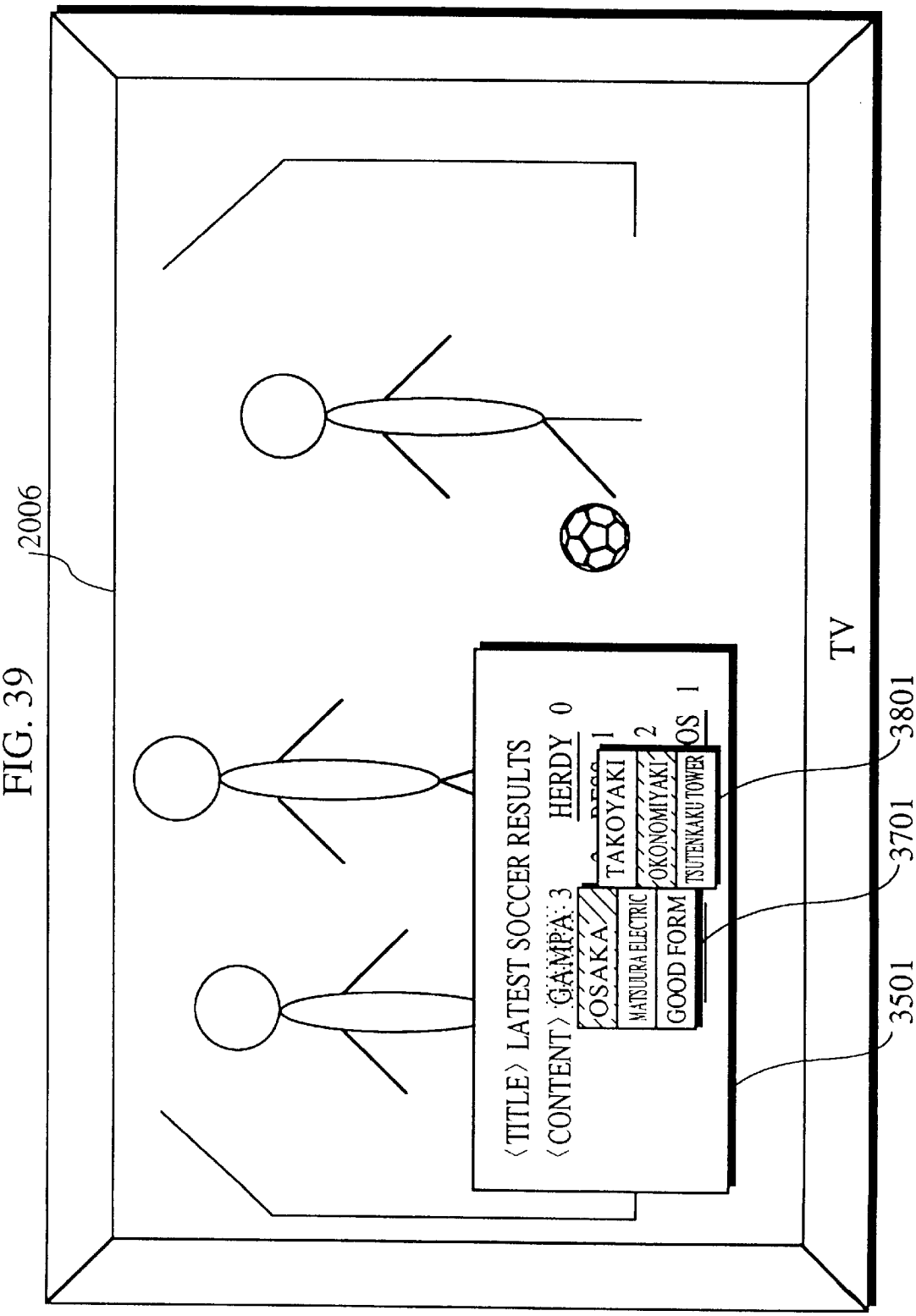
FIG. 39 is another example display of hierarchical menus by the display unit of the present embodiment.

When the user presses the "Document Display" button 502 on the remote controller 501, the display unit 2006 displays data 3501 as shown in FIG. 36. When the user next presses the "Menu Display" button 503, the menu 3701 is added to the display on the display unit 2006, as shown in FIG. 37. If the user next presses the "Right" button 508, the next menu 3801 in the hierarchy is added to the display on the display unit 2006, as shown in FIG. 38. When the "Down" button 504 is pressed, the menu item focus moves to indicate "Okonomi Yaki", as shown in FIG. 39. If the "Enter" button 504 is pressed next, the data (not illustrated) corresponding to the title "Okonomi Yaki" is displayed in a window provided in the data display region of the display unit 2006.

It should be noted here that the operation of the present embodiment is principally the same as the third embodiment which was shown in FIG. 27, with the only differences being in S2718–S2722 and S2740–S2746. Accordingly, the following explanation only gives a simple description of these processes.

In place of S2718–2722, when the control unit 2802 judges that a menu is already being displayed, the processing returns to S2702. When no menu is being displayed, the control unit 2802 obtains the focused text item from the display control unit 2005 and informs the menu generation unit 2803 of this text item.

The menu generation unit 2803 refers to the data storage unit 2801 and judges whether the text item is linked to only one set of data, or to a plurality of sets of data. When the text item is linked to a plurality of sets of data, the menu generation unit 2803 reads the titles of the linked sets of data and generates a menu with these titles as menu items.

On the other hand, on judging that only one set of data is linked to the text item, the menu generation unit reads all of the text items in the set of data indicated by the present text item, and generates a menu with these text items as menu items.

In place of S2740–S2746, the processing returns to S2702 if data and a menu are not being displayed, but when data and a menu are being displayed, the control unit 2802 informs the menu generation unit 2803 of the currently focused menu item.

The menu generation unit 2803 refers to the data storage unit 2801 and judges whether the focused menu item is a text item or the title of a set of data. When it is a text item, the menu generation unit judges whether a plurality of sets of data are linked to the text item, or just one set of data. As before, a menu is generated by reading the data storage unit 2801 with titles of data as menu items when a plurality of linked sets of data are present, or with text items in the linked set of data as menu items when there is only one linked set of data. When the focused menu item is the title of a set of data, the menu generation unit 2803 reads the text items included in the data with the focused title from the data storage unit 2801, and generates a menu with these text items as menu items.

As described above, the present embodiment enables the user to skip through a chain of any number of links to reach their desired data without having to have each set of linked data in the chain displayed. As a result, the user can easily search for their desired data and have it displayed quickly.

The present embodiment was described as using titles as menu items, though other character strings may also be used. As examples, character strings which are given special tags, character strings whose attributes express certain values, key words extracted from the content of a set of data, or the first ten characters (or any other number of characters) in the data may be used as menu items.

In the examples shown in FIG. 33 and FIG. 38, menus on a third lower level and a second lower level are respectively shown, although should there be linked data on lower levels (not illustrated in the drawings) in the data storage unit 2801, a hierarchy of menus which extends as far as the nth sublevel may be displayed.

Figure 40:
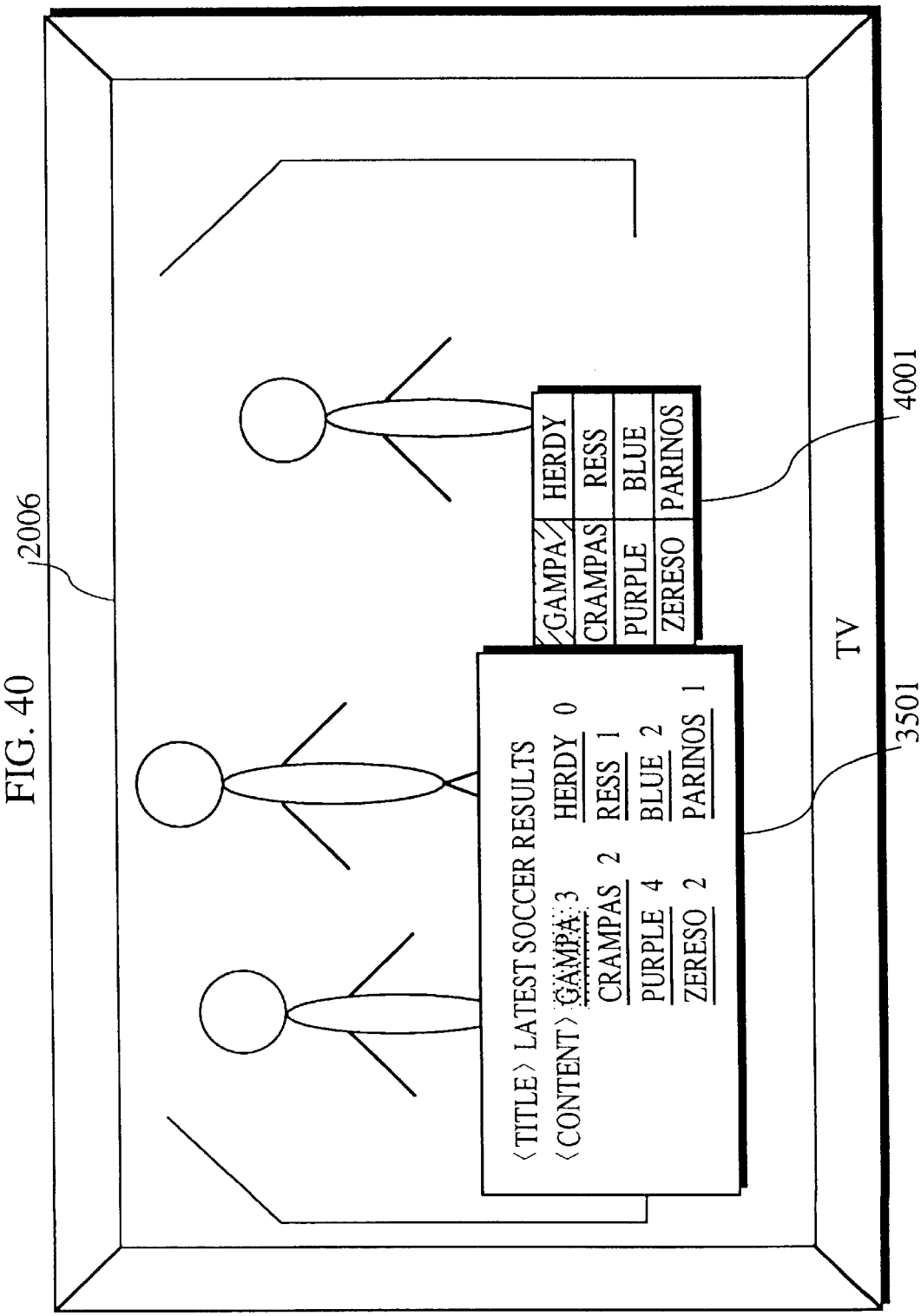
FIG. 40 is an example data display of a menu which has text items in the data as menu items in the present embodiment.
Figure 41:
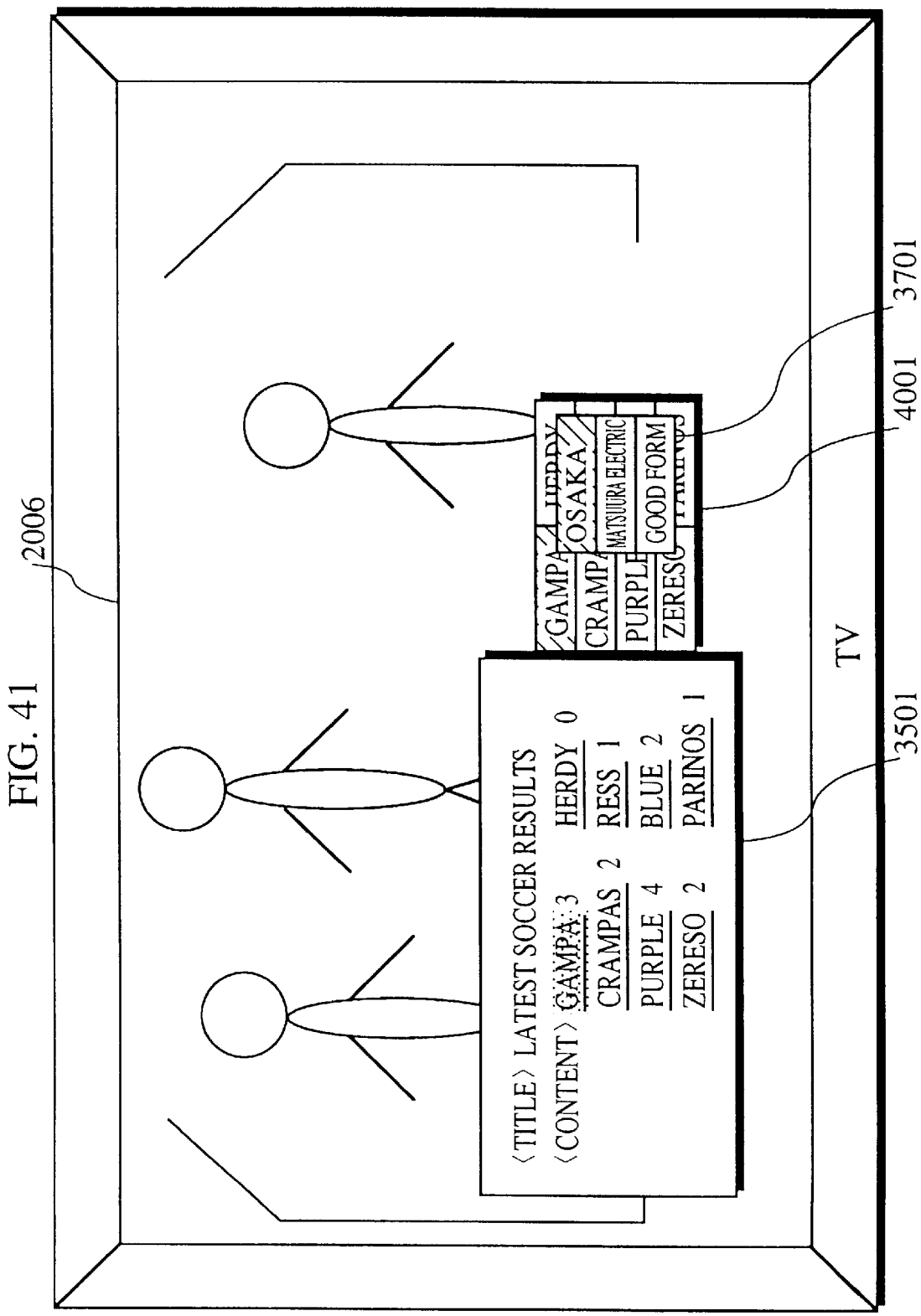
FIG. 41 shows an example display of the menu in FIG. 40 in hierarchical format.

In the present document, text items were described as being distributed throughout a set of data, although since movement of the text item focus can be complex, the menu generation unit 2803 may display all of the text items collectively in a separate region 4001 to the display region of the document data 3501, as shown in FIG. 40. In such a case, the menu 3701 shown in FIG. 37 will be displayed as shown in FIG. 41.

The display of text items which are menu items may be performed using one vertical column, one horizontal row, or, or a table displayed to the side of the data in which the text items appear, as shown in FIG. 40.

Fifth Embodiment

Figure 42:
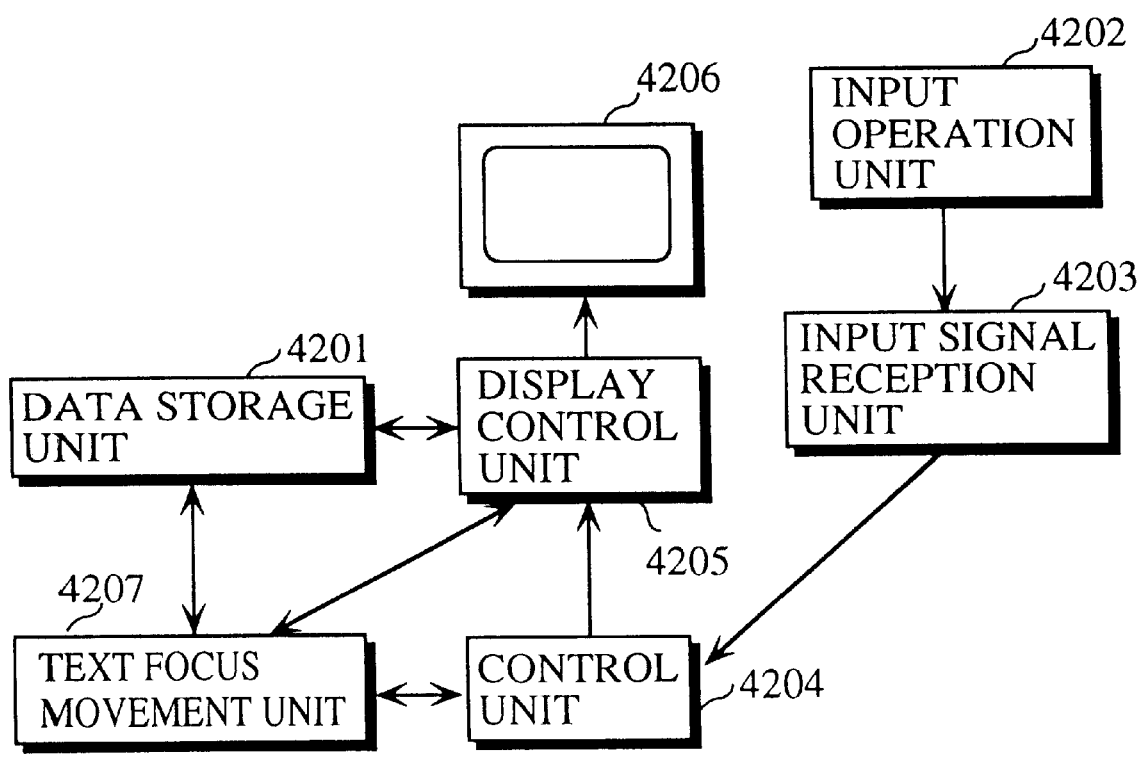
FIG. 42 shows the construction of the data processing apparatus of the fifth embodiment of the present invention.

The construction of the data processing apparatus of the fifth embodiment of the present invention is shown in FIG. 42. As shown in the drawing, the data processing apparatus is composed of a data storage unit 4201, an input operation unit 4202, an input signal reception unit 4203, a control unit 4204, a display control unit 4205, a display unit 4206, and a text focus movement unit 4207.

Figure 43:
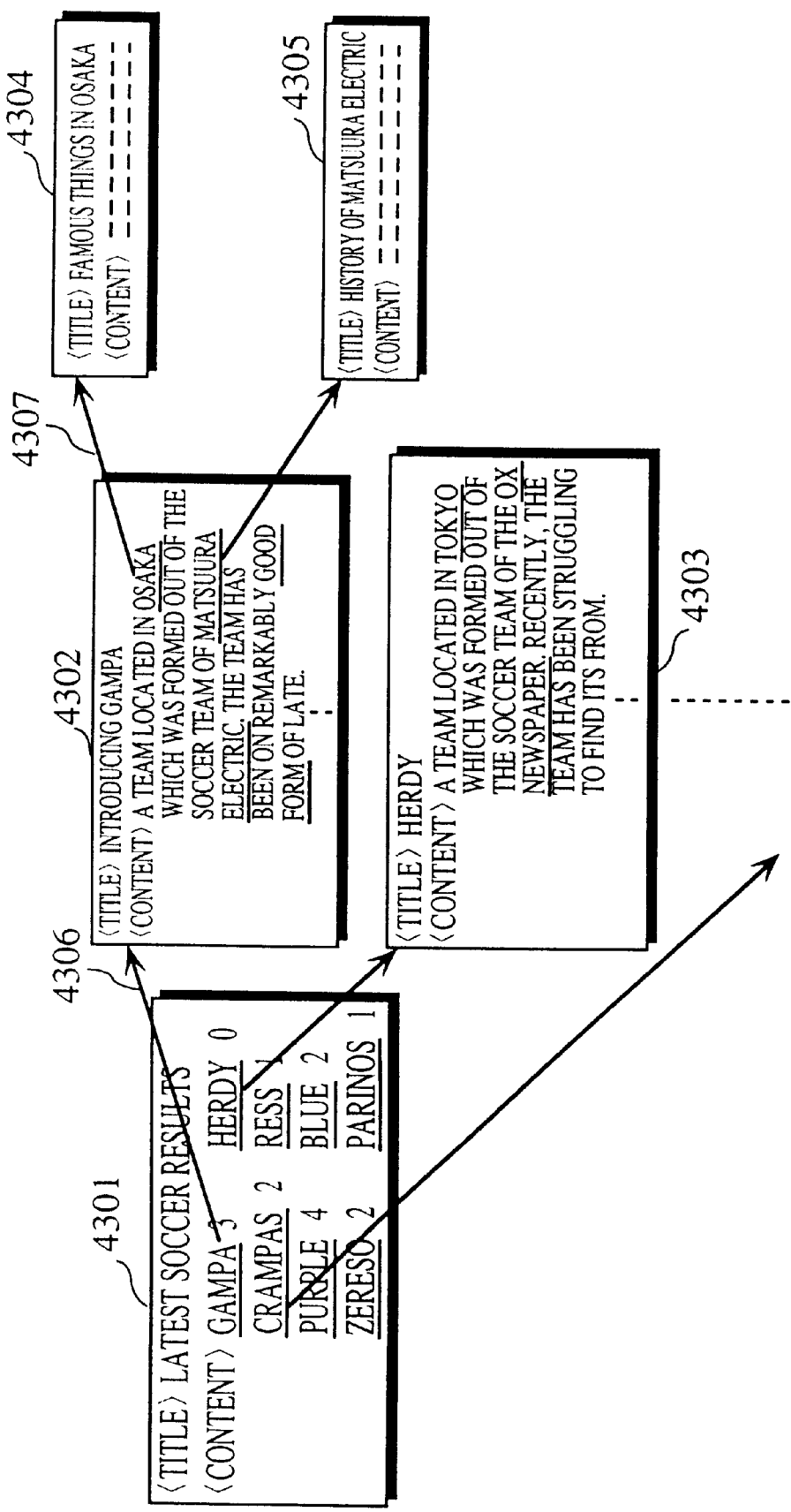
FIG. 43 shows the data stored in the data storage unit of the present embodiment.

The data storage unit 4201 can be made up of RAM and ROM, and stores a plurality of sets of data, such as 4301, 4302, 4303, 4304, and 4305 in FIG. 43. As one example, the text item "Gampa" in the first set of data 4301 is linked to another set of data 4302 as shown by the arrow 4303. Similarly, the text item "Osaka" in the set of data 4302 is linked to another set of data 4304 as shown by the arrow 4307. In the figure, text items which are linked to other sets of data have been underlined.

As one example, the remote controller 501 used as the input operation unit 108 in the first embodiment may be used as the input operation unit 4202. When the user presses the "Document Display" button 502, the input operation unit 4202 transmits a signal to the input signal reception unit 4203 indicating document display. In the same way, when the user presses the "Enter" key 504, the input operation unit 4202 transmits a signal to the input signal reception unit 4203 indicating an updating of document display. It should be noted here that in the present embodiment, other buttons on the remote controller 501, such as the "Menu Display" button 503, are not used for operations related to document display.

On receiving a signal indicating document display from the input operation unit 4202, the input signal reception unit 4203 gives an indication for document display to the control unit 4204. On receiving an update document display signal, the input signal reception unit 4203 stores the signal in a buffer which is then read by the control unit 4204.

On receiving a document display indication from the input signal reception unit 4203, the control unit 4204 gives an indication to the display control unit 4205 for document display for the set of data at the top of the data storage unit 4201. At the same time, the control unit 4204 activates the text focus movement unit 4207. On receiving an indication from the text focus movement unit 4207 indicating that a predetermined time has expired, the control unit 4204 judges whether the input signal reception unit 4203 has received a signal indicating an updating of the displayed document, and if so, indicates an updating of document display to the display control unit 4205. When no indication for an updating of document display has been received, the control unit 4204 gives the text focus movement unit 4207 an indication to increment the text counter N.

On receiving an indication for document display from the control unit 4204, the display control unit 4205 reads the data stored at the top of the data storage unit 4201 and has this data displayed by the display unit 4206. On receiving notification of the value of the text counter N from the text focus movement unit 4207, the display control unit 4205 has the Nth text item in the data being displayed by the display unit 4206 displayed in a way showing that it is currently focused. Here, if a text item is currently in focus and a notification of the value of the text counter indicates a different text item, the focus display is removed from this first text item. On receiving an indication for updating document display from the control unit 4204, the display control unit 4205 reads the set of data which is linked to the text item which is currently in focus from the data storage unit 4201, and has the display unit 4206 update the display to show this new data. At the same time, the display control unit 4205 gives an indication for updated data display to the text focus movement unit 4207.

The display unit 4206 can be made up of a TV, a CRT computer display screen or a liquid crystal display. The display unit 4206 displays data and menus according to control by the display control unit 4205.

The text focus movement unit 4207 includes a text counter N and a timer. The text focus movement unit 4207 reads the total number NE of text items included in the set of data at the top of the data storage unit 4201 from the control unit 4204, sets the text counter N at "1", activates the timer, and informs the display control unit 4205 of the value of the text counter N. After the timer has reached a predetermined time, the text focus movement unit 4207 gives the control unit 4204 an indication showing that the predetermined time has been reached.

On receiving an indication for updated display of data from the control unit 4204, the text focus movement unit 4207 reads the total number NE of text items in the data being displayed, and sets the text counter at "0". When the text counter has been set at "0", or when the an indication for incrementing the text counter is received from the control unit 4204, the text focus movement unit 4207 increments the value of the text counter by "1". After incrementing the value of the text counter, the text focus movement unit 4207 judges whether the value "N−1" is equal to the total number NE of text items in the present data, and if so, resets the value of the text counter N to "1". When the numbers are not equal, the value of the text counter N is left unchanged, and is sent to the display control unit 4205, with the text focus movement unit 4207 restarting the timer at the same time. When the timer reaches the predetermined time, the text focus movement unit 4207 once again gives the control unit 4204 a message showing that the predetermined time has been reached.

Figure 44:
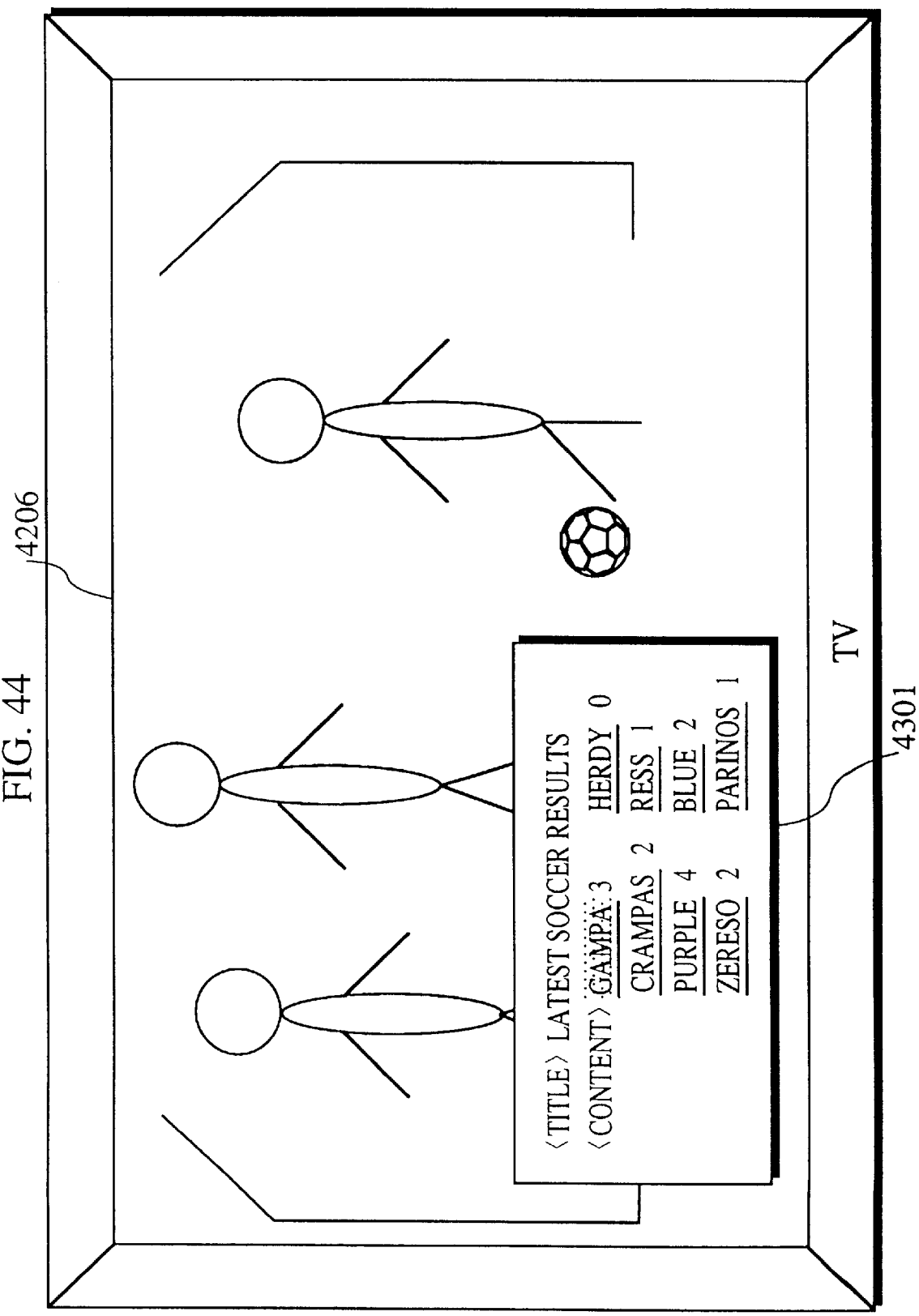
FIG. 44 shows an example display of data by the display unit of the present embodiment.

The following explanation deals with the case when a plurality of sets of data, such as data 4301, are stored in the data storage unit 4201. Here, if the user presses the "Document Display" button 502 on the remote controller 501, the data 4201 is displayed on the display unit 4206 as shown in FIG. 44. At this point, the text item "Gampa" is displayed with shading to show that it is currently in focus. Once a predetermined time, such as three seconds, has passed, this shading is moved to the next text item "Herdy" to show that this is now in focus. After another three seconds have passed, the shading is moved once again to the next text item "Crampas" to show that this is now in focus.

Figure 45:
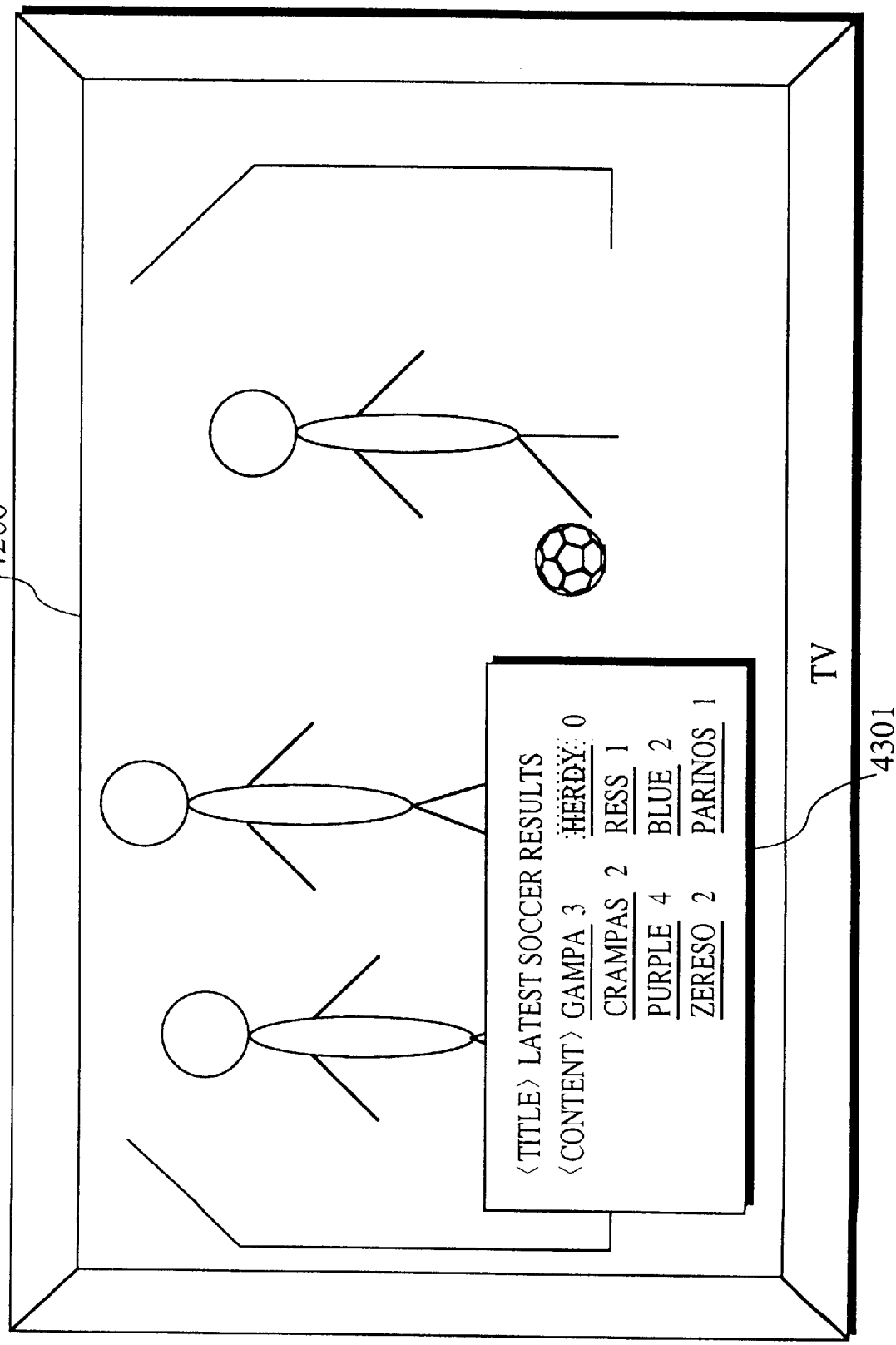
FIG. 45 shows another example display of data by the display unit of the present embodiment.

As described above, a timer is provided in the text focus movement unit 4207 so that the display control unit 4205 can successively move the focus display to a next text item every time the predetermined time, here three seconds, has passed. If the user presses the "Enter" button 504 on the remote controller 501 with the display of the display unit 4206 in the state shown in FIG. 45, the data 4303 liked to the text item "Herdy" is displayed by the display unit 4206.

Figure 46:
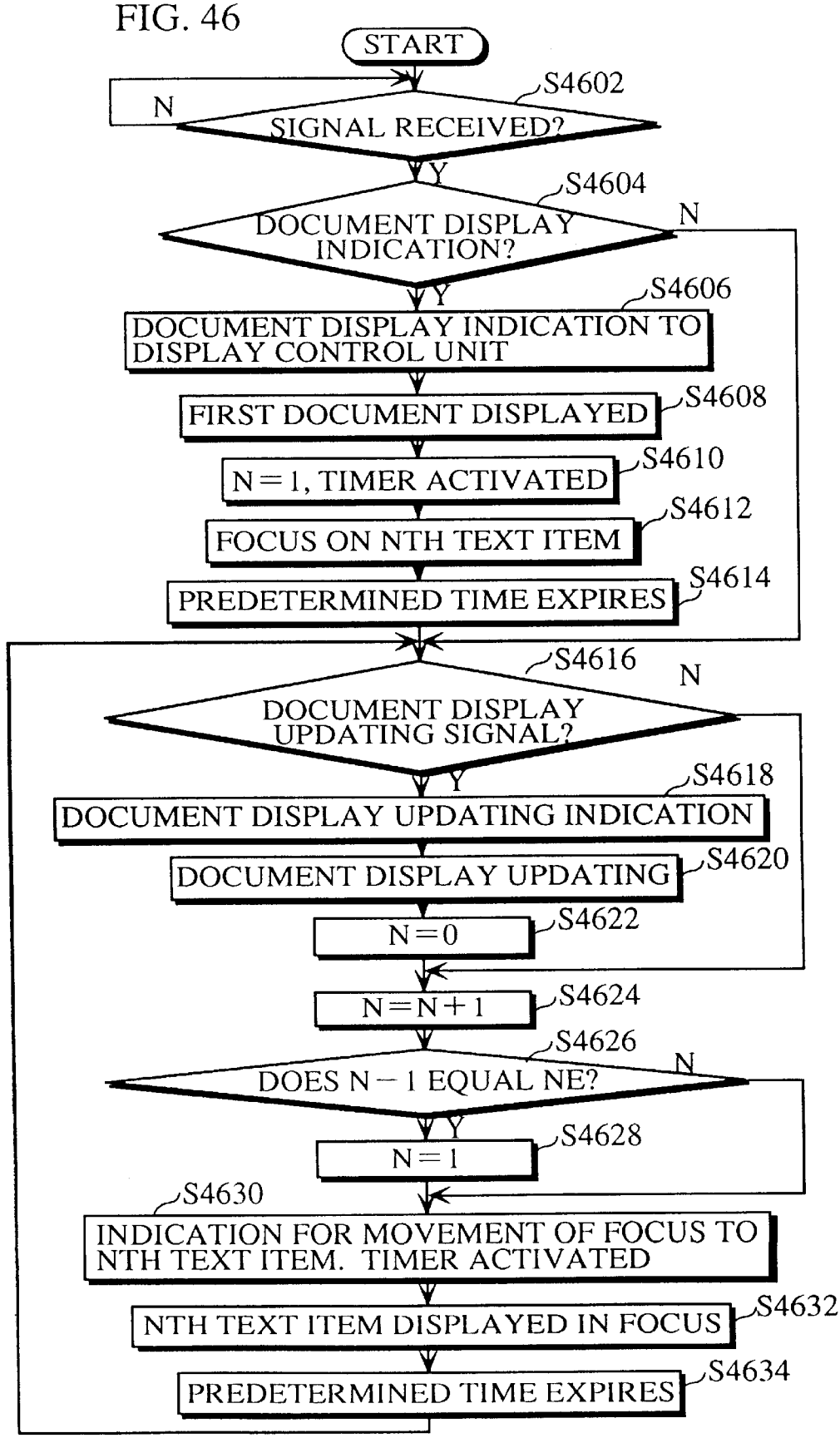
FIG. 46 is a flowchart for explaining the operation of the present embodiment.

The following is an explanation of the operation of the present embodiment, with reference to the flowchart in FIG. 46.

The input signal reception unit 4203 waits for the transmission of a signal corresponding to one of the buttons on the remote controller 501 being pressed (S4602).

The control unit 4204 judges whether an indication received from the input signal reception unit 4203 is a document display indication (S4604), and if so, gives the display control unit 4205 a document display indication (S4606). If not, the processing advances to S4616.

The display control unit 4205 reads the data stored at the top of the data storage unit 4201 and has the data (the first document) displayed by the display unit 4206 (S4608).

The text focus movement unit 4207 reads the total number NE of text items included in this set of data stored at the top of the data storage unit 4201 and stores the total number NE, sets the text counter N at "1", and activates the timer (S4610).

On receiving notification of the text counter N from the text focus movement unit 4207, the display control unit 4205 displays the Nth text item in the data displayed on the display unit 4206 with a highlight showing that it is in focus (S4612).

Once the predetermined time counted by the timer has expired, the text focus movement unit 4207 gives the display control unit 4205 an indication that the predetermined time has been reached (S4614).

In S4616, the display control unit 4205 judges whether an update display document signal has been received by the input signal reception unit 4203, and if so, gives the display control unit 4205 and the text focus movement unit 4207 an indication for updating document display (S4618).

If not, the processing advances to S4624.

The display control unit 4205 reads the data linked to the Nth text item in the data currently being displayed by the display unit 4206, and has the new data displayed by the display unit 4206 (S4620).

The text focus movement unit 4207 reads the total number NE of text items included in the newly displayed set of data, stores the total number NE, and resets the text counter N at "0" (S4622). In S4624, the text focus movement unit 4207 adds one to the value of the text counter "N", and judges whether the value (N−1) is equal to the total number NE of text items (S4626). If so, the text focus movement unit 4207 sets the text counter N at "1" (S4628), while when the values are different, the processing advances to S4630.

The text focus movement unit 4207 gives an indication to the display control unit 4205 to move the focus to Nth text item in the data displayed by the display unit 4206, and activates the timer (S4630).

The display control unit 4205 has the Nth text item in the data displayed by the display unit 4206 displayed in focus (S4632).

When the timer indicates that the predetermined time has expired, the text focus movement unit 4207 gives an, indication showing that the time has expired to the control unit 4204 (S4634), and the processing returns to S4616.

As described above, the focus is successively moved from text item to text item in the data when the predetermined time expires, so that the user can easily view the desired linked data by merely pressing the "Enter" button on the remote controller 501.

It should be noted that while the present embodiment was described as updating the document display after the predetermined time has passed, as shown by S4616 and S4634 in the flowchart of FIG. 46, interrupt processing may be performed so that the updating of document display is performed when there has been a document display updating indication.

Sixth Embodiment

Figure 47:
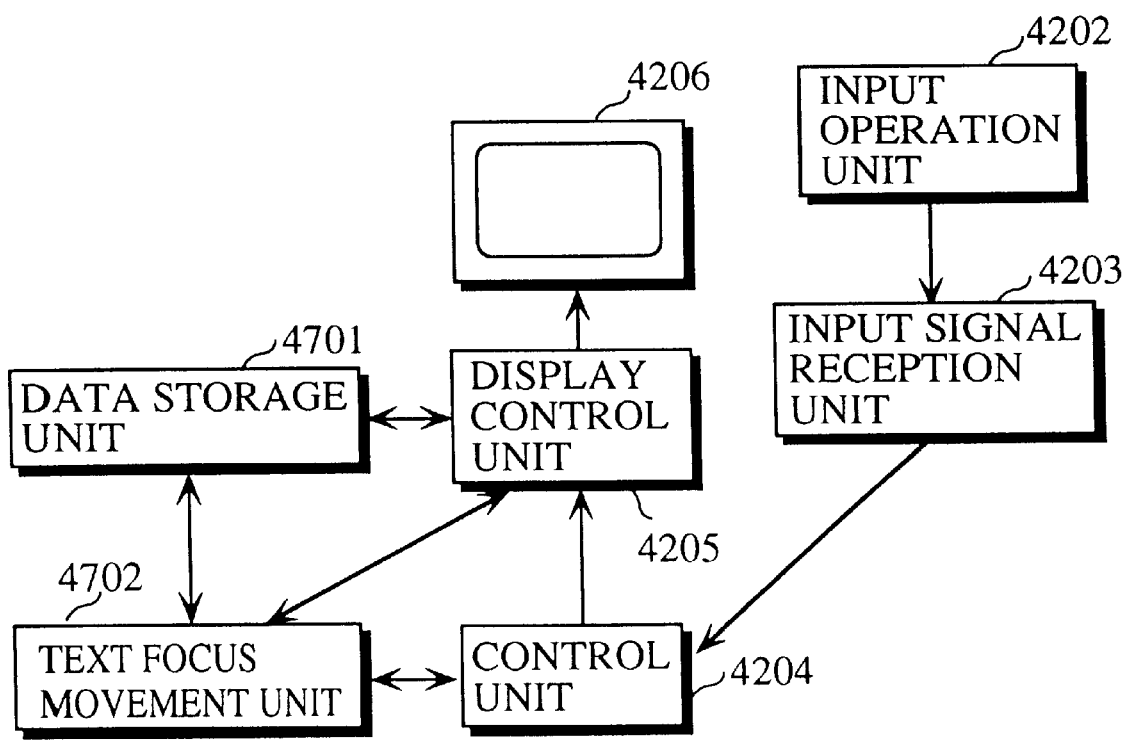
FIG. 47 shows the construction of the data processing apparatus of the sixth embodiment of the present invention.

The construction of the data processing apparatus of the sixth embodiment of the present invention is shown in FIG. 47. As shown in the drawing, the data processing apparatus is composed of a data storage unit 4701, an input operation unit 4202, an input signal reception unit 4203, a control unit 4204, a display control unit 4205, a display unit 4206, and a text focus movement unit 4702. Here, with the exceptions of the data storage unit 4701 and the text focus movement unit 4702, the construction of this data processing apparatus is the same as that in the fifth embodiment, so that elements which are the same as the fifth embodiment have been given the same reference numerals and their explanation has been omitted. The following explanation will focus on the elements which are unique to the present embodiment.

In addition to the plurality of sets of data shown in FIG. 43 which stored by the data storage unit 4201, the data storage unit 4701 stores a focus time correspondence table 4803 which includes a list of text items 4801 included in data and a focus time 4802 for each text item. As examples, the focus is maintained for five seconds for the text item "Gampa", while the focus is maintained for three seconds for the text item "Herdy". This is also the case for other text items.

The difference between the text focus movement unit 4702 and the text focus movement unit 4207 is that the timer in the text focus movement unit 4702 measures the focus time for the present text item which is stored in the focus time correspondence table 4803 in the data storage unit 4701, before the focus moves to the next text item.

In more detail, on being activated by the control unit 4204, the input operation unit 4202 reads the total number NE of text items in the set of data stored at the top of the data storage unit 4701, as well as reading the focus time of the first text item in this data from the focus time correspondence table 4803. The text focus movement unit 4702 then sets the text counter N at "1", activates the timer, and informs the display control unit 4205 of the value "1" of the text counter N.

When the timer has measured the focus time of the first text item, the text focus movement unit 4702 gives the control unit 4204 an indication that the focus time has expired. Also when informing the display control unit 4205 of the value of the text counter N, the text focus movement unit 4702 reads the focus time for the Nth text item in the data displayed by the display unit 4206 from the data storage unit 4701, and resets the timer. Once the timer has measured this focus time, the text focus movement unit 4702 gives the control unit 4204 an indication that the predetermined time has expired. The other functions of the text focus movement unit 4702 are the same as the text focus movement unit 4207.

The following is an explanation of the operation of the present embodiment. Here, there are only slight differences with the operation of the fifth embodiment, so that only these differences will be explained with reference to the flowchart in FIG. 46.

In S4610, the text focus movement unit 4702 reads the focus time for the Nth text item, in addition to the processing described above.

In S4614, when the timer has measured the focus time for the present text item, the text focus movement unit 4702 gives the control unit 4204 an indication that the predetermined time has expired.

In S4630, the text focus movement unit 4702 reads the focus time of the Nth text item, in addition to the processing described above.

In S4634, when the timer has measured the focus time for the Nth text item, the text focus movement unit 4702 gives the control unit 4204 an indication that the predetermined time has expired.

As described above, for the present embodiment, each text item is displayed with the focus for a period specified as its focus time, so that a following text item is displayed with the focus when such predetermined time expires. By doing so, the user can easily view the desired linked data by merely pressing the "Enter" button on the remote controller 501 when the appropriate text item is displayed with the focus.

Here, by giving different text items different focus times, it is possible to give a bias to the ease with which, data linked to text items can be displayed. As an example, when the data linked to a text item is a commercial message, if the focus time of corresponding text item is extended, the likelihood that the user will press the "Enter" button 504 and have the commercial message displayed can be increased. In such a situation, it would be logical to calculate the cost of such commercial message based on the length of this focus time.

Figure 48:
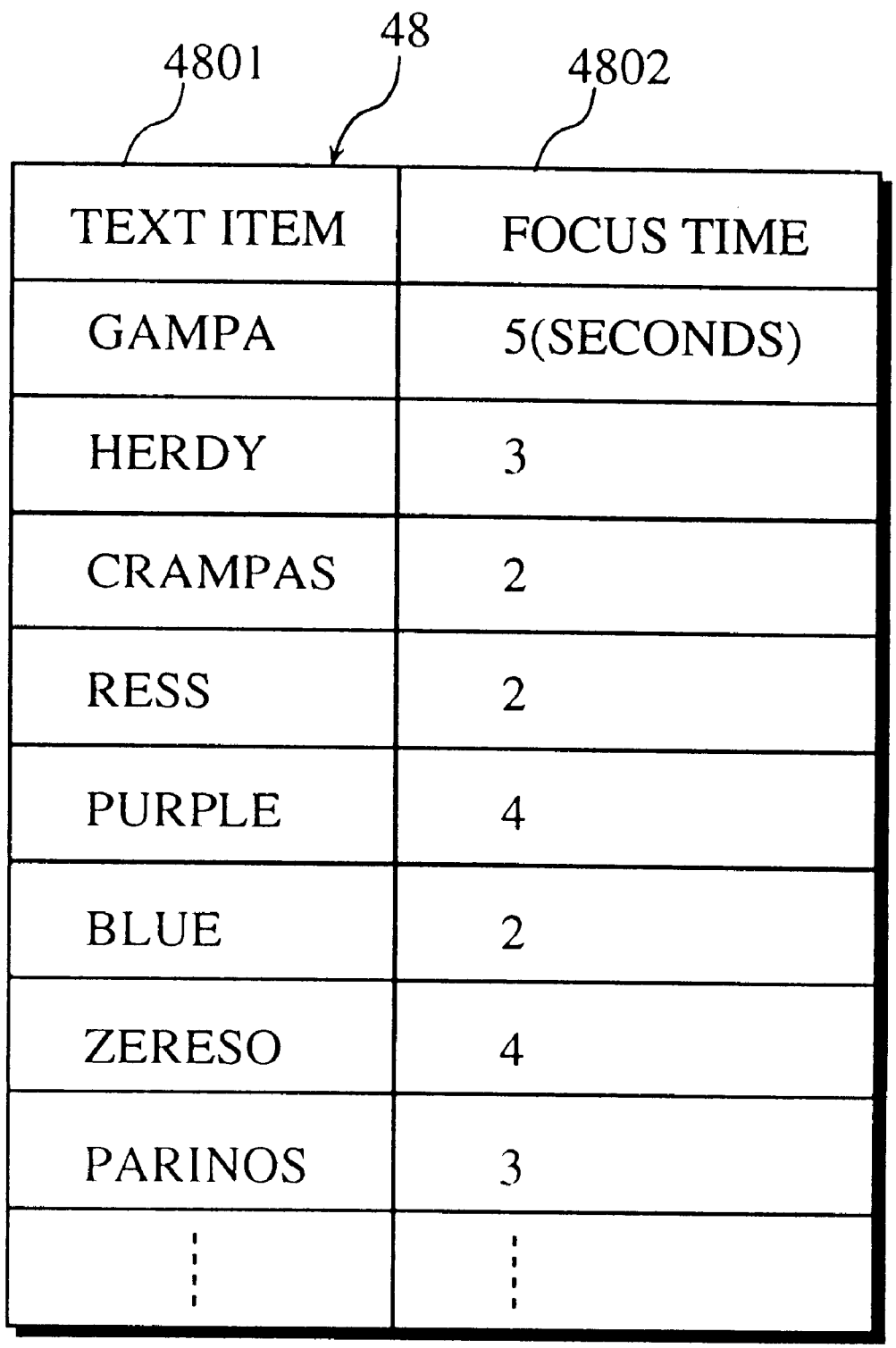
FIG. 48 shows the focus time correspondence table stored by the data storage unit in the present embodiment.
Figure 49:
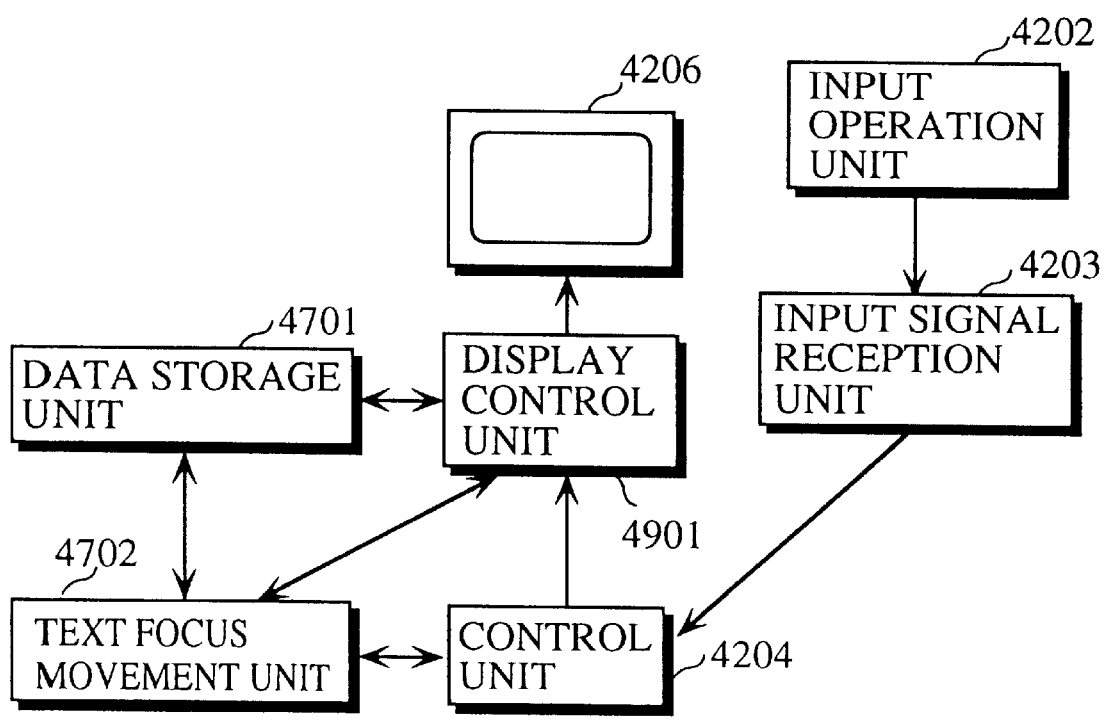
FIG. 49 shows the construction of the data processing apparatus of the seventh embodiment of the present invention.

In the present embodiment, the focus time correspondence table 4803, shown in FIG. 48 and stored in the data storage unit 4701, was described as storing a display time for the focus for each text item, although such a table need not be used, and the focus time may be added as an attribute value of each text item in a set of data.

Seventh Embodiment

The construction of the data processing apparatus of the seventh embodiment of the present invention is shown in FIG. 47. As shown in the drawing, the data processing apparatus is composed of a data storage unit 4701, an input operation unit 4202, an input signal reception unit 4203, a control unit 4204, a display control unit 4901, a display unit 4206, and a text focus movement unit 4702. Here, with the exception of the display control unit 4901, the construction of this data processing apparatus is the same as that in the sixth embodiment, so that elements which are the same as the sixth embodiment have been given the same reference numerals and their explanation has been omitted. The following explanation will focus on the elements which are unique to the present embodiment.

The display control unit 4901 includes the following functions, in addition to the functions provided in the display control unit 4205 in the sixth embodiment.

On receiving notification of the text counter N from the text focus movement unit 4207, the display control unit 4901 opens a window which in provided in a new data display region next to the data which is currently being displayed by the display unit 4206. The display control unit 4901 reads the data for the link address of the Nth text item in the data being displayed, and has this data displayed in the newly opened window of the display unit 4206. When this window has already been opened to display data, the displayed data is cleared and the newly read data is displayed in the window.

On receiving an indication for updating document display from the control unit 4204, the display control unit 4901 replaces the original data being displayed on the display unit 4206 with the data being displayed in the window which is newly opened in the data display region. In doing so, the display of data in the newly opened window is cleared.

Figure 50:
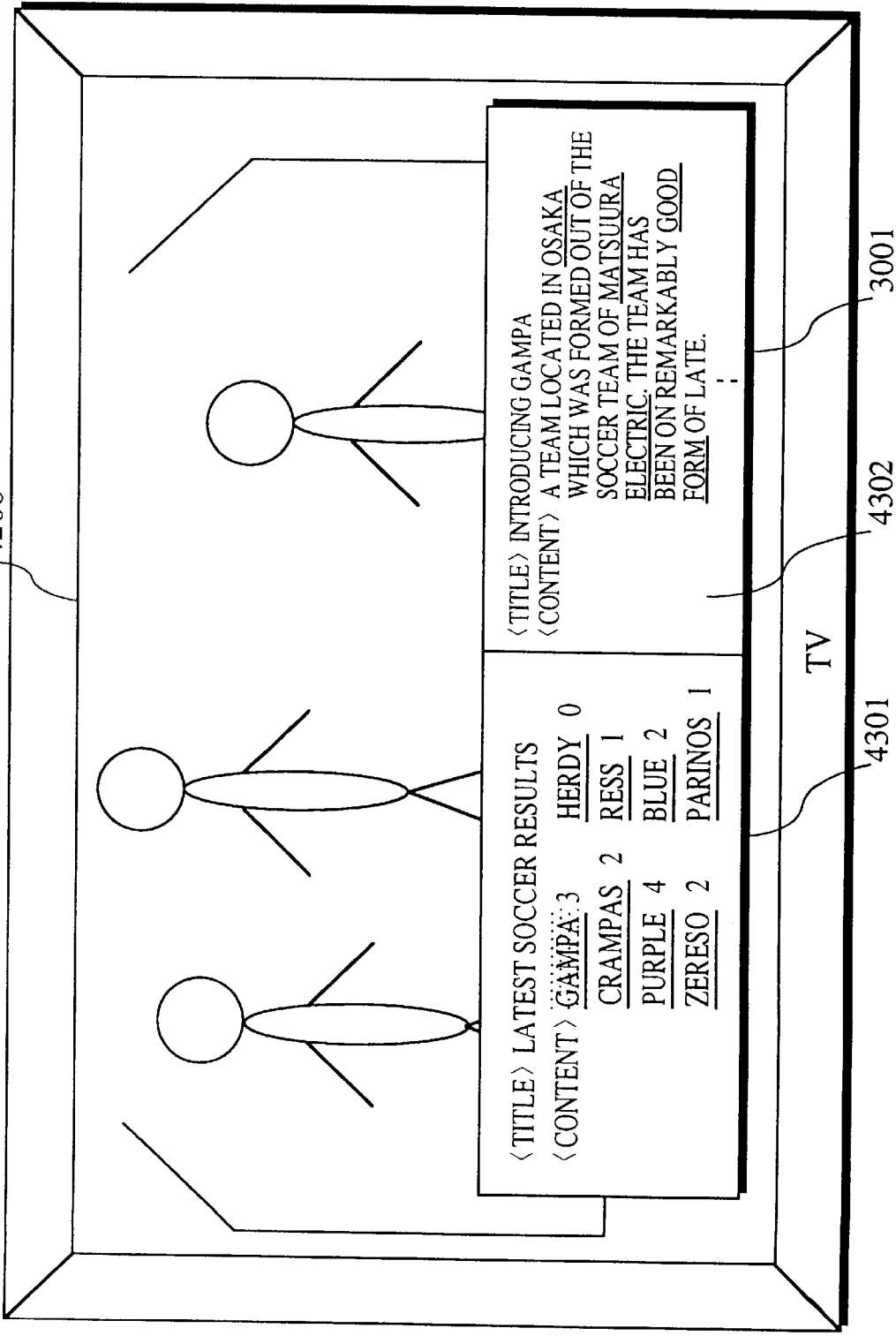
FIG. 50 shows an example display of data by the display unit of the present embodiment.
Figure 51:
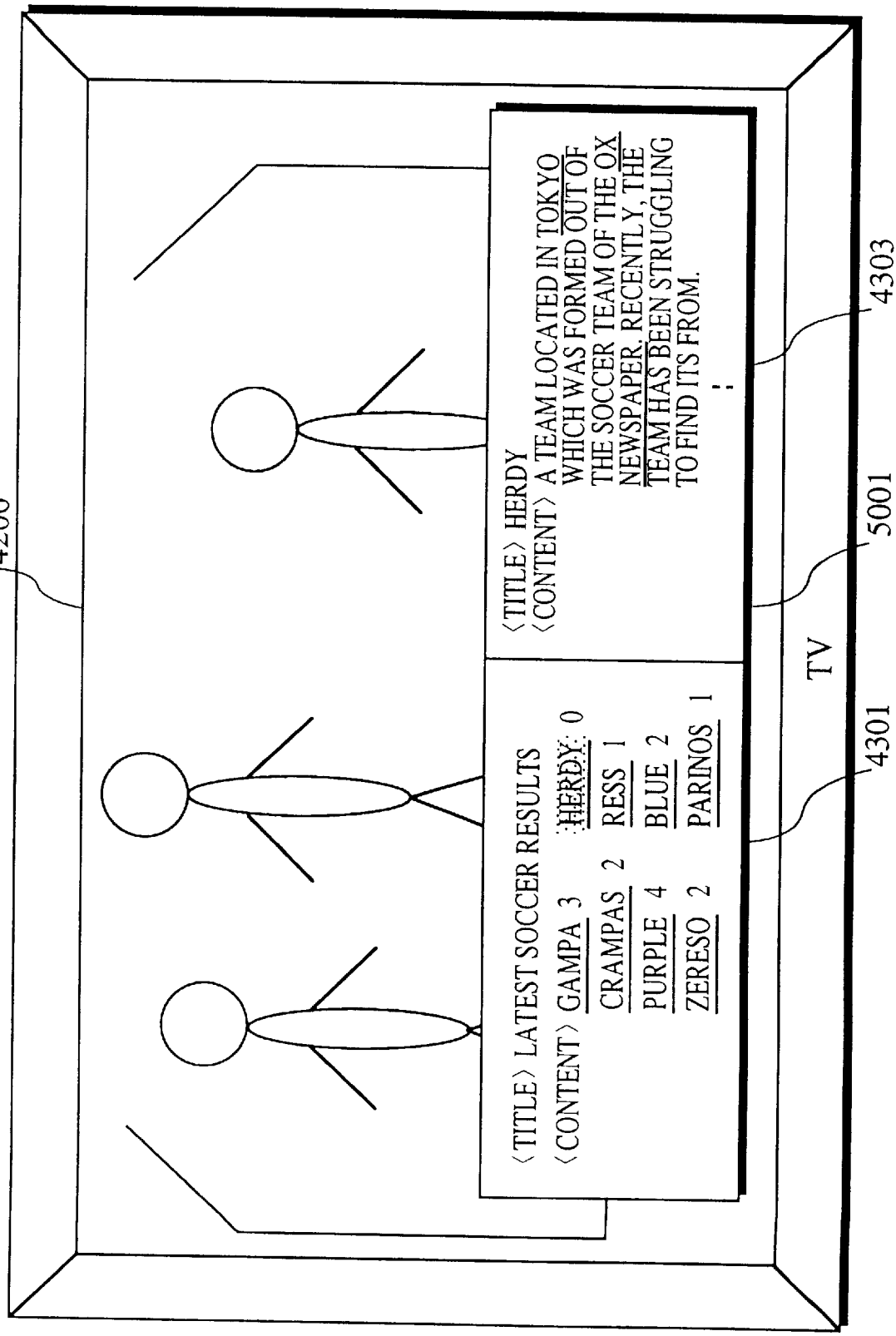
FIG. 51 shows another example display of data by the display unit of the present embodiment.

The following explanation refers to the case when the a plurality of sets of data, such as data 4301, are stored in the data storage unit 4701. When the user presses the "Document Display" button 502 on the remote controller 501, two sets of data, 4301 and 4302, are displayed on the display unit 4206 as shown in FIG. 50. More specifically, data 4301 at the top of the data storage unit 4701 is displayed on the display unit 4206, and, in a region adjacent to this data, a window 5001 is opened and the data 4302 at the link address of the text item "Gampa" which is in focus in this data 4301 is displayed is this window 5001. As shown in FIG. 48, text item "Gampa" has a five-second focus time, so that once this five-second focus time of "Gampa" has expired, data 4303 at the link address for the text item "Herdy" which is now in focus is displayed on the display unit 4206.

It should be noted here that since the operation of the present embodiment is simply the operation of the sixth embodiment with the addition of the display of data on the display unit 4206 for the link address of a text item which is currently in focus, no description of the operational flow will be given.

Here, while the present embodiment has been described as displaying each set of data for a link address of a text item in focus in its entirety, the data may instead be only partially displayed, which could mean that only the title or the first three lines are displayed. By doing so, the time required to read the data can be reduced.

As described above, by having data at a link address of a text item in focus displayed in addition to the currently displayed data, the present embodiment facilitates user operations of the "Enter" button 504 which update the display data.

Finally, the present embodiment has been described as an addition to the construction of the sixth embodiment, although it should be obvious that it may alternatively be constructed as an addition to the fifth embodiment.

Eighth Embodiment

Figure 52:
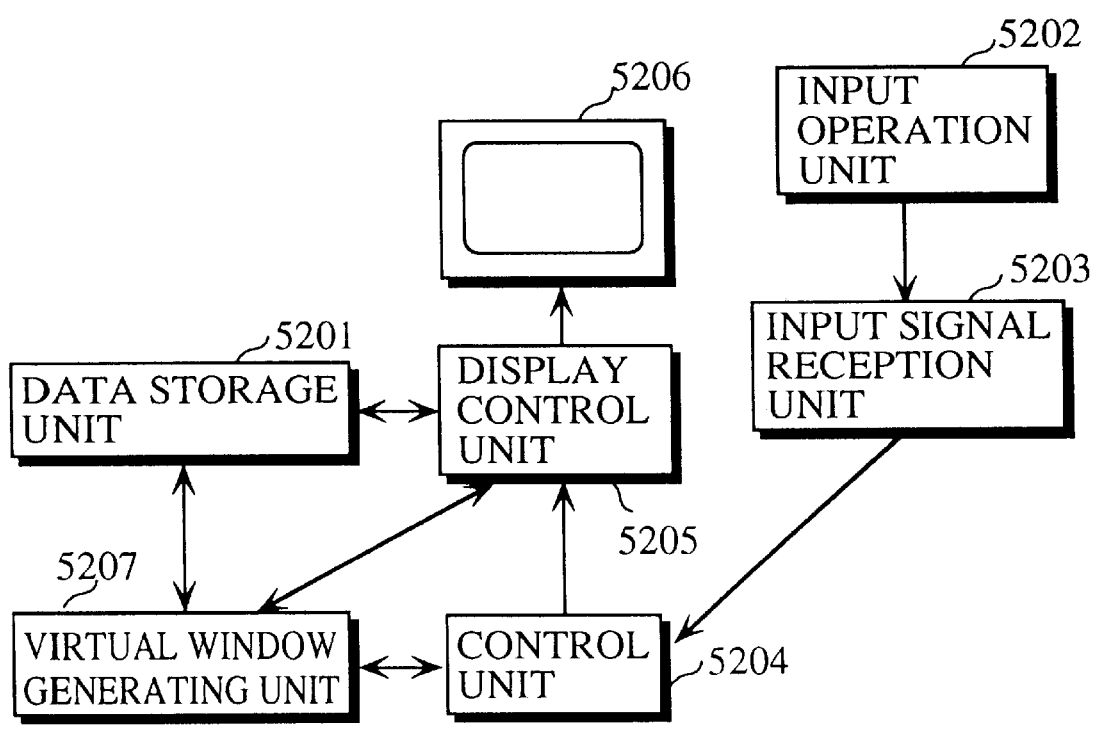
FIG. 52 shows the construction of the data processing apparatus of the eighth embodiment of the present invention.

The construction of the data processing apparatus of the eighth embodiment of the present invention is shown in FIG. 52. As shown in the drawing, the data processing apparatus is composed of a data storage unit 5201, an input operation unit 5202, an input signal reception unit 5203, a control unit 5204, a display control unit 5205, a display unit 5206, and a virtual window generating unit 5207.

The data storage unit 5201 can be made up of RAM, and stores a plurality of sets of data such as 5301, 5302, and 5303 in FIG. 53. Data 5301 includes a title and a content, with the content including text items which are linked to other sets of data. As one example, the text item "Gampa" is linked to data 5302, as shown by the arrow 5304. Here, linked text items in the sets of data shown in FIG. 53 have been underlined.

As one example, the remote controller 501 used as the input operation unit 108 in the first embodiment may be used as the input operation unit 5202. When the user presses the "Document Display" button 502, the remote controller 501 transmits a signal to the input signal reception unit 5203 indicating document (data) display. When the user presses the "Up" button 505 or the "Down" button 506, the remote controller transmits a signal indicating backward or forward movement of the virtual window which is currently in focus (hereinafter called the "current virtual window"). When the user presses the "Left" button 507 or the "Right" button 508, the remote controller 501 transmits a signal indicating movement of the focus to a previous or next text item. In the same way, when the user presses the "Enter" key 504, the remote controller 501 transmits a signal indicating an updating of document display.

On receiving an indication for document display from the input operation unit 5202, the input signal reception unit 5203 gives an indication for data display to the control unit 5204. In the same way, on receiving an indication for backward or forward movement of the current virtual window, the input signal reception unit 5203 gives the control unit 5204 a corresponding indication. On receiving an indication for movement of the focus to a previous or next text item, the input signal reception unit 5203 gives the control unit 5204 an indication for movement of the focus. Finally, on receiving an indication for updating data display, the input signal reception unit 5203 gives the control unit 5204 a corresponding indication for updating data display.

On receiving an indication for data display from the input signal reception unit 5203, the control unit 5204 gives the display control unit 5205 an indication for delta display and gives the virtual window generating unit 5207 an indication for the generation of a virtual window. On receiving an indication for backward or forward movement of the current virtual window from the input signal reception unit 5203, the control unit 5204 gives an appropriate indication to the display control unit 5205. In the same way, on receiving an indication for backward or forward movement of the focus from the input signal reception unit 5203, the control unit 5204 gives an appropriate indication to the display control unit 5205. Similarly, on receiving an indication for an updating of data display from the input signal reception unit 5203, the control unit 5204 gives an appropriate indication to the display control unit 5205.

On receiving an indication for data display, the display control unit 5205 reads the data stored at the top of the data storage unit 5201 and has it displayed by the display unit 5206. On receiving positions for a boundary line from the virtual window generating unit 5207, the display control unit 5205 has a virtual window surrounded by the boundary line and the external wall of part of the window above the boundary line displayed by the display unit 5206. On receiving the position of the next boundary line, the display control unit 5205 has a virtual window which is bordered the previous boundary line at the top, the present boundary line at the bottom, and the left and right walls of the window displayed by the display unit 5206. On being informed of the position of a bottom line of a window, the display control unit 5205 has a virtual window which is surrounded by the previous boundary line and the external wall of the part of the window below this boundary line displayed by the display unit 5206.

Once it has ended the display of virtual windows, the display control unit 5205 has the highest virtual window on the display displayed with a thick border line as the default current virtual window.

On receiving an indication from the control unit 5204 to move the current virtual window to the next virtual window, the display control unit 5205 has the current virtual window currently displayed with a thick border line displayed as a normal virtual window, and has the next virtual window below it displayed with a thick border line. In the same way, on receiving an indication from the control unit 5204 to the current virtual window to a previous virtual window, the display control unit 5205 has the current virtual window currently displayed with a thick border line displayed as a normal virtual window, and has the next virtual window above it displayed with a thick border line.

On receiving an indication from the control unit 5204 to move the focus to a next text item, the display control unit 5205 removes the shading from the Nth text item currently displayed with the shading for the focus, and has the (N+1)th text item displayed with the shading. In the same way, on receiving an indication from the control unit 5204 to move the focus to a previous text item, the display control unit 5205 removes the shading from the Nth text item currently displayed with the shading for the focus, and has the (N−1)th text item displayed with the shading.

On receiving an indication for updating data display from the control unit 5204, the display control unit 5205 reads the data which is the link address of the text item which is currently in focus from the data storage unit 5201, and has the data displayed in the window of the display unit 5206 updated to this newly read data. The display of a virtual window is then performed in the same way as with the first set of data.

The display unit 5206 can be made up of a TV, a CRT computer display screen or a liquid crystal display. The display unit 5206 displays data in windows according to control by the display control unit 5205.

On receiving an indication from the control unit 5204 to generate a virtual window, the virtual window generating unit 5207 finds out what data the display control unit 5205 is having displayed on the display unit 5206. It then finds the data in the data storage unit 5201 and counts the total number NE of text items included in the data. The virtual window generating unit 5207 then judges whether this total number NE of text items exceeds a predetermined maximum number NS of text items (the maximum number of text items which can be accommodated in a virtual window). When the total number NE is equal to or below the maximum number NS, the virtual window generating unit 5207 judges that there is no need to generate a virtual window and gives the control unit 5204 an indication showing that it has finished its processing.

On judging that the total number NE exceeds the maximum number NS, the virtual window generating unit 5207 positions a pointer at the start of the data being displayed by the data storage unit 5201, and reset the text counter N to "0". Next, the virtual window generating unit 5207 obtains the character string at the pointer position and judges whether the character string is a text item (a character string which is linked to another set of data). If the character string is a text item, "1" is added to the text counter N. The virtual window generating unit 5207 then advances the pointer, and obtains the character string at the pointer position. Once again, if the character string at the pointer position is a text item, "1" is added to the text counter N. The virtual window generating unit 5207 then advances the pointer, and judges whether the text counter N is equal to the maximum number NS of text items. When N is not equal to NS, the virtual window generating unit 5207 obtains the character string at the pointer position, adds "1" to the text counter N if the character string is a text item, and repeats the processing described above.

On finding that the text counter N is equal to the maximum number NS, the virtual window generating unit 5207 finds the position of a boundary line which separates the part of the data which includes the NS text items before the present pointer position from the part of the data which follows after the present pointer position. It then informs the display control unit 5205 of the position of this boundary line.

The virtual window generating unit 5207 also judges whether the pointer is positioned at the end of the data.

If the pointer is not positioned at the end of the data, the virtual window generating unit 5207 resets the text counter N at zero immediately after finding the position of the boundary line for virtual window generation, obtains the character string at the pointer position, judges whether the obtained character string is a text item, and repeats the processing as described above.

When the pointer is positioned at the end of the data, but the virtual window generating unit 5207 has not just found the position of a boundary line, the virtual window generating unit 5207 informs the display control unit 5205 of the position of the bottom line of the window. If the pointer position is at the end of the data, and the virtual window generating unit 5207 has just found the position of a boundary line, the virtual window generating unit 5207 informs the control unit 5204 of the end of its processing.

Figure 54:
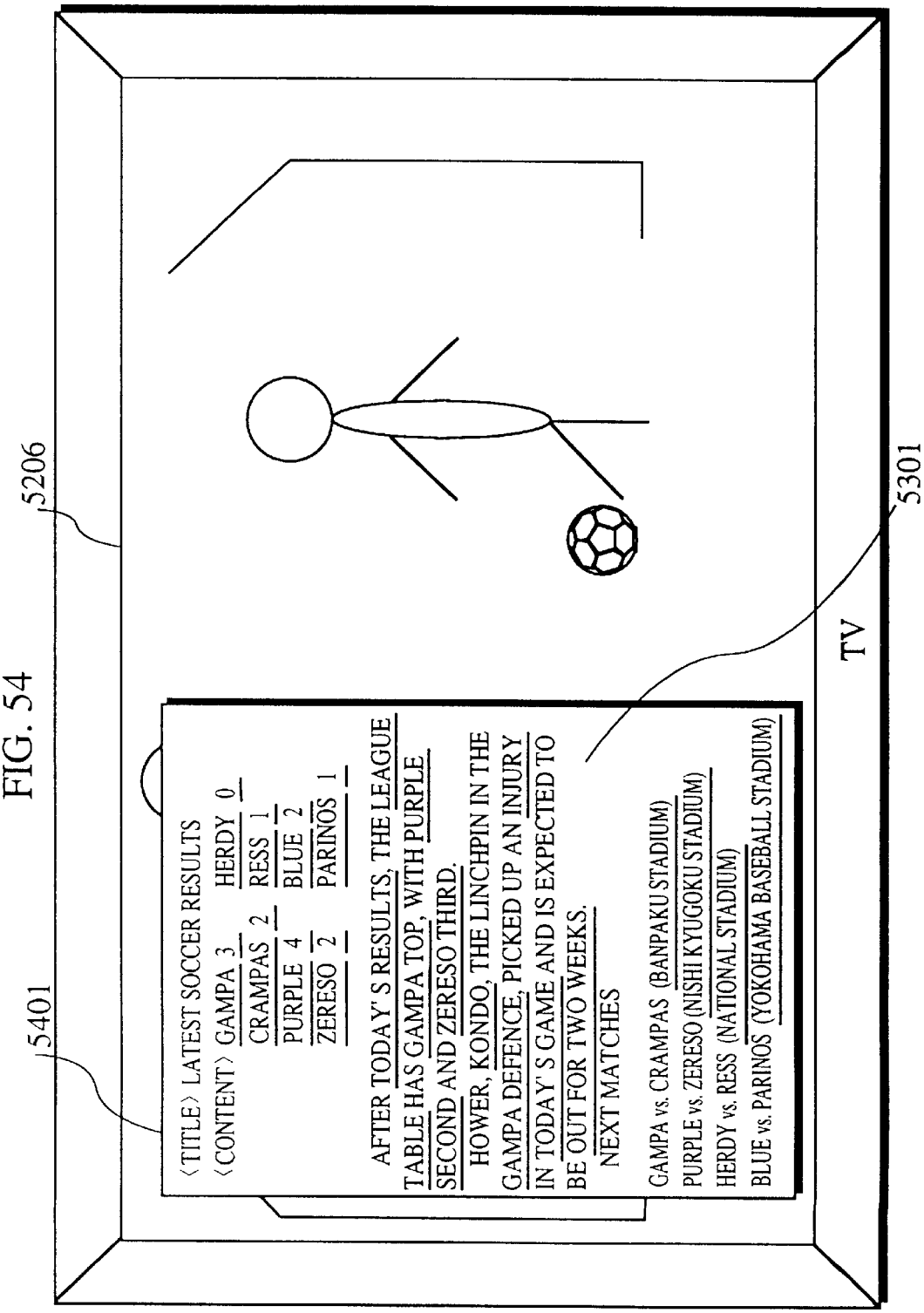
FIG. 54 shows an example display of data by the display unit of the present embodiment.
Figure 55:
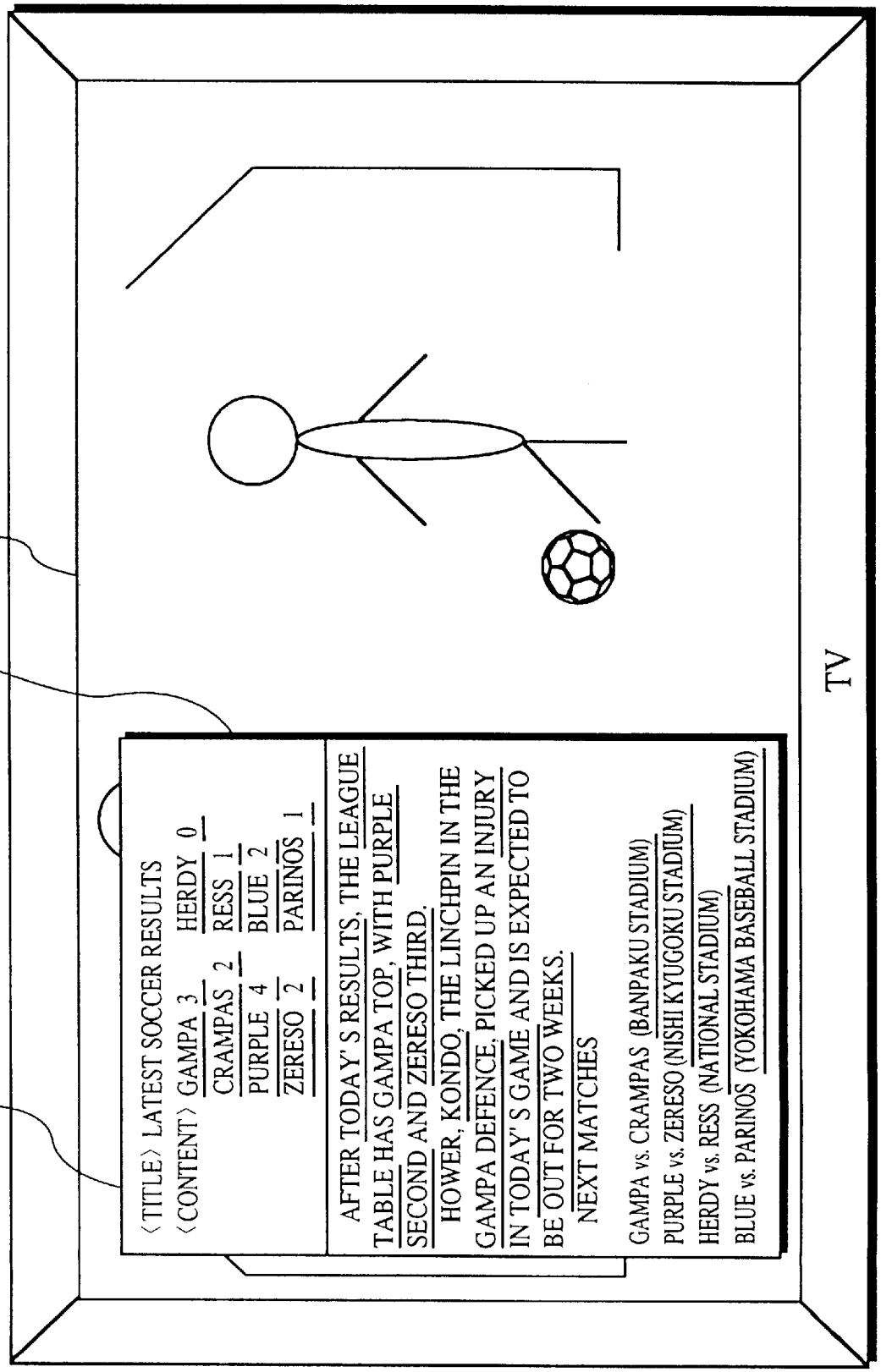
FIG. 55 shows an example display of a virtual window in the present embodiment.

The following explanation assumes the sets of data shown in FIG. 53 are stored in the data storage unit 5201. Here, FIG. 54 shows the display on the display unit 5206 just after the user has pressed the "Document Display" button 502 on the remote controller 501. This shows the display before the virtual window generating process is performed. The window 5401 is opened on the left side of the display unit 5206 and is used to display data 5301. Next, a first virtual window 5501 is generated by the virtual window generating unit 5207 and is displayed on the display unit 5206 by the display control unit 5205.

Figure 56:
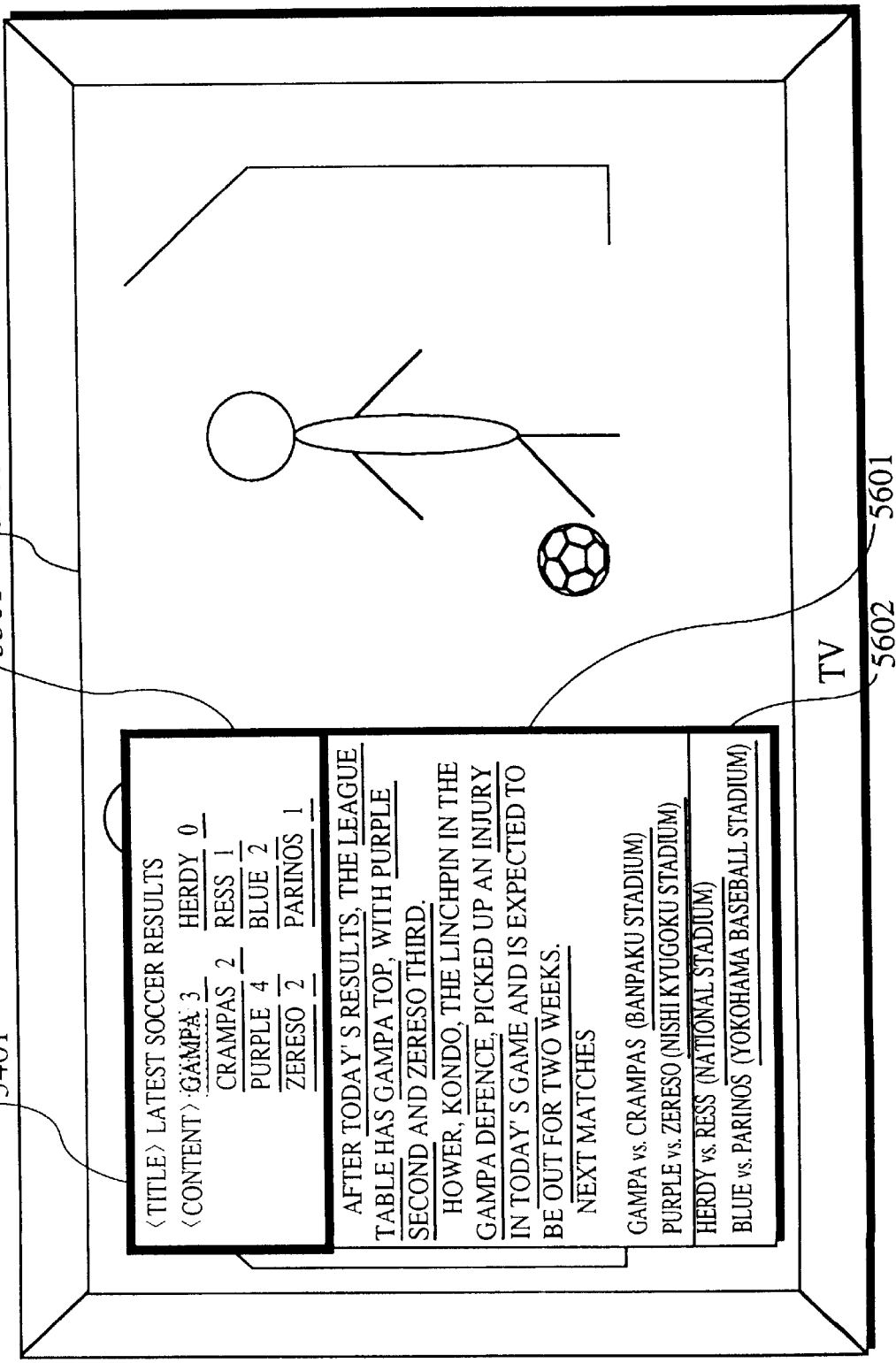
FIG. 56 shows an example display of the current virtual window in the present embodiment.
Figure 57:
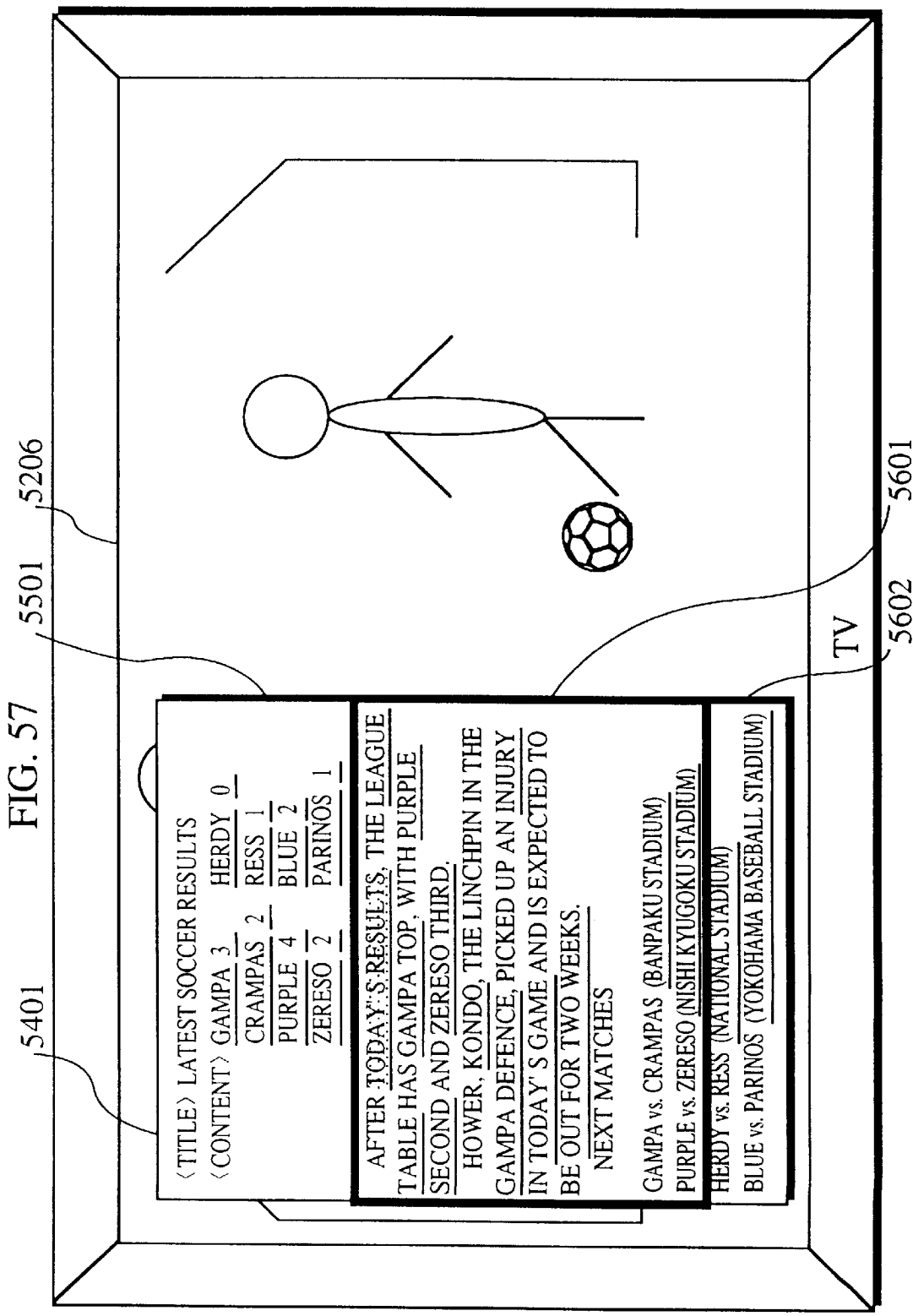
FIG. 57 shows another example display of the current virtual window in the present embodiment.

FIG. 56 shows the state when a second virtual window 5601 and a third virtual window 5602 generated by the virtual window generating unit 5207 are displayed by the display control unit 5205, with display control unit 5205 having the first virtual window displayed with a thick border line as the current virtual window. If, in this state, the user presses the "Down" button 506 on the remote controller 501, the second virtual window 5601 is made the current virtual window, as shown in FIG. 57. It should be noted here that in the present embodiment, the maximum number NS of text items which can be accommodated in on virtual window is set at "12", although this may be set at any arbitrary figure which is "2" or greater.

Figure 58:
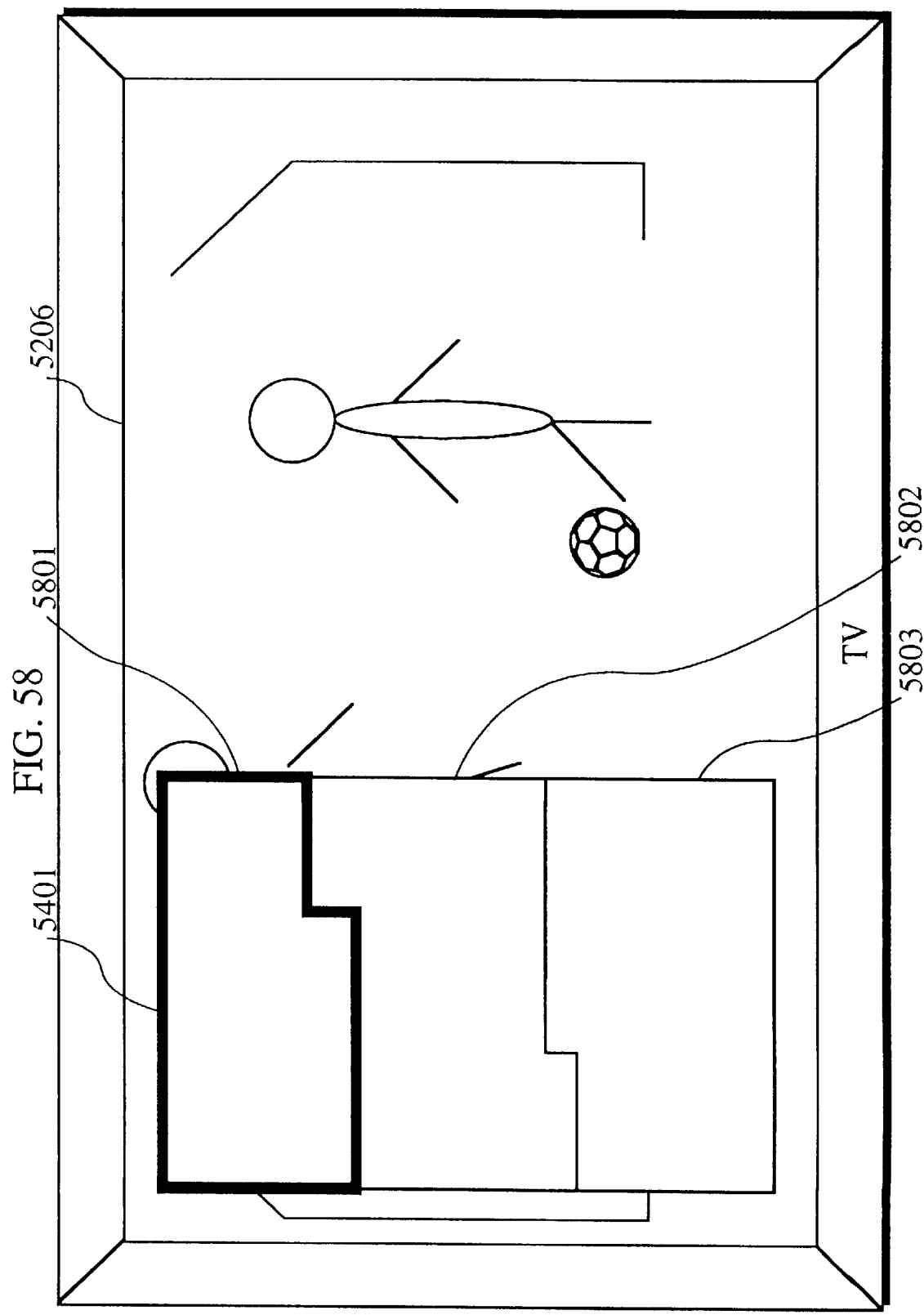
FIG. 58 shows another example display of the current virtual window in the present embodiment.

In the present embodiment, virtual windows 5501, 5601, and 5602 are rectangular, although virtual windows, such as 5801, 5802, and 5803 in FIG. 58, may be of any form, depending on the positions of the text items and the maximum number NS of text items.

Figure 59:
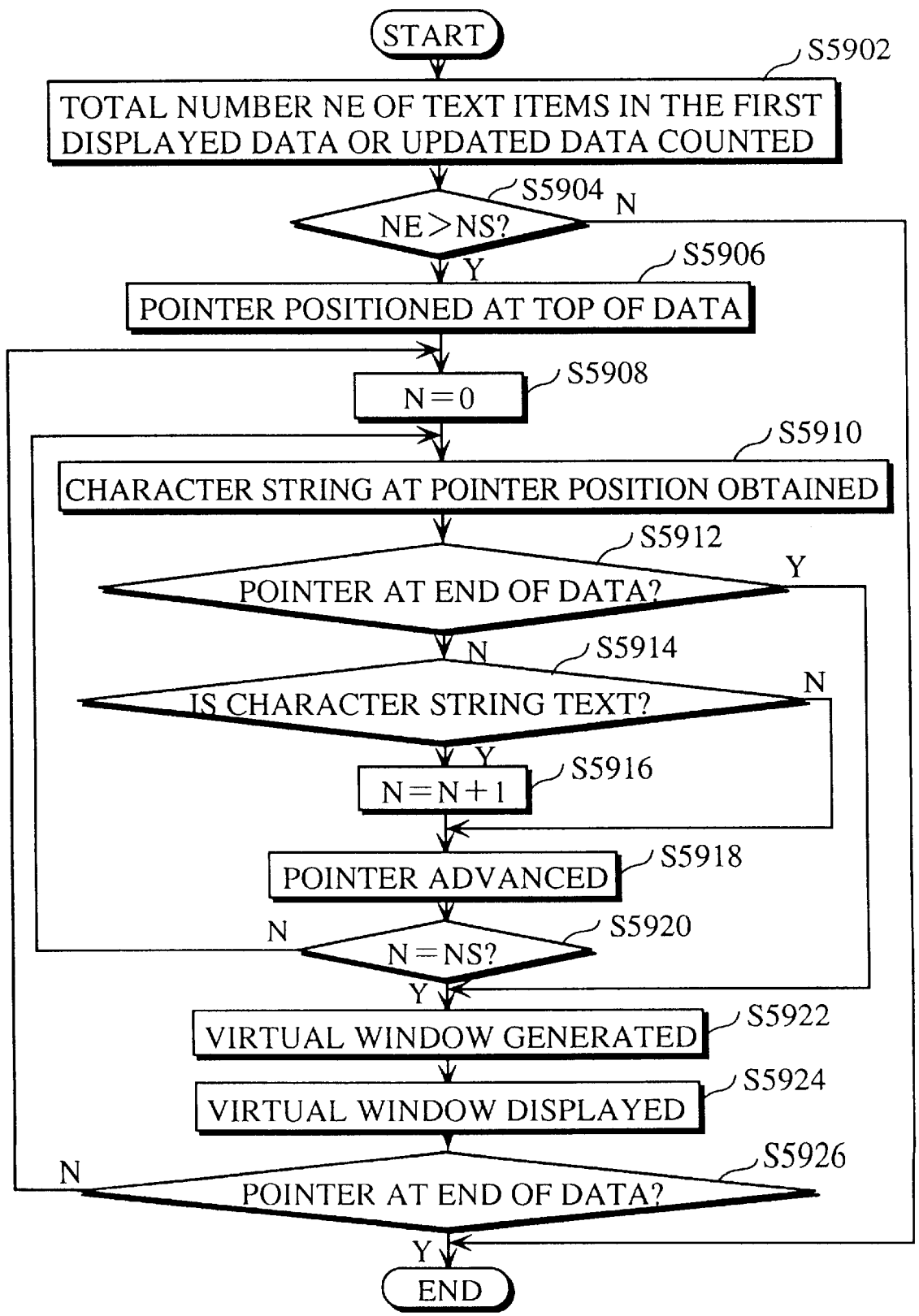
FIG. 59 is a flowchart for explaining the operation of the present embodiment.

The following is an explanation of the display of virtual windows in the present embodiment, with reference to FIG. 59.

When data is displayed on the display unit 5206, the virtual window generating unit 5207 counts the total number NE of text items in the displayed data (S5902). The virtual window generating unit 5207 then judges whether the total number NE exceeds the maximum number NS of text items which can be accommodated in one virtual window (S5904), and terminates its processing if NE does not exceed NS. When NE exceeds NS, it positions a pointer at the start of the displayed data in the data storage unit 5201 (S5906).

The virtual window generating unit 5207 resets the text counter N to zero (S5908), and obtains the character string at the pointer position from the data storage unit 5201 (S5910). The virtual window generating unit 5207 then judges whether the pointer is positioned at the end of the data (S5912), and if so, the processing advances to S5922. If the pointer is not positioned at the end of the data, the virtual window generating unit 5207 judges whether the character string at the pointer position is a text item (S5914), and advances the pointer (S5918), adding "1" to the text counter N if the character string is judged to be a text item (S5916).

The virtual window generating unit 5207 judges whether the text counter N is equal to the maximum number NS of text items (S5920), and if so, the processing advances to S5922. If not, the processing returns to S5910. In S5922, the virtual window generating unit 5207 finds the position of a boundary line for separating windows from the pointer position (S5922) and informs the display control unit 5205 of the position of the boundary line.

The display control unit 5205 has a virtual window displayed by the display unit 5206 starting from the position of this boundary line (S5924).

The virtual window generating unit 5207 judges whether the pointer is positioned at the end of the data (S5926), and if so, terminates its processing. If not, the processing returns to S5908.

In the present embodiment, virtual windows are used, with only a certain number of text items being allowed in each virtual window. As a result, when there are a large number of text items, the user has less trouble in moving between text items than before, and so can make their selection more easily.

Ninth Embodiment

Figure 60:
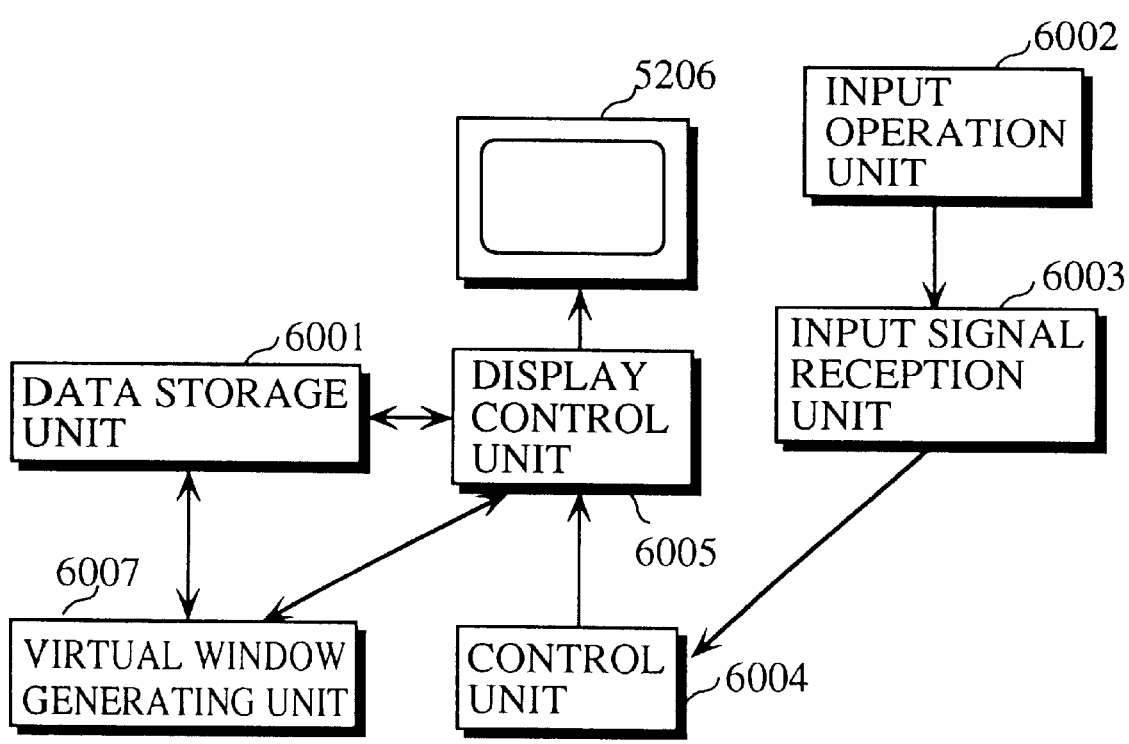
FIG. 60 shows the construction of the data processing apparatus of the ninth embodiment of the present invention.

The construction of the data processing apparatus of the ninth embodiment of the present invention is shown in FIG. 60. As shown in the drawing, the data processing apparatus is composed of a data storage unit 6001, an input operation unit 6002, an input signal reception unit .6003, a control unit 6004, a display control unit 6005, a display unit 5206, and a virtual window generating unit 6007. The data processing apparatus of the present embodiment is similar to the data processing apparatus of the eighth embodiment, so that the following explanation will only deal with the construction elements which are unique to the present embodiment.

The data storage unit 6001 can be made up of RAM and stores sets of data, such as data 5301 shown in FIG. 53. The text item number table 6101 is also written into this data storage unit 6001 by the virtual window generating unit 6007.

The input operation unit 6002 is equipped with the function described below, in addition to the functions of the input operation unit 5202 of the eighth embodiment.

When the user presses one of the channel buttons from "1" to "12" on the remote controller 501, the remote controller transmits a signal showing the chosen number to the input signal reception unit 6003.

In addition of the functions of the input signal reception unit 5203 in the eighth embodiment, the input signal reception unit 6003 receives a number signal from the input operation unit 6002 and informs the control unit 6004 of this number.

In addition to the functions of the control unit 5204, the control unit 6004 receives a notification of a number from the input signal reception unit 6003 and then informs the display control unit 6005 of this number.

The virtual window generating unit 6007 is equipped with the functions described below, in addition to the functions of the virtual window generating unit 5207 in the eighth embodiment.

When the virtual window generating unit 6007 obtains the character string at the pointer position, judges that the character string is a text item, and adds "1" to the text counter N, the virtual window generating unit 6007 also adds the text item in question and the value of the text counter N into the data storage unit 6001. Here, FIG. 61 shows the text item number table 6101 for data 5301 which is generated as described above. As shown in the figure, the text item number table 6101 stores text items 6102 and a number 6103 given to each corresponding text item in the table.

The display control unit 6005 is equipped with the functions described below, in addition to the functions of the display control unit 5205 of the eighth embodiment. When a virtual window is displayed as a current virtual window with a thick border line, the display control unit 6005 reads the text numbers of the text items included in this current virtual window and displays each text number in a small circle above and to the left of the corresponding text item.

Figure 62:
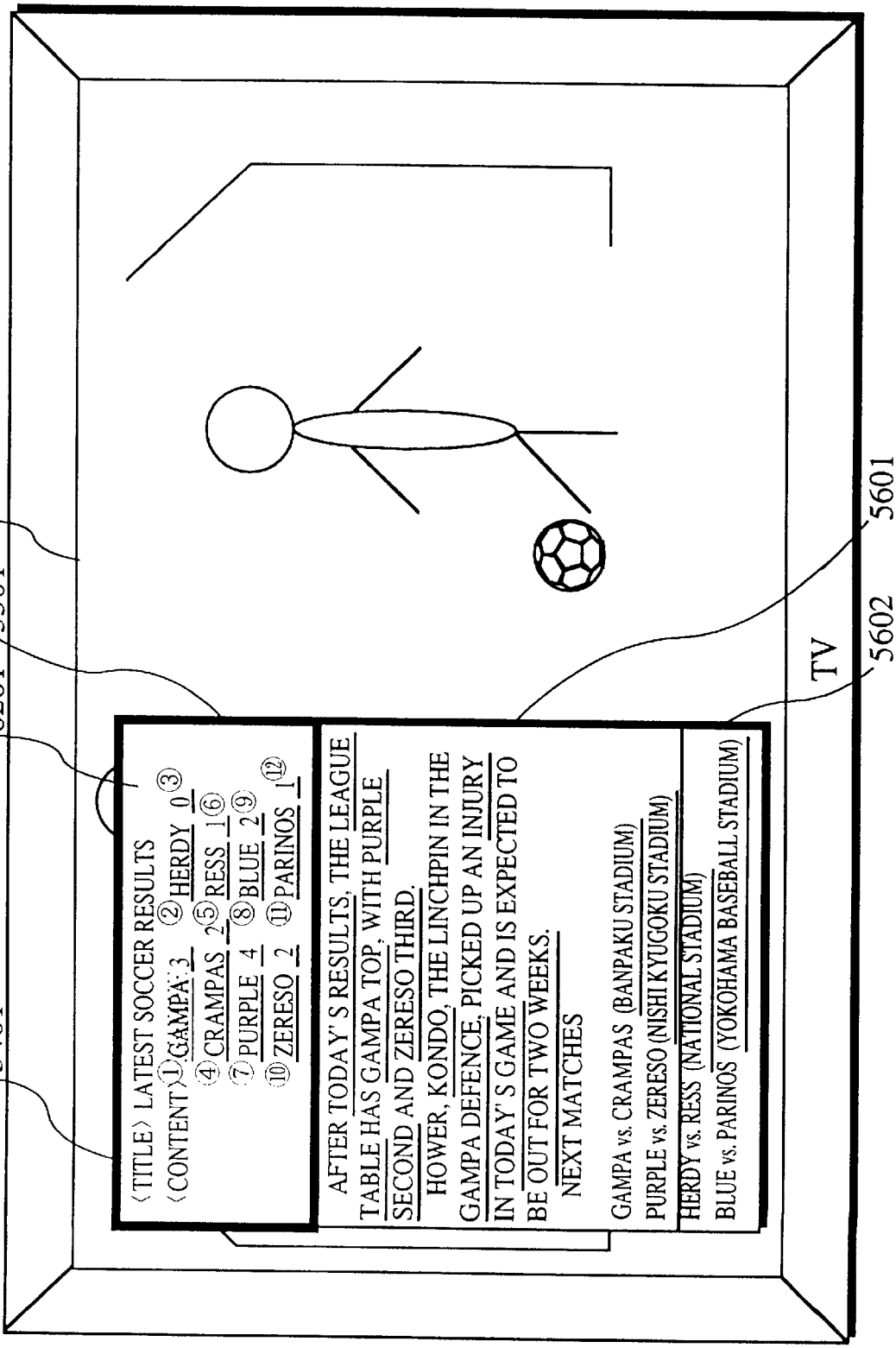
FIG. 62 shows example display of data by the display unit of the present embodiment.

FIG. 62 shows the partial data 6201 of the virtual window 5501 with the text item numbers attached, when the first virtual window 5501 is set as the current virtual window.

On being informed of a number by the control unit 6004, the display control unit 6005 reads the data which is linked to the text item which corresponds to the received number in the text item number table 6101 in the data storage unit 6001, and has the display of the display unit 5206 replaced with this newly read data.

The display unit 5206 is the same as in the eighth embodiment.

As one example, when, as shown in FIG. 62, the first virtual window 5301 is set as the current virtual window, and the user presses the channel button "2" on the remote controller 501, data 5301 (see FIG. 53) in window 5401 of the display unit 5206 is replaced with data 5303.

While the eighth embodiment requires two button operations consisting of movement using the "Left" button 504 and the "Right" button 508 and confirmation using the "Enter" button 504, the present embodiment can update the display of data on the display unit 5206 by means of only one operation of the channel buttons "1" to "12".

The operation of the present embodiment is largely the same as in the eighth embodiment, with the addition of the processes described below with reference to FIG. 59.

In S5916, after adding "1" to the text counter N, the virtual window generating unit 6007 writes the text item in question and the value of the text counter N into the text item number table 6101 in the data storage unit 6001.

After terminating the display of a virtual window and having a new current virtual window displayed by the display unit 5206, the display control unit 6005 reads the text numbers of text items included in the current virtual window from the text item number table 6101 in the data storage unit 6001 and has the numbers displayed in small circles next to the corresponding text items.

In the present embodiment, virtual windows are used, with only a certain number of text items being allowed in each virtual window. Text items are also displayed with numbers to allow their selection by a single push of a channel button on a remote controller. As a result, when there are a large number of text items, the user has less trouble in moving between text items than before, and so can easily have their desired data displayed.

It should be noted that while the third through ninth embodiments described a case where the data stored in the data storage units, such as 2001, was given in its display form on the display units, such as 2006, this data can be made up in reality of data which is written in a language such as HTML (Hypertext Markup Language).

Figure 63:
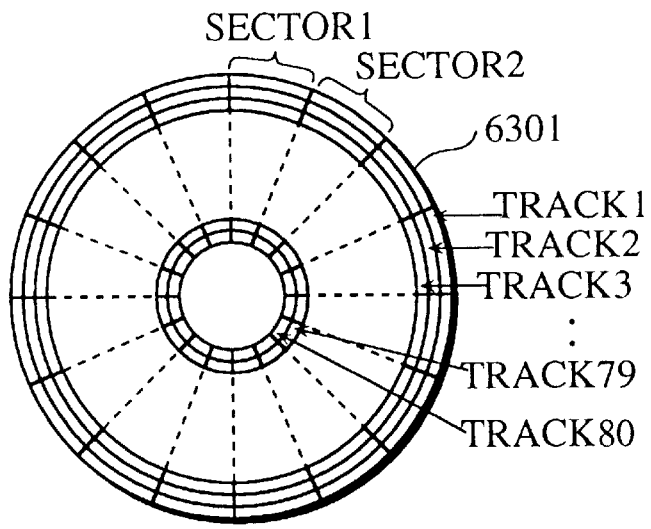
FIG. 63 shows a recording medium for recording a program which realizes the functions of all of the construction elements of the data storage apparatuses explained in the first to ninth embodiments.
Figure 64:
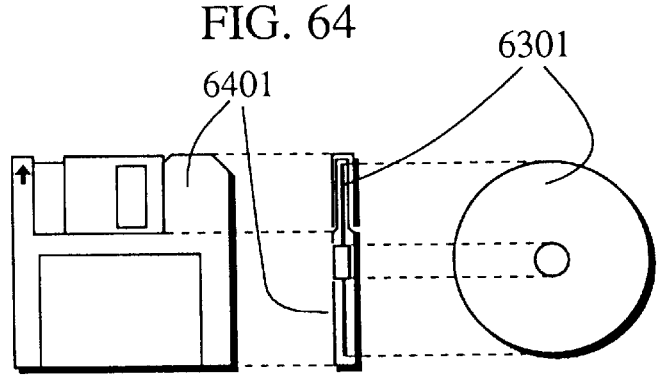
FIG. 64 shows the recording medium and its case.

The first to ninth embodiments of the present invention also describe data processing apparatuses of constructions such as that in shown in FIG. 1, although the present invention can be composed of a computer program which is stored on a storage medium, such as a floppy disk, to allow easy installation into other computer systems. Here, FIG. 63 shows the case when a floppy disk is used for this purpose.

The physical format of the floppy disk 6301 which is the recording medium itself is made up of tracks 1, 2, . . . , 80 which are concentrically arranged from the outer to the inner periphery of the disk, with each track being divided into sixteen sectors in an angular direction. A program is recorded in accordance with these divided regions.

The floppy disk 6301 described above is installed into a case 6401 to protect the disk from dust and physical damage, and to allow safe transportation of the disk.

Figure 65:
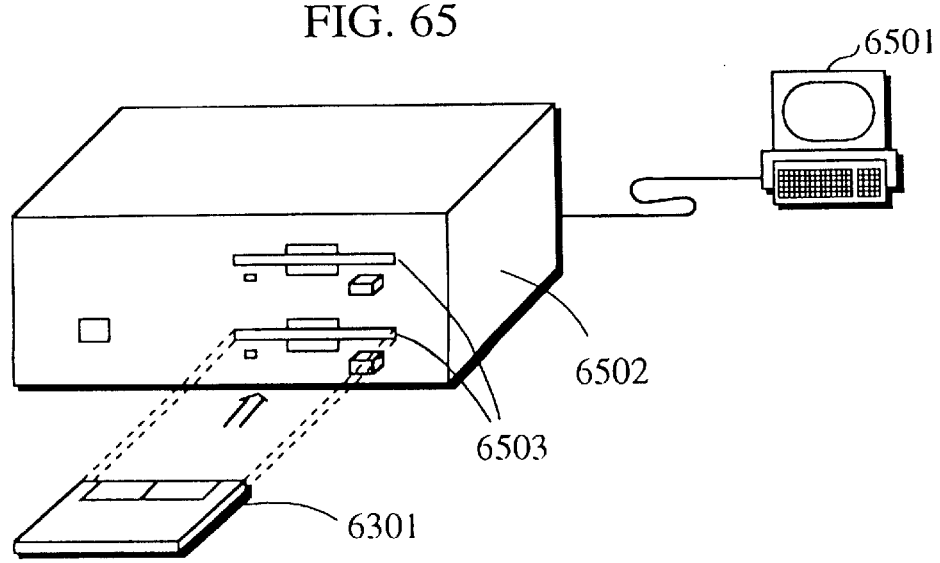
FIG. 65 shows the installation of the recording medium into a computer system.

FIG. 65 is a drawing showing how a program is recorded on or read from the floppy disk 6301. As shown in the drawing, a computer system 6501 is connected to a floppy disk drive 6502, so that a program can be written on or read from the floppy disk 6301. The floppy disk 6301 is inserted into and removed from the floppy disk drive 6502 via the insertion slot 6503. When recording, the program from the computer system 6501 is recorded on the floppy disk 6301 by the floppy disk drive 6502. When reading, the floppy disk drive 6502 reads the program on the floppy disk 6301 and the transfers the program to the computer system 6501.

It should be noted here that the above explanation describes the case when a floppy disk is used as the recording medium, although the same operations can be performed when an optical disk is used as the recording medium. The recording medium, however, is not limited to these two examples, so that any medium for recording a program, such as an IC card or a ROM cassette may alternatively be used.

Although the present invention has been fully described by way of examples with reference to the accompanying drawings, it is to be noted that various changes and. modifications will be apparent to those skilled in the art. Therefore, unless such changes and modifications depart from the scope of the present invention, they should be construed as being included therein.

What is claimed is:

1. A data processing apparatus which displays a set of document data on a display means together with an operation menu which has operation items for operation executions related to said set of document data, said data processing apparatus comprising:

document data storage means for storing a plurality of sets of document data which are to be displayed by the display means, wherein each set of document data has a different data content and is stored together with a set of content information which identifies said data content;

operation menu information storage means for storing a plurality of sets of operation menu information which are each made up of a set of operation items which correspond to one of a plurality of types of document data;

first indication operation means for indicating a display of a set of document data, in accordance with a user operation;

second indication operation means for indicating an addition of a display of an operation menu to the displayed set of document data, in accordance with a user operation;

operation menu generation means for receiving an indication from said second indication operation means, for obtaining the content information of the displayed set of document data from said document data storage means, for extracting the set of operation menu information which corresponds to the obtained content information from said operation menu information storage means, and for generating an operation menu which has the operation items in the extracted set of operation menu information as menu items after the set of document data has been displayed and a user operation has indicated to add the display of an operation menu to the displayed set of document data; and display control means for reading a set of document data from said document data storage means and having the set of document data displayed on the display means in accordance with an indication from said first indication operation means, and for having the operation menu generated by said operation menu generation means displayed on the display means.

2. The data processing apparatus of claim 1, further comprising:

menu item focusing/deciding operation means for focusing on a menu item in the operation menu displayed on the display means in accordance with a user operation and for deciding on the focused menu item in accordance with a user operation; and operation execution means for executing an operation program of the operation item which is the menu item decided on by said menu item focusing/deciding operation means.

3. The data processing apparatus of claim 2, further comprising:

obtaining a set of document data that is broadcast means for text-multiplexed broadcast transmitted by a television station and obtaining a set of document data by separating text data from the received text-multiplexed broadcast; and document data writing means for writing the set of document data received by said document data obtaining means into said document data storage means.

4. The data processing apparatus of claim 1, further comprising data section display control means for having data sections included in the set of data being displayed on the display means displayed in a new window.

5. A data processing apparatus which displays a plurality of sets of document data including key words on a display means together with an operation menu which has operation items for operation executions related to at least one of said plurality of sets of document data, said data processing apparatus comprising:

document data storage means for storing a plurality of sets of document data, including key words contained in each set of document data and a list of types of key words which are used to classify the content of key words, which are to be displayed by the display means, wherein each set of document data includes key words specifically associated with that set of document data;

operation menu information storage means for storing a plurality of sets of operation menu information which are each made up of a set of operation items which correspond to a type of keyword;

first indication operation means for indicating a display of a set of document data in accordance with a user operation;

first display control means for receiving an indication from said first indication operation means, for reading a set of document data from said document data storage means, and for having said read set of document data displayed by the display means;

key word selection means for selecting a key word in said set of document data displayed by the display means, in accordance with a user operation;

second display control means for having a key word, which is indicated as one of a default and a selection by said key word selecting operation means, in said set of document data displayed on the display means displayed in focus;

second indication operation means for indicating a display of an operation menu for the key word in focus, in accordance with a user operation;

operation menu generation means for receiving an indication from said second indication operation means, for determining the type of the key word in focus, for reading the set of operation menu information which corresponds to the type of the key word in focus on the display means from said operation menu information storage means, and for generating an operation menu which has the operation items in the read set of operation menu information as menu items; and third display control means for having the operation menu generated by said operation menu generation means displayed on the display means.

6. The data processing apparatus of claim 5, further comprising:

menu item focusing/deciding operation means for focusing on a menu item in the operation menu displayed on the display means in accordance with a user operation and for deciding on the focused menu item in accordance with a user operation; and operation execution means for executing an operation program of the operation item which is the menu item decided on by said menu item focusing/deciding operation means.

7. The data processing apparatus of claim 6, further comprising:

obtaining a set of document data that is broadcast means for text-multiplexed broadcast transmitted by a television station and obtaining a set of document data and a table of types of key words by separating said received text-multiplexed broadcast; and writing means for writing the set of document data and the table of types of key words obtained by said document data obtaining means into said document data storage means;

wherein the operation menu generation means reads a type of the key word in focus from the table in said document data storage means, and reads the set of operation menu information corresponding to the read type from said operation menu information storage means.

8. In a television receiving system for receiving television signals and displaying image signals on a display unit, the improvement of a data processing apparatus comprising:

a separating unit for determining if the television signal is a text multiplexed broadcast signal and if so, separating character data signals from image signals and converting the character data to a set of document data while sending the image signals to the display unit for display;

document data storage unit for storing each set of document data converted by the separating unit to provide a plurality of sets of document data which are displayable by the display unit, wherein each set of document data has a different data content and is stored together with a set of content information which corresponds to said data content;

operation menu information storage unit for storing a plurality of sets of operation menu information which are each made up of a set of operation items which correspond to one of a plurality of types of document data;

an input operation unit, including a wireless remote controller having input members for requesting a document display and a menu display and providing corresponding signals, in accordance with a user operation;

an input signal reception unit for receiving user signals from the input operation unit;

operation menu generation means for receiving an indication from said input signal reception unit for displaying a set of document data, for obtaining the content information of the displayed set of document data from said document data storage unit, for extracting the set of operation menu information which corresponds to the obtained content information from said operation menu information storage unit, and for generating an operation menu which has the operation items in the extracted set of operation menu information as menu items after the set of document data has been displayed and a user operation has indicated to add the display of an operation menu to the displayed set of document data; and display control means for reading a set of document data from said document data storage unit and having the set of document data displayed on the display unit in accordance with a signal from said input operation unit, and for having a corresponding operation menu, generated by said operation menu generation means, displayed on th e display unit.

9. The data processing apparatus of claim 8, wherein the operation menu generation means determines from the document data storage unit whether a text item in the displayed set of document data is linked to a plurality of sets of document data and if so linked, generates a menu with a title of each linked set of document data as a menu item.

10. The data processing apparatus of claim 9, further including means for providing a focus indicator on a displayed menu item and upon a lapse of a predetermined time period automatically moving the focus indicator to another menu item.

11. The data processing apparatus of claim 10, further including means for generating and displaying a channel number adjacent a menu item that corresponds to an input member on the wireless remote controller whereby the user can display a set of document data corresponding to the menu item by activating the input member.

* * * * *